(12) United States Patent
Mathews et al.

(10) Patent No.: US 7,739,176 B2
(45) Date of Patent: *Jun. 15, 2010

(54) SYSTEM, METHOD AND COMPUTER PROGRAM PRODUCT FOR PERFORMING A CONTINGENT CLAIM VALUATION OF AN EARLY-LAUNCH OPTION

(75) Inventors: Scott H. Mathews, Seattle, WA (US); Vinay T. Datar, Mercer Island, WA (US); Kyle M. Nakamoto, Bellevue, WA (US); Thomas S. Richardson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 353 days.

This patent is subject to a terminal disclaimer.

(21) Appl. No.: 11/613,954

(22) Filed: Dec. 20, 2006

(65) Prior Publication Data

US 2007/0150391 A1 Jun. 28, 2007

Related U.S. Application Data

(63) Continuation-in-part of application No. 10/309,659, filed on Dec. 4, 2002, now Pat. No. 7,676,416, which is a continuation-in-part of application No. 09/902,021, filed on Jul. 10, 2001, now Pat. No. 6,862,579, and a continuation-in-part of application No. 10/453,396, filed on Jun. 3, 2003.

(51) Int. Cl.
*G06Q 40/00* (2006.01)
(52) U.S. Cl. .................................. 705/36 R
(58) Field of Classification Search .................. 705/36, 705/36 R
See application file for complete search history.

(56) References Cited

U.S. PATENT DOCUMENTS 5,377,095 A 12/1994 Maeda et al.

(Continued)

FOREIGN PATENT DOCUMENTS

EP 1 178 416 A1 2/2002

(Continued)

OTHER PUBLICATIONS

John Charnes, Using Simulation for Option Pricing, Dec. 13, 2000, The University of Kansas School of Business, 1-8.*

(Continued)

*Primary Examiner*—Jagdish N Patel
*Assistant Examiner*—Kevin Poe
(74) *Attorney, Agent, or Firm*—Alston & Bird LLP

(57) ABSTRACT

A system, method and computer program product are provided for performing a contingent claim valuation of an early-launch option including a contingent claim exercisable at one of a plurality of decision points including one or more decision points before an expiration exercise point. The method may include determining first and second values representing payoffs attributable to exercise of a contingent claim at a selected decision point before the expiration exercise point, and at the expiration exercise point, respectively. The first and/or second values may be determined based upon respective present value distribution of contingent future value and a respective present value of an exercise price, the present values including a respective distribution and exercise price discounted according to first and second discount rates, respectively. A value of the contingent claim may then be determined based upon the first value and/or the second value.

33 Claims, 24 Drawing Sheets

U.S. PATENT DOCUMENTS

| | | | |
|---|---|---|---|
| 5,692,233 A * | 11/1997 | Garman | 705/36 R |
| 5,710,578 A | 1/1998 | Beauregard et al. | |
| 5,960,407 A | 9/1999 | Vivona | |
| 6,061,662 A * | 5/2000 | Makivic | 705/36 R |
| 6,078,893 A | 6/2000 | Ouimet et al. | |
| 6,078,901 A | 6/2000 | Ching | |
| 6,157,918 A * | 12/2000 | Shepherd | 705/36 R |
| 6,205,431 B1 | 3/2001 | Willemain et al. | |
| 6,321,205 B1 | 11/2001 | Eder | |
| 6,321,212 B1 | 11/2001 | Lange | |
| 6,381,586 B1 * | 4/2002 | Glasserman et al. | 705/36 R |
| 6,393,406 B1 * | 5/2002 | Eder | 705/7 |
| 6,629,082 B1 | 9/2003 | Hambrecht et al. | |
| 6,810,332 B2 | 10/2004 | Harrison | |
| 6,853,952 B2 | 2/2005 | Chadwick | |
| 6,862,579 B2 * | 3/2005 | Mathews et al. | 705/36 R |
| 6,910,017 B1 | 6/2005 | Woo et al. | |
| 6,963,854 B1 | 11/2005 | Boyd et al. | |
| 7,085,734 B2 | 8/2006 | Grant et al. | |
| 7,110,956 B1 | 9/2006 | Drake et al. | |
| 7,133,848 B2 | 11/2006 | Phillips et al. | |
| 7,197,474 B1 | 3/2007 | Kitts | |
| 7,315,842 B1 | 1/2008 | Wang | |
| 7,349,878 B1 | 3/2008 | Makivic | |
| 7,398,221 B1 | 7/2008 | Bensoussan et al. | |
| 7,574,394 B2 | 8/2009 | Chorna et al. | |
| 2001/0041996 A1 * | 11/2001 | Eder | 705/7 |
| 2002/0010667 A1 * | 1/2002 | Kant et al. | 705/35 |
| 2002/0116348 A1 | 8/2002 | Phillips et al. | |
| 2002/0143604 A1 | 10/2002 | Cox et al. | |
| 2003/0014337 A1 * | 1/2003 | Mathews et al. | 705/35 |
| 2003/0033191 A1 | 2/2003 | Davies et al. | |
| 2003/0078870 A1 * | 4/2003 | Datar et al. | 705/36 |
| 2003/0115128 A1 | 6/2003 | Lange et al. | |
| 2003/0144897 A1 | 7/2003 | Burruss et al. | |
| 2003/0236738 A1 | 12/2003 | Lange et al. | |
| 2004/0068455 A1 | 4/2004 | Jacobus et al. | |
| 2004/0098327 A1 * | 5/2004 | Seaman | 705/36 |
| 2004/0128221 A1 * | 7/2004 | Pandher | 705/36 |
| 2004/0249642 A1 | 12/2004 | Mathews et al. | |
| 2005/0102213 A1 | 5/2005 | Savasoglu et al. | |
| 2005/0125318 A1 | 6/2005 | Jameson | |
| 2006/0253355 A1 | 11/2006 | Shalen | |
| 2007/0011065 A1 | 1/2007 | Sreenivasan et al. | |
| 2007/0022031 A1 * | 1/2007 | Sponholtz et al. | 705/35 |
| 2007/0050282 A1 * | 3/2007 | Chen et al. | 705/38 |
| 2007/0106576 A1 | 5/2007 | Jung et al. | |
| 2007/0112661 A1 | 5/2007 | Mathews | |
| 2007/0150390 A1 | 6/2007 | Mathews et al. | |
| 2007/0150391 A1 | 6/2007 | Mathews et al. | |
| 2007/0150392 A1 | 6/2007 | Mathews et al. | |
| 2007/0150393 A1 | 6/2007 | Mathews et al. | |
| 2007/0150394 A1 | 6/2007 | Mathews et al. | |
| 2007/0150395 A1 | 6/2007 | Nakamoto et al. | |
| 2007/0162376 A1 | 7/2007 | Mathews et al. | |
| 2007/0299753 A1 | 12/2007 | Averbuch et al. | |
| 2008/0015871 A1 | 1/2008 | Eder | |
| 2008/0109341 A1 | 5/2008 | Stiff et al. | |
| 2008/0147568 A1 | 6/2008 | Wang | |
| 2008/0167984 A1 | 7/2008 | Courey et al. | |
| 2008/0208678 A1 | 8/2008 | Walser et al. | |
| 2008/0228605 A1 | 9/2008 | Wang | |
| 2008/0288394 A1 | 11/2008 | Eder | |
| 2009/0030822 A1 | 1/2009 | Cresswell | |
| 2009/0043604 A1 | 2/2009 | Jung et al. | |
| 2009/0043683 A1 | 2/2009 | Jung et al. | |
| 2009/0099955 A1 | 4/2009 | Peters et al. | |

FOREIGN PATENT DOCUMENTS

| | | |
|---|---|---|
| JP | 2001357189 A | 12/2001 |

OTHER PUBLICATIONS

Eric L. Burgess, Hany S. Gobrieal; *Integrating Spacecraft Design and Cost-Risk Analysis Using NASA Technology Readiness Levels;* Feb. 1996; 29th Annual DoD Cost Analysis Symposium, Leesburg, Virginia; 14 pages; The Aerospace Corporation; Herndon, Virginia.

Ray Nelson; Risk Analysis Using @RISK® and Crystal Ball®; *Oracle of IIF;* Dec. 2000; pp. 8-11.

John M. Charnes; Using Simulation for Option Pricing; Dec. 2000; pp. 151-157; *Proceedings of the 2000 Winter Simulation Conference,* Orlando, Florida.

*Risk Analysis Overview—What is Risk?;* Available at <http://www.decisioneering.com/risk-analysis-print.html> (visited Feb. 19, 2002).

*Real Options with Monte Carlo Simulation;* Available at <http://www.puc-rio.br/marco.ind/monte-carlo.html> (visited Feb. 25, 2002).

*Cone of Uncertainty;* Available at <http://www.real-options.com/cou.html> (visited Oct. 11, 2002).

Weston Copeland; *Managerial Finance;* 1990; pp. 481-487, 406-407, 642 (10 pages); $9^{th}$ Edition; ISBN 0 03 0558832.

Alan Shapiro; *Modern Corporate Finance;* 1990; pp. 438, 261; ISBN 002409530-3.

Felstead, "A Mathematical Approach to Cost Minimization of Satcom Systems", 1996, IEEE, pp. 352-356.

Morrison, "Life Cycle Approach to New Product Forecasting", Summer 1995, *The Journal of Business Forecasting Methods & Systems,* 14, 2, ABI/Inform Global, p. 3.

Eskin, "Dynamic Forecast of New Product Demand Using a Depth of Repeat Model", May 1973, *JMR Journal of Marketing Research,* 10, 0000002, AB/Inform Global, p. 115.

Bassin, "The Logistic Curve—another approach to new product forecasting", Fall 1991, *The Journal of Business Forecasting Methods & Systems,* 10, 3, ABI/Inform Global, p. 14.

Paszko et al., "Product Life Cycles and Profitability", Summer 1989, *The Journal of Business Forecasting Methods & Systems,* 8, 2; ABI/Inform Global, p. 26.

Nelson, "The Product Life Cycle of Engineered Metals: a comparative analysis of the application of product life cycle theory", Spring 1992, *The Journal of Business & Industrial Marketing,* 7, 2, ABI/Inform Global, p. 5.

Curry, "FALCCM-H: Functional Avionics Life Cycle Cost Model for Hardware", © 1993, IEEE, pp. 950-953.

Xie et al., "Probabilistic Design Optimization of Aircraft Structures with Reliability, Manufacturability, and Cost Constraints", Apr. 7-10, 2003, $44^{th}$ AIAA/ASME/ASCE/AHS Structures, Structural Dynamics, and Materials Conference, Norfolk, VA, p. 1.

Marx et al., "Knowledge-based manufacturing and structural design for a high speed civil transport", 1994, $1^{st}$ Industry / Academy Symposium on Research for Future Supersonic and Hypersonic Vehicles, Greensboro, NC pp. 1-6.

Schrage, "Technology for Rotorcraft Affordability Through Integrated Product/Process Development (IPPD)", 1999, American Helicopter Society $55^{th}$ Annual Forum, Montreal, Canada, pp. 1-19.

Kamath et al., T.P.M. (2002) A Bayesian approach to a dynamic inventory model under an unknown demand distribution. Computers & Operations Research, v. 29, pp. 403-422.

Hirschleifer (1980) Price Theory and Applications. Prentice-Hall: New York, pp. 126-151.

Morris (1992) Market Oriented Pricing. Quarom Books: New York, pp. 172-173.

Evans and Berman (1992). Marketing. Macmillan: New York. Chapter 18: Overview of Price Planning, pp. 526-547.

Berry et al., Automobile Prices in Market Equilibria. Econometrica, vol. 63, No. 4 (Jul. 1995), pp. 841-890.

Monroe, (1978) Models for Pricing Decisions, *Journal of Marketing Research,* vol. XV (August), pp. 413-428.

Urban et al., (1968) A New Product Analysis and Decision Model, *Management Science*, vol. 14, No. 8 (April), pp. B490-B519.

Yang et al. (2003) Bayesian Analysis of Simultaneous Demand and Supply, Quantitative Marketing and Economics, vol. 1, pp. 251-275.

Largent, "A probabilistic risk management based process for planning and management of technology development", PhD Dissertation Georgia Tech Aerospace Engineering, Mar. 2003, downloaded 9/3/208 [retrieved from http://smartech.gatech.edu/handle/1853/12168], pp. 1-79, 210-271.

Longstaff, et al., "Valuing American Options by Simulation: A Simple Least-Squares Approach", Anderson Graduate School of Management, eScholarship Repository, University of California, http://repositories.cdlib.org/anderson/fin/1-01, 2001.

Breeden et al., "Prices of State Contingent Claims Implicit in Options Prices", *Journal of Business*, vol. 51, No. 4, pp. 621-651 (Oct. 1978).

International Search Report dated Nov. 19, 2008 for International Application No. PCT/US04/17258.

Cortazar et al., "Monte Carlo Evaluation Model of an Undeveloped Oil Field", *Journal of Energy Finance & Development*, vol. 3, No. 1, pp. 73-84. Available online Jan. 13, 1998. ISSN: 1085-743.

Charnes, John M., "Using Simulation for Option Pricing", The University of Kansas School of Business, Dec. 13, 2000, Presented at 2000 Winter Simulation Conference, Dec. 10-13, 2000, Wyndham Palace Resort and Spa, Orlando, FL, www.wintersim.org, pp. 151-157.

Macmillan, Fional, "Risk, Uncertainty and Investment Decision-Making in the Upstream Oil and Gas Industry", MA Hons (University of Aberdeen), Oct. 2000, A thesis presented for the degree of Ph.D. at the University of Aberdeen.

* cited by examiner

SYSTEM, METHOD AND COMPUTER PROGRAM PRODUCT FOR PERFORMING A CONTINGENT CLAIM VALUATION OF AN EARLY-LAUNCH OPTION

RELATED APPLICATIONS

The present application is a continuation-in-part of U.S. patent application Ser. No. 10/309,659, entitled: Systems, Methods and Computer Program Products for Performing a Contingent Claim Valuation, filed Dec. 4, 2002, now U.S. Pat. No. 7,676,416 which is a continuation-in-part of application Ser. No. 09/902,021 filed Jul. 10, 2001, now U.S. Pat. No. 6,862,579, entitled: Systems, Methods and Computer Program Products for Performing a Generalized Contingent Claim Valuation, issued Mar. 1, 2005; and a continuation-in-part of U.S. patent application Ser. No. 10/453,396, entitled: Systems, Methods and Computer Program Products for Modeling Uncertain Future Benefits, filed Jun. 3, 2003, the contents of all of which are hereby incorporated by reference in their entireties.

FIELD OF THE INVENTION

Embodiments of the present invention generally relate to contingent claim valuation and, more particularly, to a system, method and computer program product for evaluating contingent claims of an early-launch option.

BACKGROUND OF THE INVENTION

It is oftentimes desirable to determine the value of a contingent claim that may be exercised at some time in the future. The two most common forms of a contingent claim are a call and a put, both of which may arise in a wide variety of applications. For example, financial options commonly involve a call in which a stock or other financial instrument may be purchased at some time in the future for a predetermined exercise price or a put in which a stock or other financial instrument may be sold at some time in the future for a predetermined exercise price. While contingent claims frequently occur in the financial arena, contingent claims also arise in a number of other contexts, such as project evaluation and the evaluation of options to purchase or sell other assets, as described below. Unfortunately, the contingent claims that arise in these other contexts may be more difficult to evaluate than the contingent claims that arise in the financial context since the underlying assets in these other contexts are not traded or valued by a well established market, such as the stock market in the financial arena.

By way of example of the contingent claims that occur in contexts other than the financial arena, the contingent claims that arise during project evaluation and options to purchase or sell other assets will be hereinafter described. In this regard, a number of projects are structured so as to include a contingent claim that may be exercised by one of the participants at some time in the future. The contingent claim oftentimes comes in the form of a call in which one of the participants has an option to invest additional amounts of money in order to continue the project. As such, if the initial stages of the project have proved unsuccessful and/or if the future prospects for the project appear bleak, the participant capable of exercising the call will likely decline to invest additional money and thereby forego exercise of the call and will therefore terminate its participation in the project. Alternatively, if the initial stages of the project have been successful and/or if the prospects of success of the project are bright, the participant capable of exercising the call will likely make the necessary investment in order to continue its participation in the project.

The investment that guarantees continued participation will often take the formal financial form of a purchase of another call option. Concretely, the investment may be used to fund additional engineering and/or market research that continues the intermediate development of the technology or product. At these intermediate stages of development, there may not yet be sufficient confidence to commit to full-scale production, which may eventually proceed contingent on successful developmental progress, or, if unsuccessful, then termination of the effort. Therefore, funding for development may occur as a small, phased incremental stream of investments the values of which are calculated as a series of contingent claims. In sum, technology or product development can be modeled as a succession of call options.

Examples of projects that include a contingent claim at some subsequent time are widely varied, but one common example involves a project having a pilot phase extending from some initial time to a subsequent time at which the contingent claim may be exercised. If the contingent claim is exercised, such as by one of the participants contributing the necessary investment to the project, the project will enter a commercial phase. As a more specific example, the project may involve research and development having staged investments in which each investment is essentially a contingent claim with the participant opting to continue with the research and development activity if the participant makes sufficient progress and the necessary investment, but withdrawing from the research and development activity if the participant declines to make the investment.

By way of other specific examples, the contingent claim may represent an option for the participant to adjust its production level at a subsequent time or an option to adjust its production mix in the future. In such examples, not all the complete fabrication equipment or factory real estate is purchased at the onset of production, but rather as market demand proves strong, additional equipment is installed. The result is lowered risk in the face of uncertain market demand, which is offset by making a series of contingent, incremental investments. The difficult question is how to appropriately size and time investments balancing market uncertainty, the benefit of being well-equipped or the regret of having prematurely invested.

In addition to project analysis, contingent claims may arise in the context of contingent clauses in contractual agreements that may take advantage of incremental changes in performance contingent on specified anticipated future events. In such instances, shifts in delivery quantities or sales quotas can be set against a series of incremental investments or payments the amount of which is calculated as a multi-stage or compound option.

And in yet other scenarios, contingent claims may arise in the context of an option to purchase or sell assets other than financial assets. In such contexts, the contingent claim oftentimes comes in the form of a call or a put in which one of the participants purchases the contingent claim to thereby have an option to purchase an asset or sell an asset at some subsequent time for a predetermined exercise price. The asset in such contexts can comprise any of a number of different assets, both tangible and intangible assets, including goods, services, and licenses such as cruise ship tickets, tickets to the theatre or a sporting event, the rental of a hotel room, and the rental of a car. In a more specific example, then, the contingent claim may comprise an option to purchase an airline ticket with the option being purchased at some initial time, and the option capable of being exercised at a subsequent time to purchase the airline ticket.

In another similar example, the contingent claim may comprise an option to obtain a full refund on an asset purchased at some initial time, with the option being exercisable at a subsequent time to obtain a full refund. In a more specific example, the asset may comprise an airline ticket purchased at some initial time, where the airline ticket is purchased with an option to obtain a refund of the purchase price at a subsequent time at which the option may be exercised. If the option, or contingent claim, is exercised, the purchaser will then be able to obtain a refund of the purchase price of the ticket by selling the ticket back to the airline ticket vendor (e.g., airline).

Regardless of the type of contingent claim, it is desirable to determine the value of a project and, in particular, the contingent claim at the present time. By determining the value of the contingent claim, the participant can avoid overpaying for the project or asset as a result of an overvaluation of the contingent claim. Conversely, the participant can identify projects or assets in which the value of the contingent claim has been undervalued and can give strong consideration to investing in these projects or assets since they likely represent worthwhile investment opportunities. And although techniques have been developed for determining the value of a project or an asset having a contingent claim at one or more subsequent times, it is usually desirable to improve upon existing techniques.

SUMMARY OF THE INVENTION

In view of the foregoing background, exemplary embodiments of the present invention provide an improved system, method and computer program project for performing a contingent claim valuation of an early-launch option. According to one aspect of exemplary embodiments of the present invention, a method is provided for performing a contingent claim valuation of an early-launch option including a contingent claim exercisable at one of a plurality of decision points (e.g., $p_n$, n=1, 2, ... N≦T). The decision points include an expiration exercise point (e.g., $p_N$ (t=T)) and one or more decision points (e.g., $p_n$, n<N) before the expiration exercise point.

The method of one exemplary embodiment includes determining a first value (e.g., $S_T$ Payoff=$S_{p_1}e^{-r_1p_1}-x_T e^{-r_2p_1}$) representing a payoff attributable to exercise of a contingent claim at a selected decision point before the expiration exercise point, and determining a second value (e.g., $S_T$ Payoff=E$[\max(S_T e^{-r_1T}-x_T e^{-r_2T},0)]$) representing a payoff attributable to the exercise of a contingent claim at the expiration exercise point. In this regard, the first and/or second values may be determined based upon respective present value distribution of contingent future value and a respective present value of an exercise price. The present value distribution may include a respective distribution of contingent future value discounted according to a first discount rate (e.g., $r_1$), and the present value of the exercise price may include a respective exercise price discounted according to a second discount rate (e.g., $r_2$) that need not equal the first discount rate. More particularly, for example, the first value may be determined based upon a present value distribution of contingent future value at the selected decision point (e.g., $S_{p_1}e^{-r_1p_1}$), and based upon a present value of an exercise price at the selected decision point (e.g., $x_T e^{-r_2p_1}$).

Additionally or alternatively, the second value may be determined based upon a present value distribution of contingent future value at the expiration exercise point (e.g., $S_T e^{-r_1T}$), and based upon a present value of an exercise price at the expiration exercise point (e.g., $x_T e^{-r_2T}$). Even more particularly, for example, determining the second value may include determining an expected value of the difference between the present value distribution of contingent future value at the expiration exercise point and the present value of the exercise price at the expiration exercise point (e.g., E$[S_T e^{-r_1T}-x_T e^{-r_2T}]$). And further, determining the expected value of the difference may include limiting the difference to a minimum predefined value (e.g., E$[\max(S_T e^{-r_1T}-x_T e^{-r_2T}, 0)]$).

The method of the aforementioned aspect also includes determining a value of the contingent claim (e.g., $S_T$ Payoff) based upon the first value and/or the second value. The value of the contingent claim may be determined further based upon a milestone threshold at the selected decision point (e.g., $P^*p_1$), where the milestone threshold represents a minimum asset value for exercising the contingent claim at the selected decision point. More particularly, for example, determining the value may include conditioning the value on a comparison of a distribution of contingent future value at the selected decision point and the milestone threshold (e.g., $S_{p_1} \geq P^*p_1$).

The milestone threshold (e.g., $P^*p_1$) for a selected decision point may be determined in a number of different manners in accordance with a number of different techniques. In one technique, for example, determining the milestone threshold may include determining a present value conditional distribution of contingent future value attributable to the exercise of a contingent claim at the expiration exercise point (e.g., $S_{T|P^*p_1}e^{-r_1T}$), where the present value conditional distribution includes a distribution of contingent future value conditioned on an estimated milestone threshold, and discounted according to the first discount rate. In addition, this technique may include determining present values of respective exercise prices required to exercise one or more contingent claims at the expiration exercise point and the selected decision point (e.g., $x_T e^{-r_2T}$ and $x_T e^{-r_2p_1}$), where the present values of respective exercise prices include respective exercise prices discounted according to the second discount rate. A conditional value (e.g., Net $S_{T|P^*p_n}$ Payoff) may then be determined based upon the present value conditional distribution of contingent future value and the present values of respective exercise prices. To realize a milestone threshold, a present value conditional distribution and a conditional value may be repeatedly determined for different estimated milestone thresholds until the conditional value equals approximately zero (e.g., Net $S_{T|P^*p_n}$ Payoff≈0). The respective milestone threshold at that instance may then be selected as the milestone threshold for the selected decision point.

According to another technique, determining the milestone threshold may include determining a first value and a second value, and determining a value based upon the first value and/or the second value, where this value is conditioned on a comparison of a distribution of contingent future value at the selected decision point and a candidate milestone threshold (e.g., $S_{p_1} \geq P^*p_{1,j}$). In this regard, a value may be repeatedly determined for a plurality of candidate milestone thresholds (e.g., $P^*p_{1,j}$, j=1, 2, ... J) such that a candidate milestone threshold that maximizes the value may be selected as the milestone threshold for the selected decision point.

In accordance with yet another technique, determining the milestone threshold may include determining a present value of an underlying asset at a selected decision point before the expiration exercise point (e.g., $P^*p_{1,j}e^{-r_1T}$), where the present value of the underlying asset includes a candidate milestone threshold discounted according to the first discount rate. This technique may then include determining a third value (e.g., $P^*p_{1,j}$ Payoff=$P^*p_{1,j}e^{-r_1p_1}-x_T e^{-r_2p_1}$) based upon the present value of the underlying asset, and based upon a present value of an exercise price at the selected decision point (e.g., $x_7 e^{-r_2 p_1}$). A present value of an underlying asset and a first value may be determined for one or more candidate milestone thresholds for the selected decision point (e.g., $P^* p_{1,j}$, $j=1, 2, \ldots J$). Accordingly, a candidate milestone threshold may be selected for a third value approximately equal to a second value, where the respective milestone threshold is selected as the milestone threshold for the selected decision point.

According to other aspects of exemplary embodiments of the present invention, an improved system and computer program product are provided for performing a contingent claim valuation of an early-launch option. Exemplary embodiments of the present invention therefore provide an improved system, method and computer program product for performing a contingent claim valuation of an early-launch option. As indicated above and explained in greater detail below, the system, method and computer program product of exemplary embodiments of the present invention may solve the problems identified by prior techniques and may provide additional advantages.

BRIEF DESCRIPTION OF THE DRAWINGS

Figure 1:
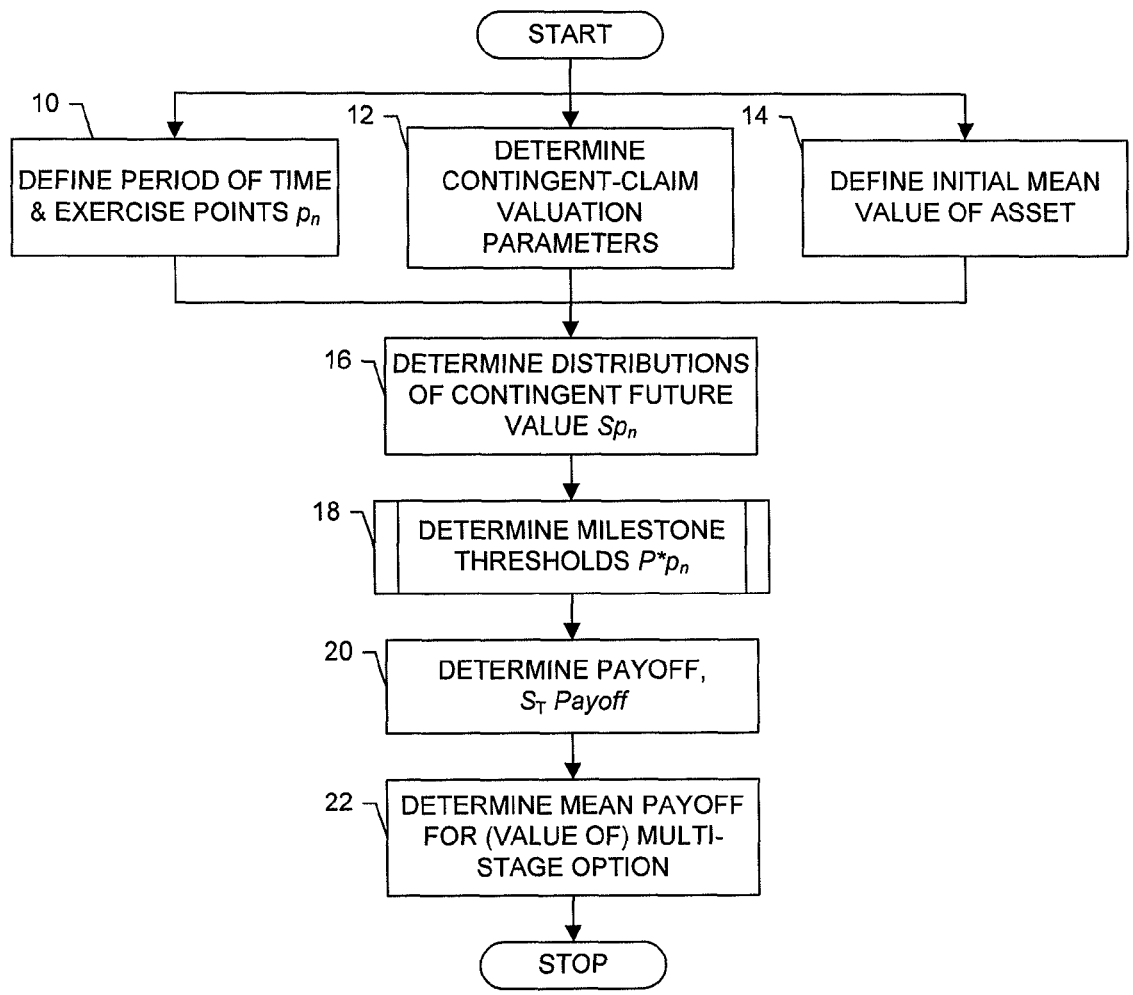
Figure 3:
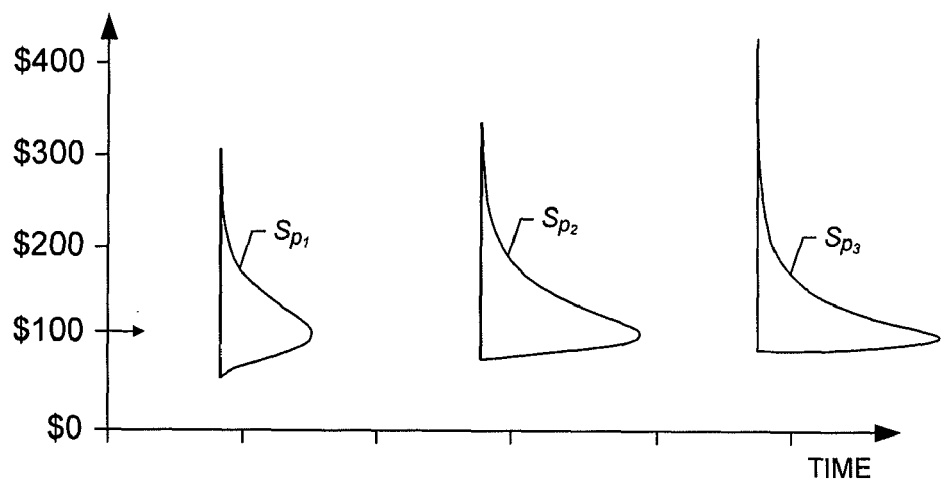
Figure 4:
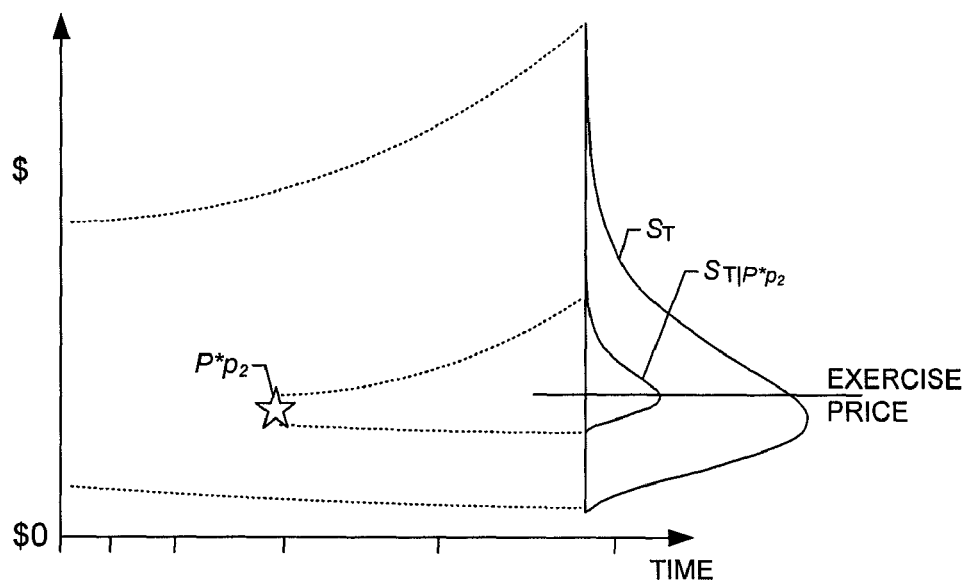
Figure 5:
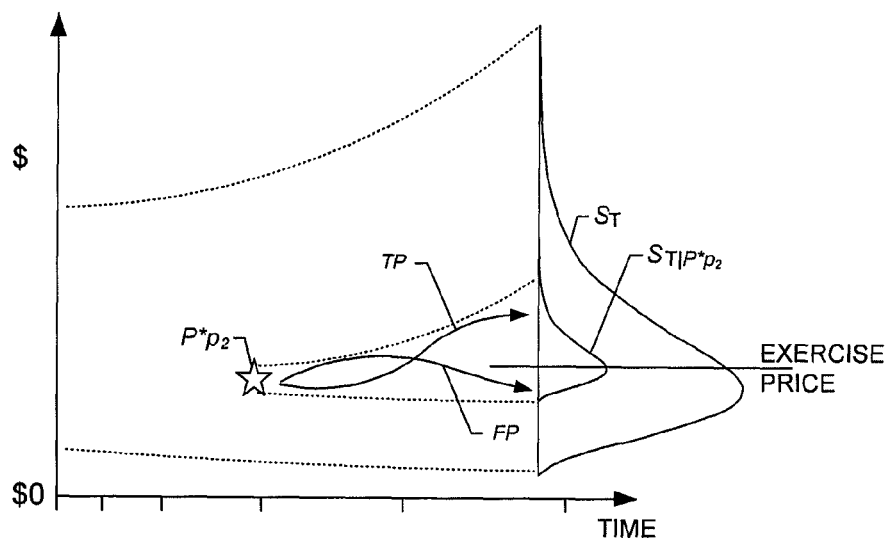
Figure 6:
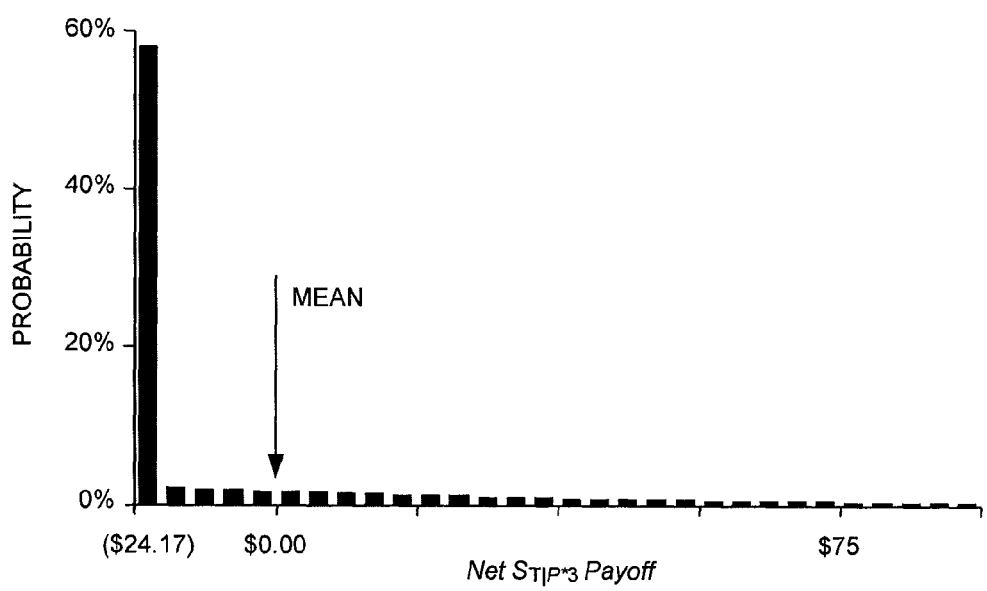
Figure 7:
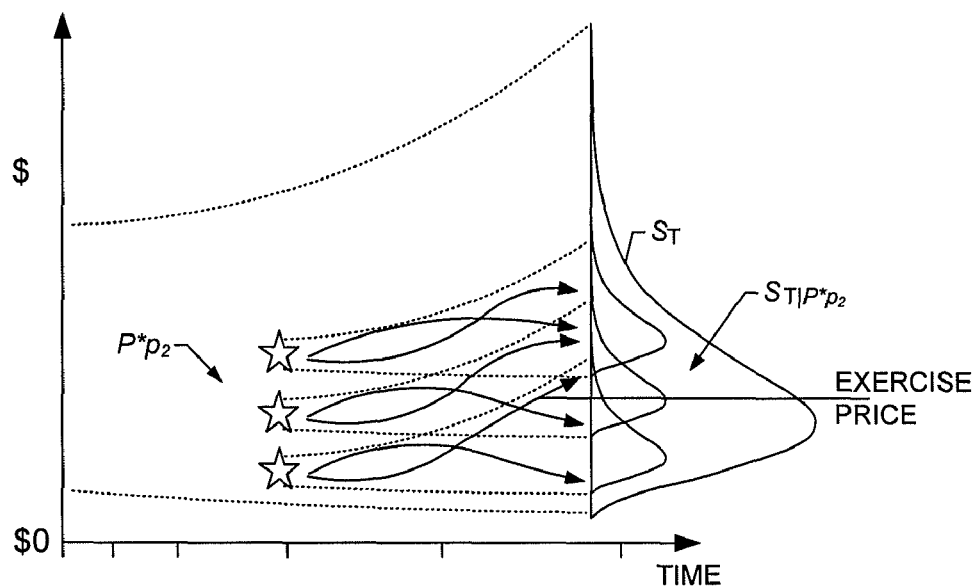
Figure 8:
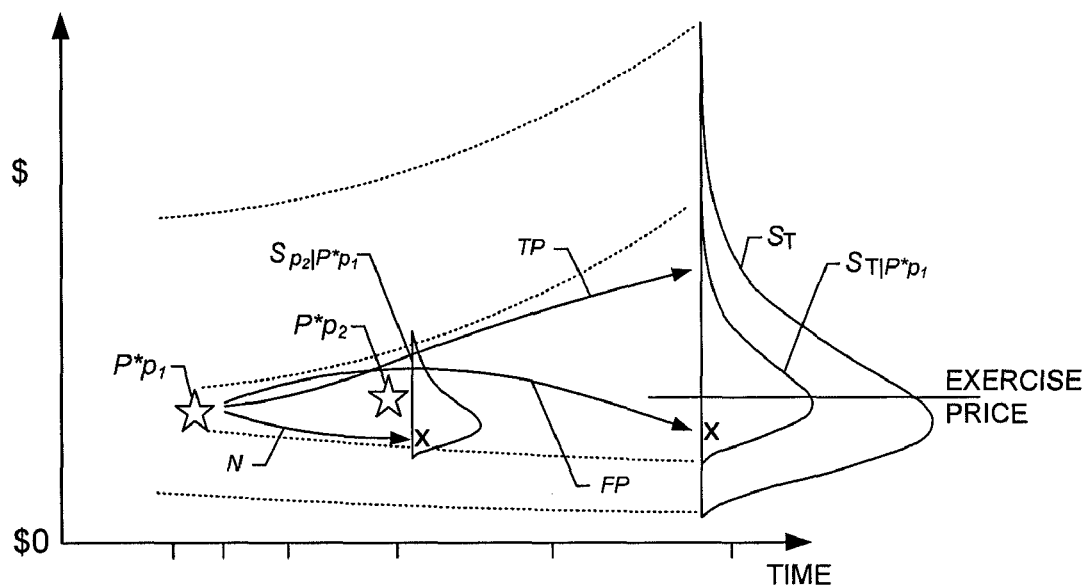
Figure 9:
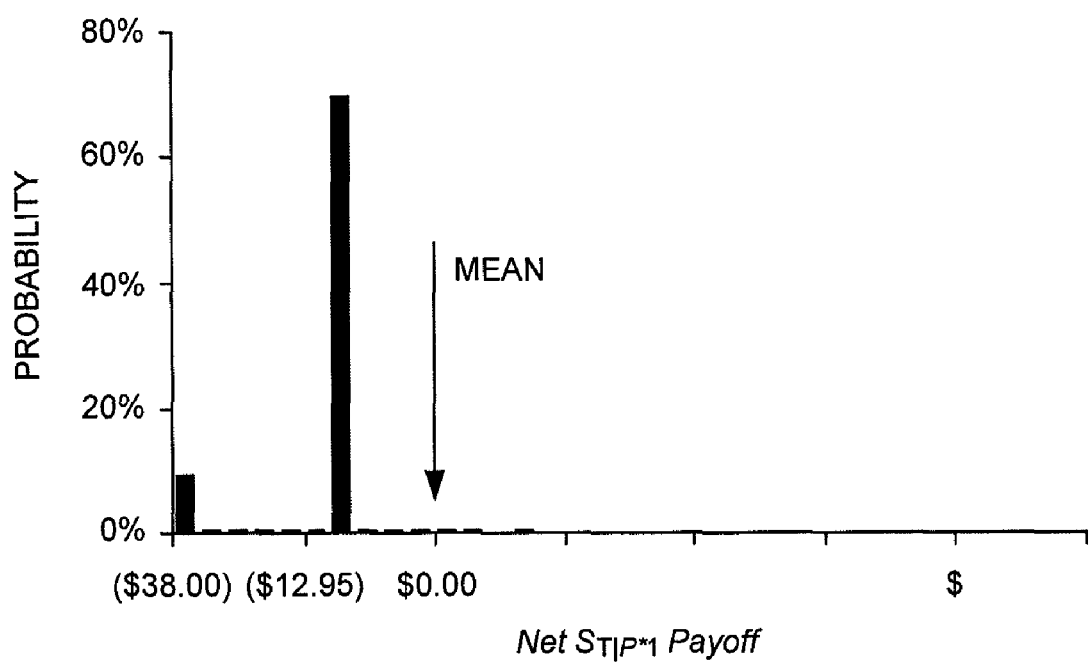
Figure 10A:
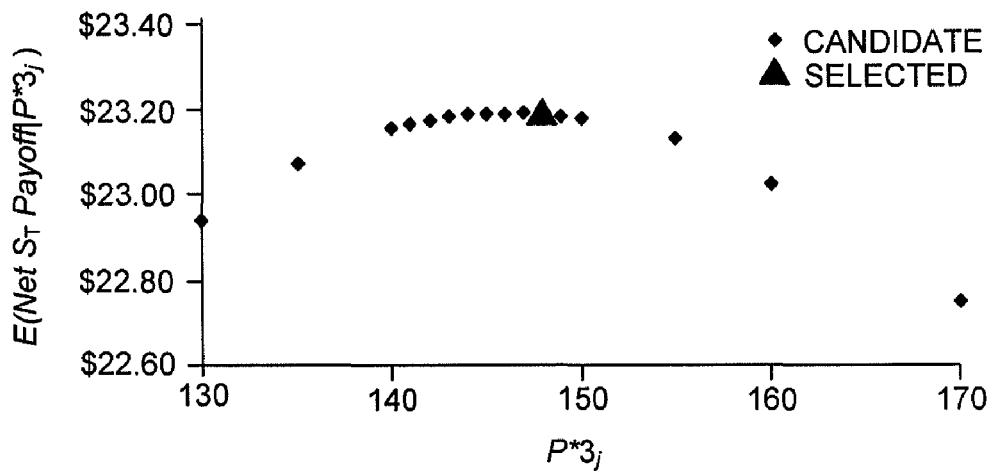
Figure 10B:
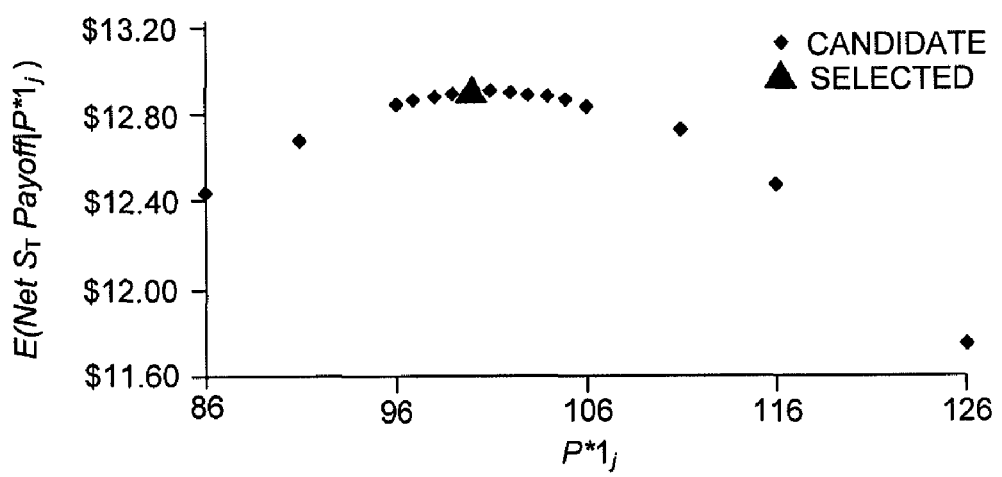
Figure 11A:
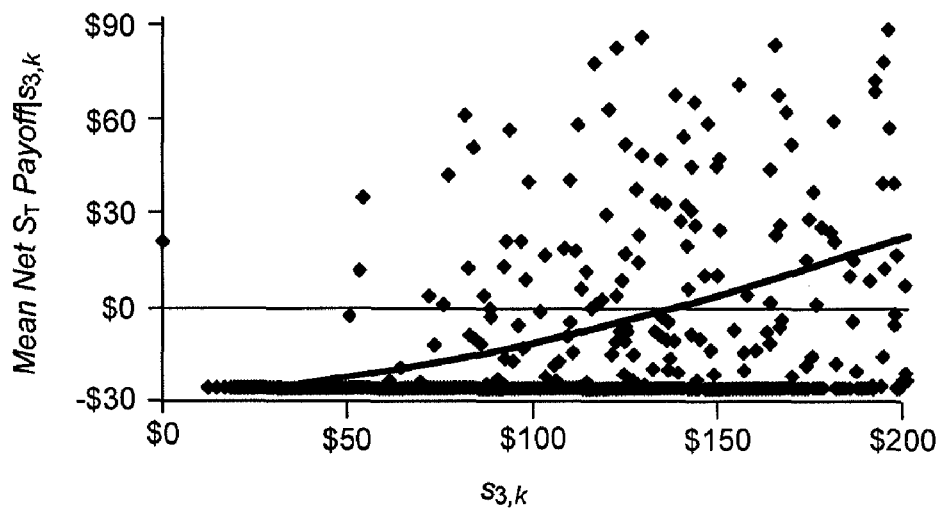
Figure 11B:
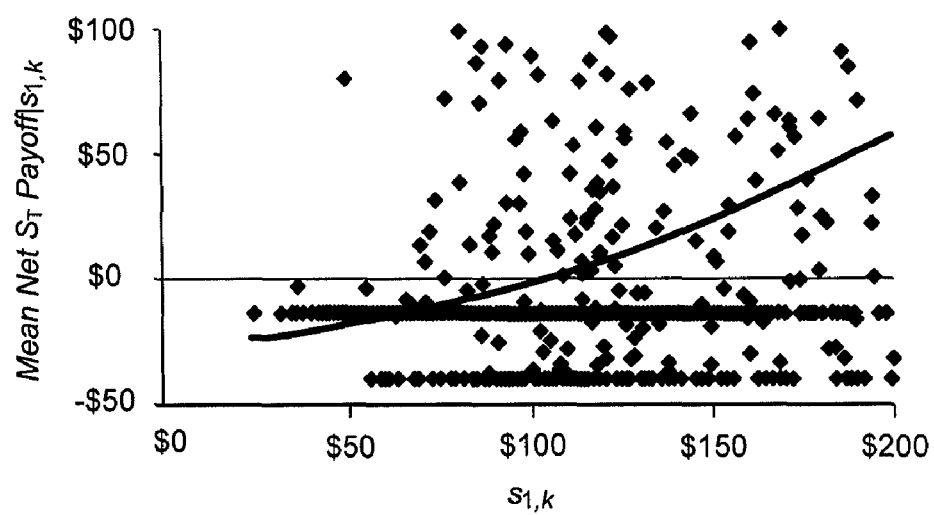
Figure 12:
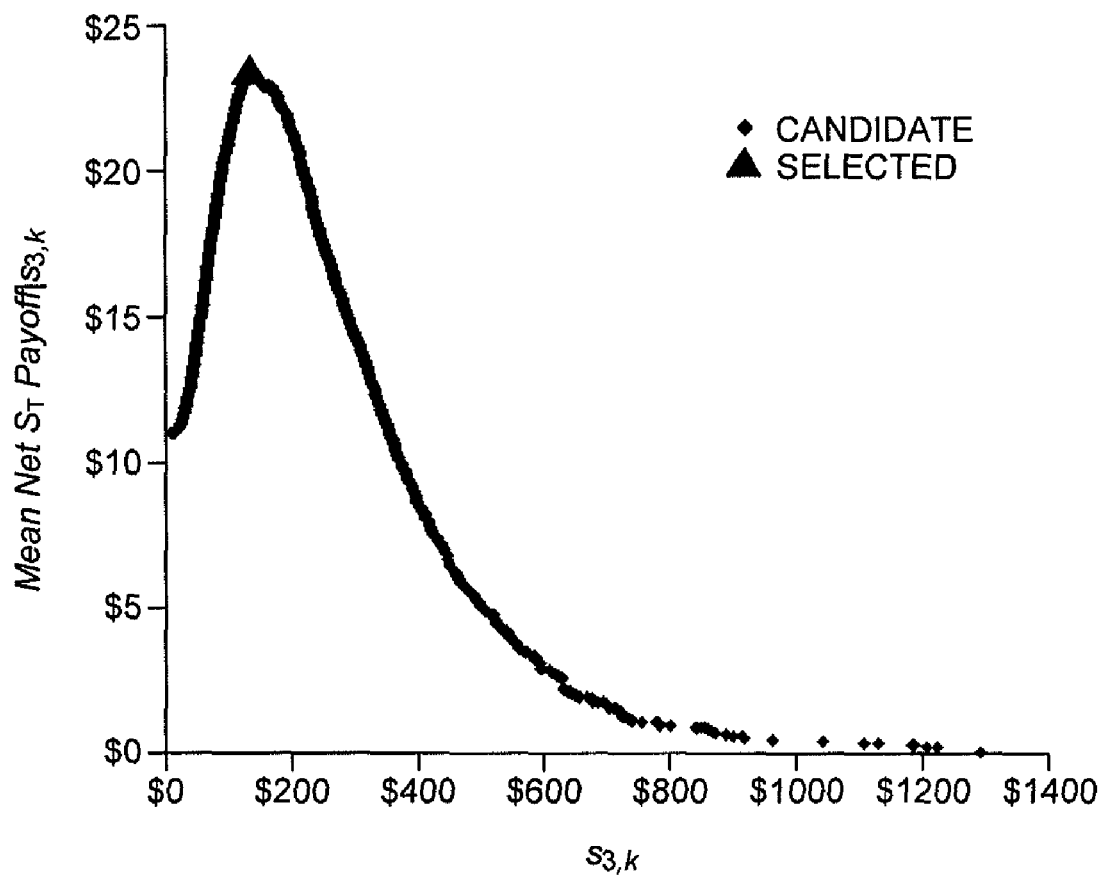
Figure 13:
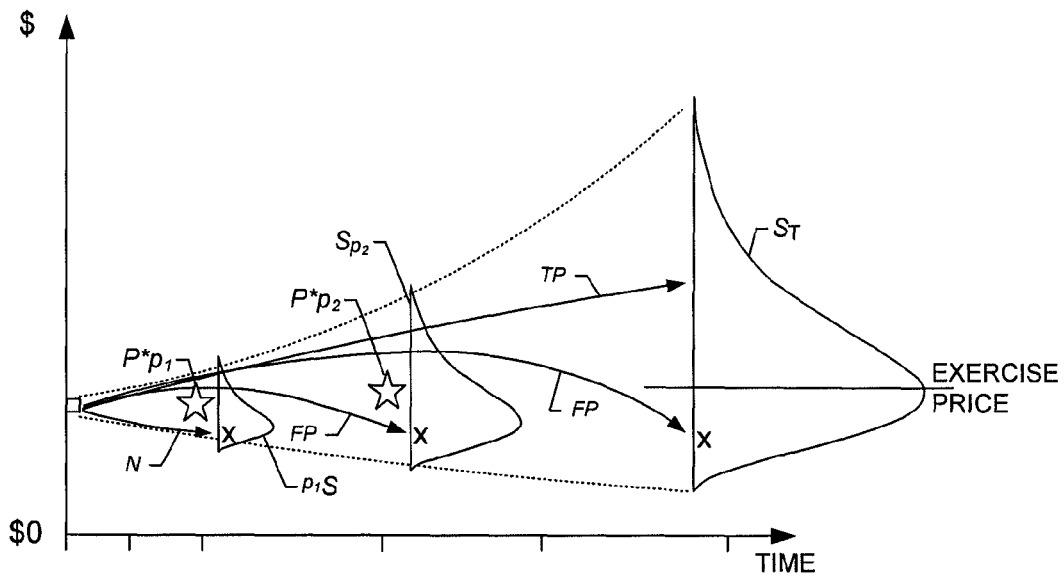
Figure 14:
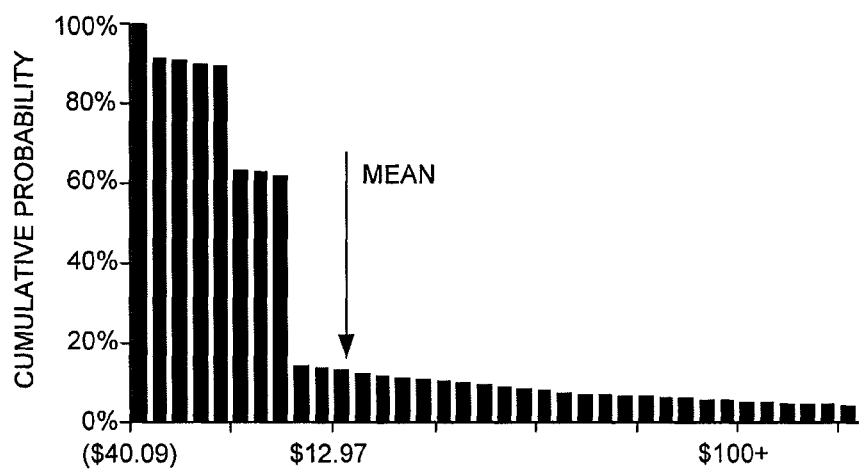
Figure 15:
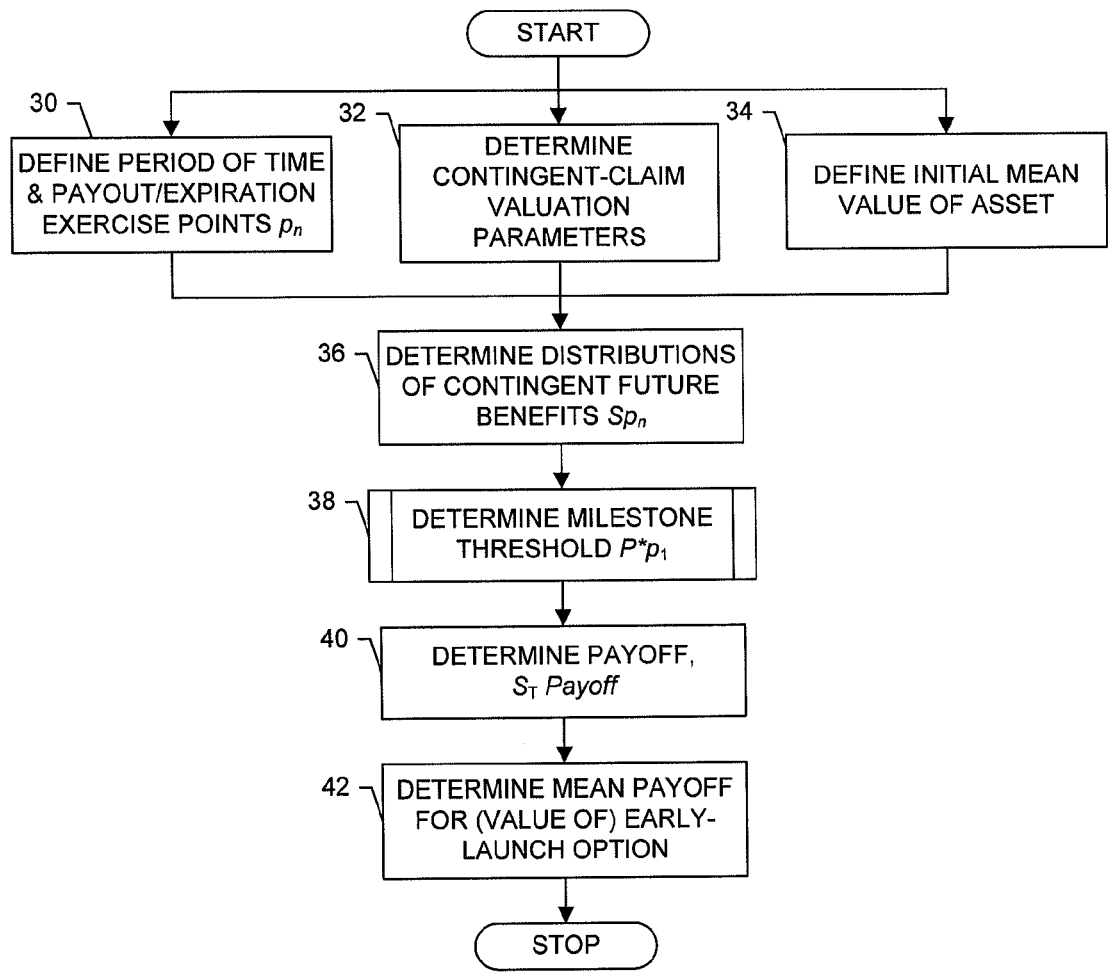
Figure 17:
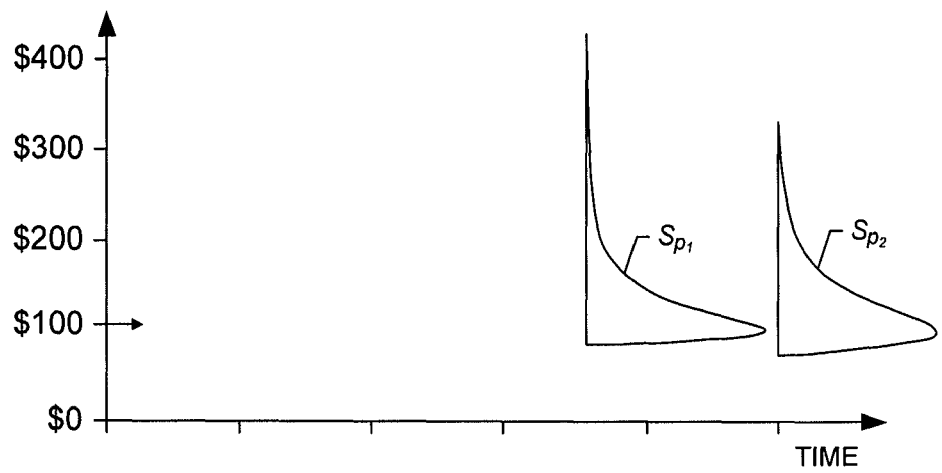
Figure 18:
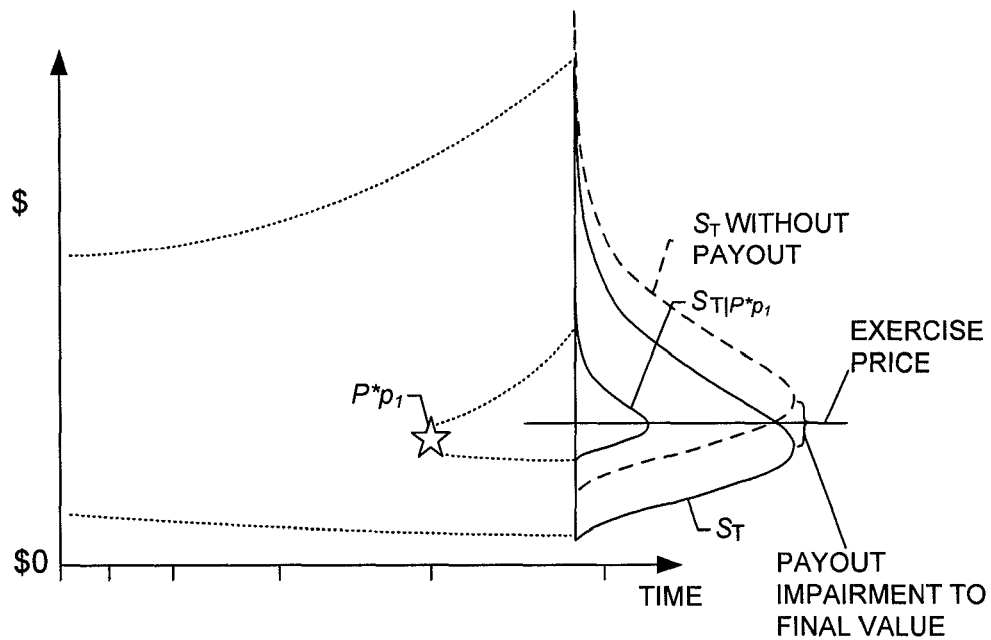
Figure 19:
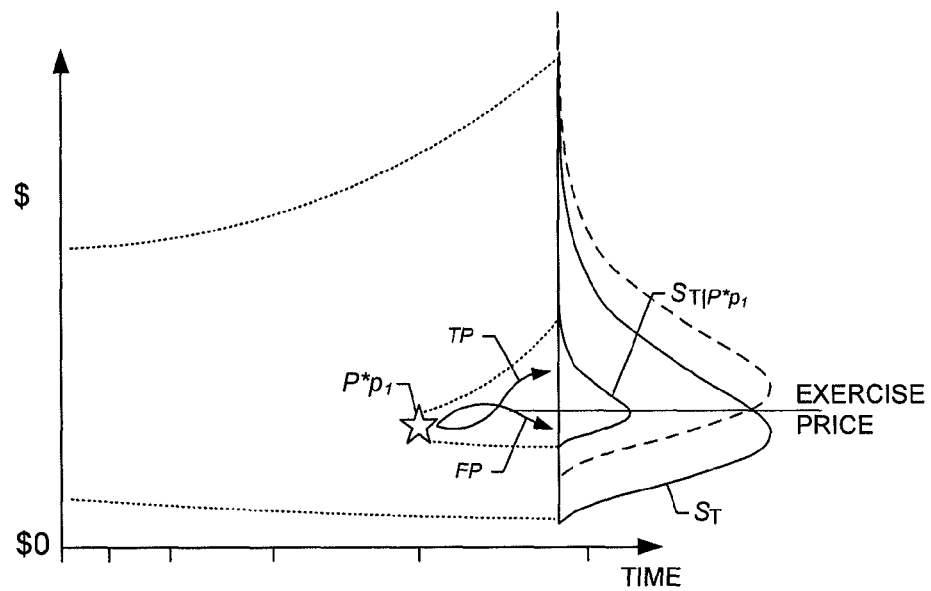
Figure 20:
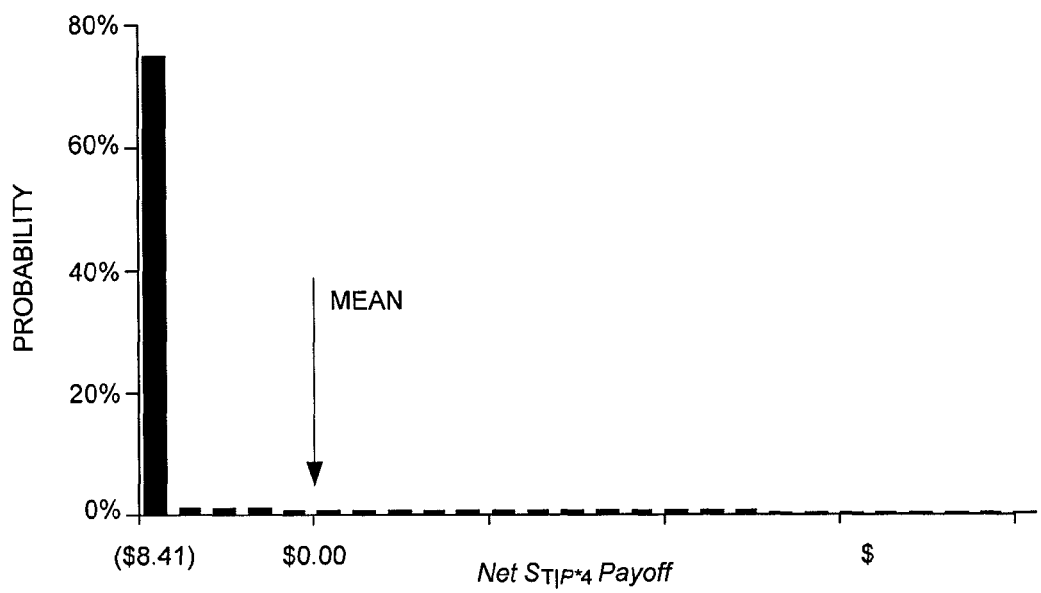
Figure 21:
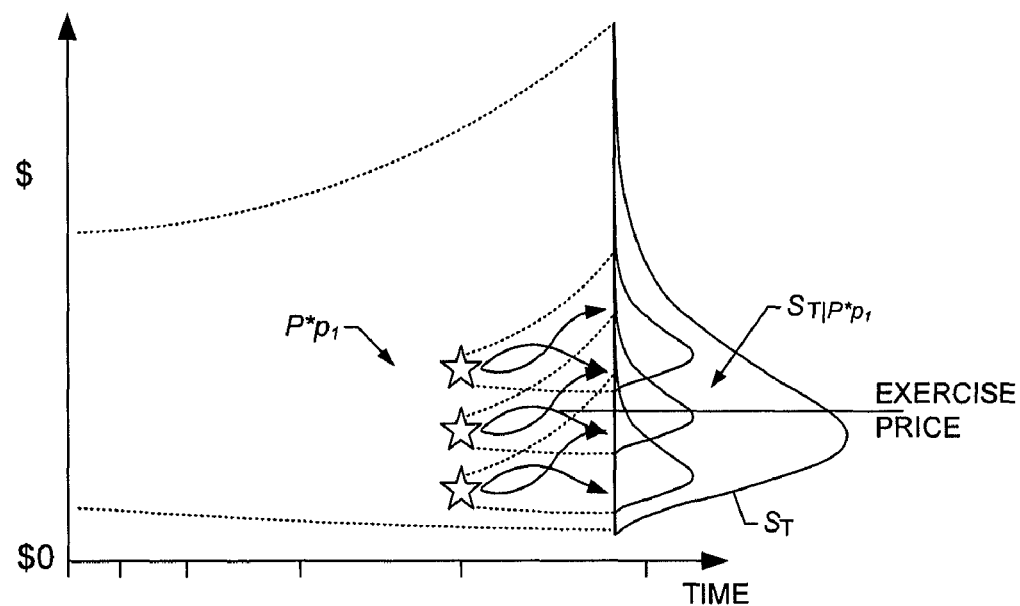
Figure 22:
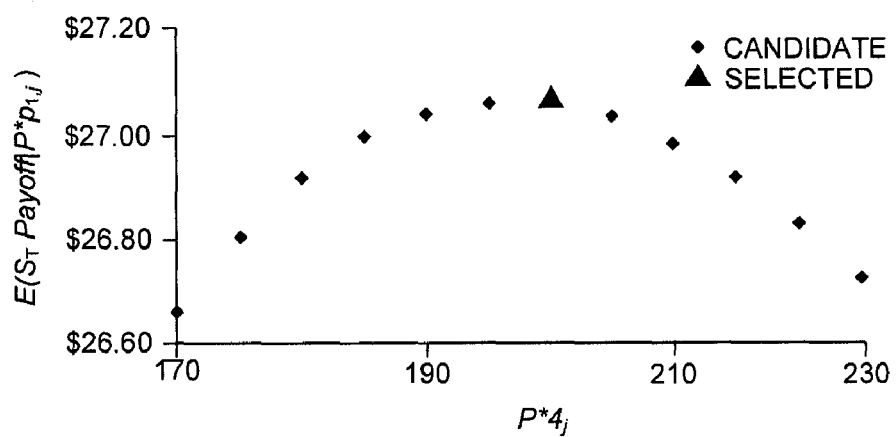
Figure 23:
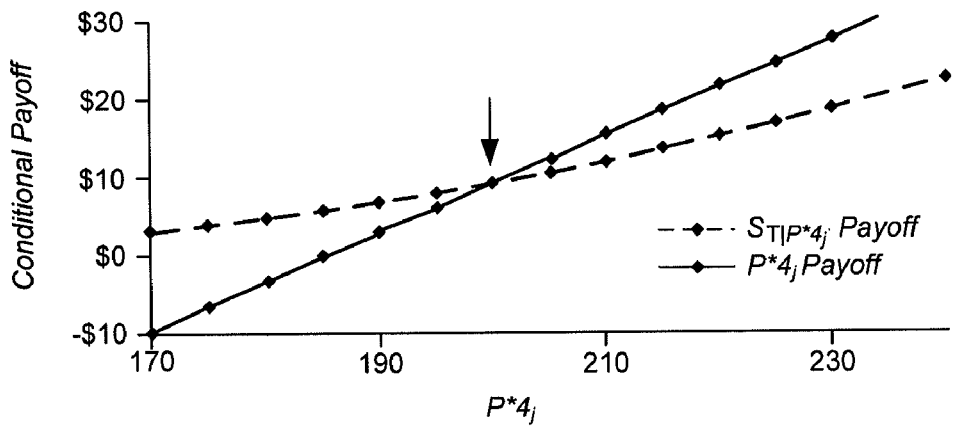
Figure 24:
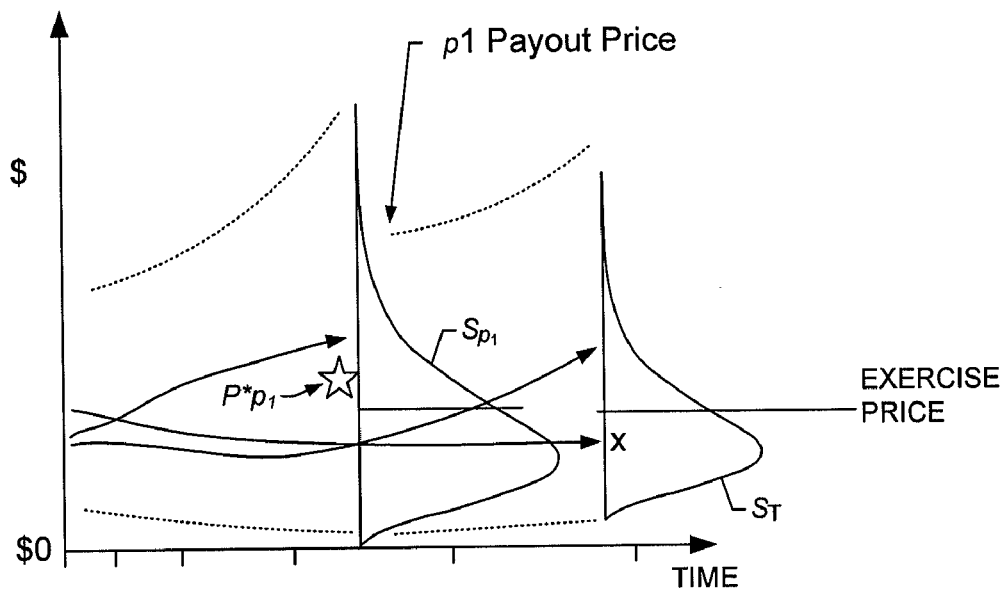
Figure 25:
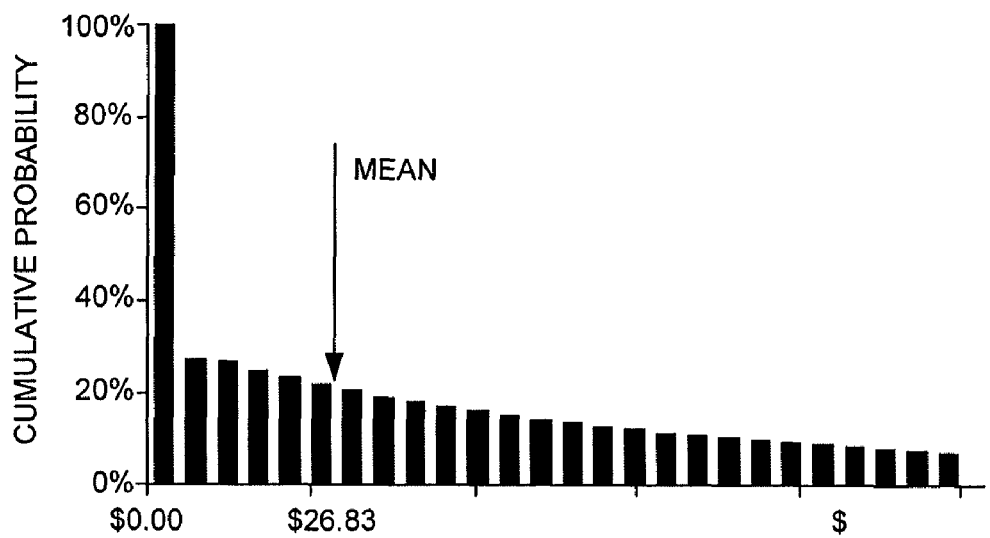
Figure 27:
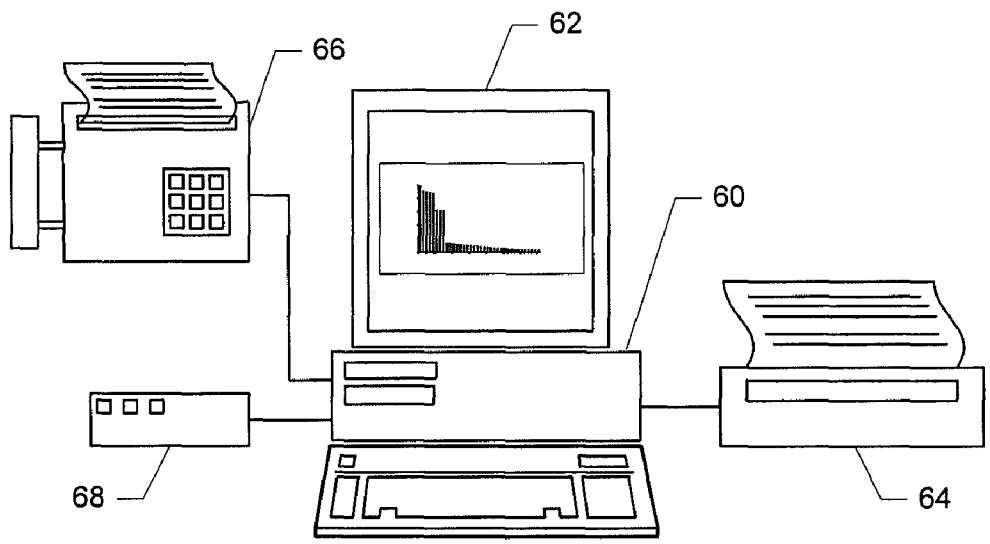
Figure 26:
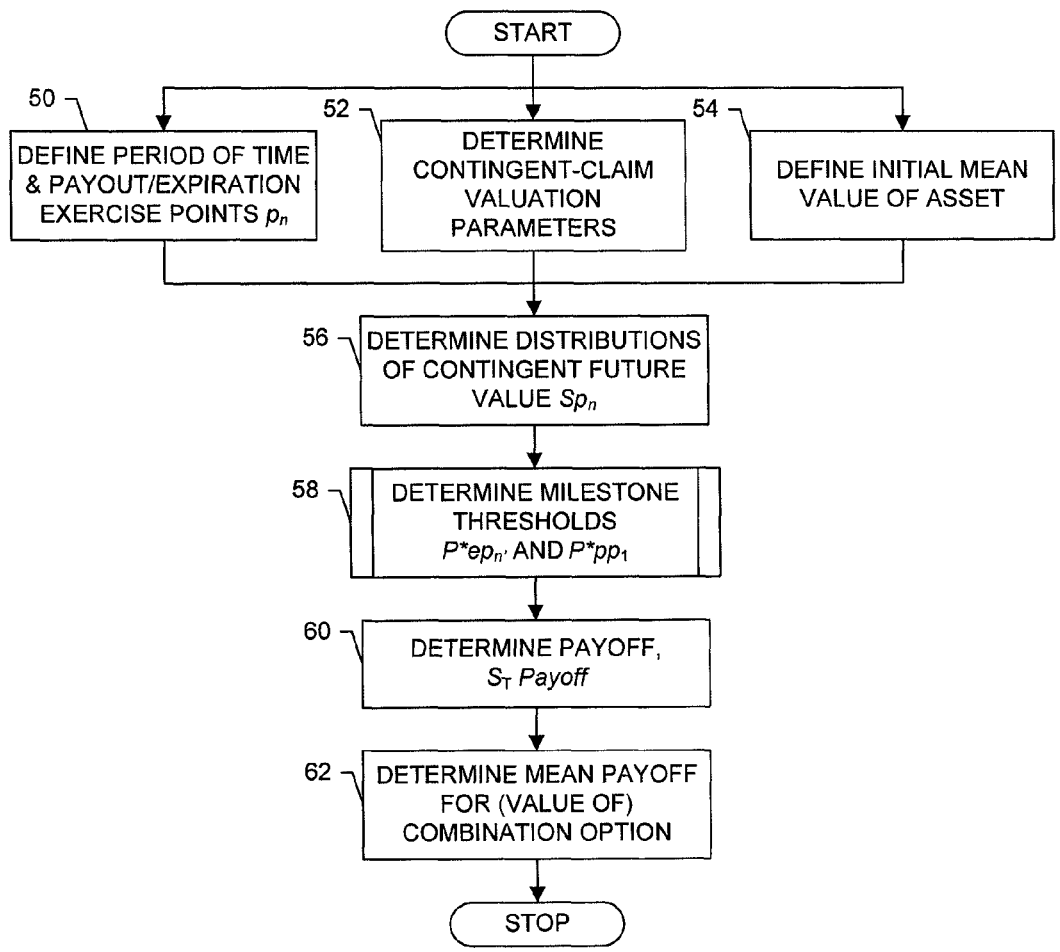

Having thus described the invention in general terms, reference will now be made to the accompanying drawings, which are not necessarily drawn to scale, and wherein:

FIG. 1 is a flowchart including various steps in a method of performing a contingent claim valuation of a multi-stage option, according to one exemplary embodiment of the present invention;

FIGS. 2a-2d are flowcharts including various steps in a method of determining a milestone threshold for performing a multi-stage option valuation in accordance with a "benefit-regret" technique, "arc" technique, "zero crossing" technique and "sorted list" technique, respectively, according to exemplary embodiments of the present invention;

FIG. 3 illustrates exemplary distributions of contingent future value defined for a number of exercise points for performing a multi-stage option valuation, in accordance with exemplary embodiments of the present invention;

FIG. 4 illustrates an exemplary distribution of contingent future benefits along with an estimated milestone threshold and conditional distribution of contingent future benefits for performing a multi-stage option valuation, in accordance with exemplary embodiments of the present invention;

FIG. 5 illustrates, for the distributions of FIG. 4, two of a number of different conditional paths the future value may take from one exercise point to another for performing a multi-stage option valuation, in accordance with exemplary embodiments of the present invention;

FIG. 6 illustrates a distribution of net conditional payoff values for a number of calculated net conditional payoff values for performing a multi-stage option valuation (conditioned on a milestone threshold at a next-to-last exercise point), in accordance with exemplary embodiments of the present invention;

FIG. 7 illustrates two of a number of different the conditional paths that conditional future value may take from one exercise point to another for three different candidate milestone thresholds for performing a multi-stage option valuation, in accordance with exemplary embodiments of the present invention;

FIG. 8 illustrates a number of different conditional paths that conditional future value may take from one exercise point to another, and if appropriate through that exercise point, for an estimated threshold for performing a multi-stage option valuation, in accordance with exemplary embodiments of the present invention;

FIG. 9 illustrates a distribution of net conditional payoff values for a number of calculated net conditional payoff values for performing a multi-stage option valuation (conditioned on a milestone threshold at a preceding exercise point), in accordance with exemplary embodiments of the present invention;

FIGS. 10a and 10b are graphs plotting a number of payoff values for a number of candidate milestone thresholds for respective exercise points, and including a selected milestone threshold associated with a maximum mean net payoff value for performing a multi-stage option valuation, in accordance with exemplary embodiments of the present invention;

FIGS. 11a and 11b are scatter plots of a number of mean net payoff values for a number of candidate milestone thresholds for respective exercise points, and including an exemplary quadratic function defined based thereon, for performing a multi-stage option valuation, in accordance with exemplary embodiments of the present invention;

FIG. 12 is a graph plotting a number of payoff values for a number of forecasted asset values for respective exercise points, and including a selected milestone threshold associated with a maximum mean net payoff value for performing a multi-stage option valuation, in accordance with exemplary embodiments of the present invention;

FIG. 13 illustrates a number of different conditional paths that conditional future value may take from one exercise point to another, and if appropriate through that exercise point, for an initial mean value of an asset, for performing a multi-stage option valuation, in accordance with exemplary embodiments of the present invention;

FIG. 14 illustrates a distribution of payoff values for a number of calculated payoff values for valuation of a multi-stage option, in accordance with exemplary embodiments of the present invention;

FIG. 15 is a flowchart including various steps in a method of performing a contingent claim valuation of an early-launch option, according to exemplary embodiments of the present invention;

FIGS. 16a-16d are flowcharts including various steps in a method of determining a milestone threshold for performing an early-launch option valuation in accordance with a "benefit-regret" technique, "arc" technique, "sorted list" technique and "conditional" technique, respectively, according to exemplary embodiments of the present invention;

FIG. 17 illustrates exemplary distributions of contingent future benefits defined for a payout point and expiration exercise point for performing an early-launch option valuation, in accordance with exemplary embodiments of the present invention;

FIG. 18 illustrates an exemplary distribution of contingent future benefits along with an estimated milestone threshold and conditional distribution of contingent future benefits for performing an early-launch option valuation, in accordance with exemplary embodiments of the present invention;

FIG. 19 illustrates, for the distributions of FIG. 18, two of a number of different conditional paths the future value may take from the payout point to the expiration exercise point for performing an early-launch option valuation, in accordance with exemplary embodiments of the present invention;

FIG. 20 illustrates a distribution of net conditional payoff values for a number of calculated net conditional payoff values for performing an early-launch option valuation (conditioned on a milestone threshold at the payout point), in accordance with exemplary embodiments of the present invention;

FIG. 21 illustrates two of a number of different the conditional paths that conditional future value may take from the payout point to the expiration exercise point for three different candidate milestone thresholds for performing an early-launch option valuation, in accordance with exemplary embodiments of the present invention;

FIG. 22 is a graph plotting a number of payoff values for a number of candidate milestone thresholds for the payout point, and including a selected milestone threshold associated with a maximum mean net payoff value for performing an early-launch option valuation, in accordance with exemplary embodiments of the present invention;

FIG. 23 is a graph plotting conditional payoffs at the expiration point and early exercise payoffs at the payout point for a number of candidate milestone thresholds, and identifying a milestone threshold for which the conditional payoff and early exercise payoff are approximately equal, for performing an early-launch option valuation, in accordance with exemplary embodiments of the present invention;

FIG. 24 illustrates a number of different conditional paths that conditional future value may take from an initial time to the payout point, and if appropriate through the payout point to the expiration point, for an initial mean value of an asset, in accordance with exemplary embodiments of the present invention;

FIG. 25 illustrates a distribution of payoff values for a number of calculated payoff values for valuation of an early-launch option, in accordance with exemplary embodiments of the present invention;

FIG. 26 is a flowchart including various steps in a method of performing a contingent claim valuation of a combination option, according to exemplary embodiments of the present invention; and FIG. 27 is a schematic block diagram of the system of one exemplary embodiment of the present invention embodied by a computer.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Exemplary embodiments of the present invention provide a system, method and computer program product for performing a valuation of a contingent claim, such as a call option or a put option, at a time prior to exercise of the contingent claim. The system, method and computer program product of exemplary embodiments of the present invention will be described in conjunction with the valuation of a contingent claim at an initial, present time. However, in determining the present value of a contingent claim, the system, method and computer program product of exemplary embodiments of the present invention may be capable of determining the present value of the contingent claim at any time prior to the exercise of the contingent claim such that subsequent discussion of present value therefore including a valuation at any time prior to the exercise of the contingent claim.

The system, method and computer program product may be utilized to perform a valuation of a variety of contingent claims. These contingent claims may be either calls or puts, although calls will be discussed hereinafter by way of example. In addition, the contingent claims may arise in a variety of contexts. For example, the contingent claim may involve the exercise of a real option, that is, an option that may be exercised at one or more points in time in the future in order to exploit or to continue to exploit an asset or activity, as opposed to a financial asset. In this regard, the real option may arise during a project analysis as discussed in detail below for purposes of example. However, the contingent claim may involve the exercise of other types of options, including financial options. In this regard, the system, method and computer program product of the present invention may provide advantages relative to the Black-Scholes method even in the context of evaluating financial options since the methodology of the present invention is not constrained by the assumptions upon which the Black-Scholes formula is premised.

Even with respect to project analysis, however, the system, method and computer program product are capable of performing a valuation of the contingent claims present in a wide variety of projects. In this regard, the project may have a pilot phase extending from some initial time to one or more subsequent points in time at which one or more contingent claims are to be exercised. If the contingent claim is exercised, such as by one of the participants contributing the necessary investment to the project, the project of this example will continue and may ultimately enter a commercial phase. As a more specific example, the project may involve research and development having staged investments in which each investment is essentially a contingent claim with the participant opting to continue with the research and development activity if the participant makes the necessary investment, but withdrawing from the research and development activity if the participant declines to make the investment. By way of other specific examples, the contingent claim may represent an option for the participant to adjust its production level at a subsequent time or an option to adjust its production mix in the future.

In addition to project analysis, the contingent claim may arise in the context of evaluation of an option to purchase or sell an asset, either in or out of the financial arena. In such contexts, the system, method and computer program product are capable of performing a valuation of the contingent claims for the purchase of a wide variety of assets. In this regard, the contingent claim may comprise an option to purchase an asset at a subsequent time at which the option is to be exercised, where the contingent claim is purchased at an initial time prior to the exercising the option. In a more specific example, then, the contingent claim may comprise an option to purchase an airline ticket with the option being purchased at some initial time, and the option capable of being exercised at some subsequent time to purchase of the airline ticket.

In another similar example, the contingent claim may comprise an option to obtain a full refund on an asset purchased at some initial time, with the option being exercisable at a subsequent time to obtain a full refund. In a more specific example, the asset may comprise an airline ticket purchased at some initial time, where the airline ticket is purchased with the option to obtain a refund of the purchase price at a subsequent time at which the option may be exercised. If such an option, or contingent claim, is exercised, the purchaser will then be able to obtain a refund of the purchase price of the ticket by selling the ticket back to the airline ticket vendor (e.g., the airline).

By way of other specific examples, the contingent claim may represent an option for the participant to purchase any of a number of different assets, particularly in instances in which the value of the asset (i.e., price consumers are willing to pay for the asset) can vary over time or between purchases, such as in the case of the purchase of cruise ship tickets, the purchase of tickets to the theatre or a sporting event, the rental of a hotel room, and the rental of a car. While various examples have been provided, it should be understood that the system, method and computer program product may be utilized to evaluate a number of other contingent claims, in the project analysis context, in the context of evaluation of an option to purchase or sell an asset (both in and out of the financial arena), and in other contexts, if so desired.

In accordance with exemplary embodiments of the present invention, the contingent-claim valuation may be performed based upon the future benefits that may flow from an underlying asset. The future benefits may include, for example, the gross operating profit associated with an asset or project following the exercise of a contingent claim at some subsequent time, t. Alternatively, for example, the future benefits may include the value associated with an asset following the exercise of a contingent claim at some subsequent time, t, where the value is determined based upon a price consumers are willing to pay for the asset less the cost of materials and labor. In the example in which the contingent claim is an option to purchase a ticket, the future benefits may include the ticket prices that consumers would be willing to pay at the time of exercising the option. It should be understood, however, that the future benefits may represent a wide variety of other types of future benefits depending upon the context.

In addition to future benefits, the contingent-claim valuation of exemplary embodiments of the present invention may be performed based upon the price of exercising the option at one or more points over the period of time. In the context of a call option, for example, an exercise price may be referred to as a contingent future investment and include the cost or purchase price of the contingent claim or call at some subsequent time t.

In accordance with exemplary embodiments of the present invention, the real option may comprise a "go, no-go" (or "traversal" or European) option including a contingent claim at a single, predefined exercise point, or an "early-launch" (or American) option including a contingent claim at a single, variable exercise point. Also, for example, the real option may comprise a "multi-stage" (or compound) option including a plurality of contingent claims at a plurality of exercise points over a period of time, where the exercise points may be predefined (go, no-go) and/or variable (early-launch). And in yet a further example, the real option may comprise a combination option comprising some combination of a go, no-go option, early-launch option and/or compound option. Performing a contingent-claim valuation in the context of a compound option, early-launch option and combination option, in accordance with exemplary embodiments of the present invention, is explained in greater detail below. For further information on performing a contingent-claim valuation in the context of a go, no-go option, in accordance with exemplary embodiments of the present invention, see the aforementioned U.S. patent application Ser. No. 10/309,659, and U.S. Pat. No. 6,862,579.

A. Multi-Stage Option

In accordance with one exemplary embodiment of the present invention, a contingent-claim valuation may be performed for a compound or multi-stage option including a plurality of exercise points over a period of time. Valuation of the multi-stage option will be described herein with reference to predefined (go, no-go) exercise points. It should be understood, however, that valuation of the multi-stage option may be equally performed with reference to variable (early-launch) exercise points.

Referring to FIG. 1, a method of performing a contingent claim valuation of a multi-stage option according to one exemplary embodiment of the present invention may begin by defining a period of time and the exercise points within that period of time, as shown in block 10. In this regard, the period of time can begin at t=0 and extend to t=T. The period of time can then be divided into a number of different time segments. Within the period of time, at least some of the time segments may correspond to respective exercise points, where an exercise point at t=T may be referred to as a final, or expiration, exercise point, and where the exercise points may be more generally referred to as "decision points" within the period of time. In one embodiment, for example, the time period T is defined such that each time segment and exercise point can be represented as an integer divisor of T, i.e., t=0, 1, 2, . . . T; and the number N of exercise points may be defined as $p_n$, n=1, 2, . . . N≦T, where each $p_n$ corresponds to a time segment of the period of time. Thus, for example, the period of time can be defined as a number of years (e.g., T=5) divided into a number of one-year time segments which, including the initial time t=0, totals the number of years plus one time segment (e.g., t=0, 1, 2, . . . 5). As used herein, each time segment begins at time t and ends at time t+1 (presuming the time segment is an integer divisor of T), and is defined by the beginning time t. Thus, time segment t=1 extends from time t=1 to time t=2. Similarly, time segment t=2 extends from t=2 to t=3. For an example of the time segments for a period of time, as well as the exercise points within that period of time, see Table 1 below.

TABLE 1

First Discount Rate 12% Second Discount Rate 5%

| | Time Segment | | | | | |
|---|---|---|---|---|---|---|
| | 0 | 1 | 2 | 3 | 4 | 5 |
| Exercise Point | | $p_1 = 1$ | | $p_2 = 3$ | | Expiration ($p_3 = 5$) |
| Uncertainty | 40% | 40% | 40% | 40% | 40% | 40% |
| Exercise Price | | $15.00 | | $30.00 | | $120.00 |

Before, during or after defining the time period, a number of parameters may be selected, determined or otherwise calculated for subsequent use in performing a contingent-claim valuation in accordance with this exemplary embodiment of the present invention, as shown in block 12. A number of these parameters, including first and second discount rates for determining or otherwise discounting future benefits and exercise prices at one or more exercise points, and uncertainties and exercise prices at the exercise point time segments, are described below, with examples provided in Table 1.

First and second discount rates, $r_1$ and $r_2$, which at different instances may be referred to or otherwise function as interest or growth rates, may be selected in any of a number of different manners. The first discount rate may be selected to take into account the risk associated with future benefits. In some embodiments, for example, the first discount rate comprises the weighted average cost of capital (WACC) since the WACC may provide an average discount rate with which many analysts are familiar. The second discount rate, on the other hand, may be selected to take into account the risk associated with the contingent claim or exercise price as known to those skilled in the art. In some embodiments, for example, the second discount rate comprises the risk free rate of discounting. In other embodiments, however, the exercise price may be subject to a non-market or corporate risk such that the appropriate second discount rate may be the corporate bond rate.

The first and second discount rates may be equal or different from one another. In this regard, selecting equal first and second discount rates may, for example, define a risk-neutral condition. Alternatively, for example, selecting a second discount rate less than the first discount rate may define a risk-averse condition. And although not described herein, a second discount rate may be selected to be greater than the first discount rate, if so desired. Further, for example, the first and second discount rates may be selected or otherwise set for the entire period of time, for each segment of the period of time, or more particularly for each exercise point within the period of time. Thus, respective first and/or second discount rates may remain the same or change from one time segment to the next, or more particularly from one exercise point to the next.

In addition to selecting the discount rates, uncertainty, or volatility, in the market including the asset may be selected or otherwise determined for each exercise point $p_n$, or more generally for each segment of the period of time t. The uncertainty may be selected or determined in any of a number of different manners, and may be the same or different from one segment to the next. In one exemplary embodiment, for example, the uncertainty may be determined based upon a model of returns, or growth rate (e.g., first discount rate), versus risk, or uncertainty, such as in the manner disclosed in the aforementioned U.S. patent application Ser. No. 10/453, 396. More particularly, in one embodiment for example, the returns may be modeled from two risk values and associated return values, as such may be determined by an estimator or the like. Then, assuming a typical linear relationship between risk and return (sometimes referred to as the CAPM or Capital Asset Pricing Model), the risk can be modeled as a linear function of returns based upon the two risk values and associated return values. For example, according to one exemplary embodiment, two uncertainty risk values may comprise 20% and 30%, with associated return values comprising 10.0% and 12.5%, respectively. With such values, risk can be modeled as a linear function of return as follows:

Risk(Return)=4×(Return−5)

where return and risk are expressed as percentages. For a further description of modeling risk as a function of returns, see U.S. patent application Ser. No. 10/453,395, entitled: Systems, Methods and Computer Program Products for Modeling a Monetary Measure for a Good Based Upon Technology Maturity Levels, filed Jun. 3, 2003, the content of which is incorporated by reference in its entirety.

Further to selecting the discount rates and selecting or otherwise determining the uncertainty, exercise prices $x_{p_n}$ may be selected or otherwise determined for the exercise points $p_n$. These exercise prices may be selected in any of a number of different manners, such as in accordance with any of a number of different conventional project analysis techniques. One or more of the exercise prices may each comprise a single payment that has a predetermined value. In various instances, however, one or more of the exercise prices may not have a single value, but may be best represented by a distribution of exercise prices that relate probabilities to each of a plurality of different exercise prices. For more information on such instances, see the aforementioned U.S. patent application Ser. No. 10/309,659, and U.S. Pat. No. 6,862,579.

Also before, during or after defining the time period, an initial, mean value of the asset may, but need not, be defined for the initial time segment (t=0), as shown in block 14. If so desired, the initial asset value can be defined in any of a number of different manners. For example, in one embodiment, the initial value can be defined as the present value of a forecasted market. For example, in another related embodiment, the initial value can be defined as the current value of a potential future product or technology. For a description of one technique of determining the maximum gross profitability, see U.S. patent application Ser. No. 10/453,727, entitled: Systems, Methods and Computer Program Products for Modeling Demand, Supply and Associated Profitability of a Good, filed Jun. 3, 2003, the content of which is hereby incorporated by reference in its entirety.

In addition, before, during or after defining the time period, a revenue or value distribution S can be determined or otherwise calculated for each exercise point $p_n$, as shown in block 16. In this regard, each value distribution may be considered a distribution of contingent future value (asset value) attributable to exercising the contingent claim at a respective exercise point. And more particularly, the value distribution at the expiration exercise point $p_N$ (t=T) may be considered a distribution of contingent future benefits attributable to exercising the contingent claim at the expiration exercise point. Each distribution of contingent future value $S_{p_n}$ may be determined in any of a number of different manners but, in one exemplary embodiment, is determined based upon the mean asset value at the respective exercise point and the standard deviation in time at the exercise point. The distributions $S_{p_n}$, and more particularly their mean values and standard deviations, may be derived in accordance with a continuous-time technique, or alternatively in accordance with a discrete-time technique. For one exemplary continuous-time technique for determining the mean value and standard deviation for defining a distribution $S_{p_n}$, see the aforementioned U.S. patent application Ser. No. 10/453,396. More particularly, and in accordance with another technique, the mean asset value at each exercise point may be determined as follows:

$$\mu_{S_{p_n}} = \mu_0 \times e^{r_1 p_n} \quad (1)$$

In equation (1), $\mu_{S_{p_n}}$ represents the mean asset value at the current exercise point $p_n$, $\mu_0$ represents the initial mean asset value at the initial time segment (t=0), and $r_1$ represents the first discount rate (growth rate in this instance). Continuing the example of Table 1 above, see Table 2 for an example of the initial mean value and the mean values at each of the exercise point $p_n$, n=1, 2, 3 (t=1, 3, 5).

TABLE 2

| Initial Mean Value $100.00 | | | | | |
|---|---|---|---|---|---|
| | Time Segment | | | | |
| | 0 | 1 | 2 | 3 | 4 | 5 |
| Exercise Point | | $p_1 = 1$ | | $p_2 = 3$ | | Expiration ($p_3 = 5$) |
| Mean Value | $100.00 | $112.75 | | $143.33 | | $182.21 |
| Standard Deviation | $ 0.00 | $ 46.97 | | $112.50 | | $201.72 |
| Correlation Coefficient | | 0.58 ($p_1, p_3$) | | 0.77 ($p_5, p_3$) | | 0.45 ($p_1, p_5$) |

In accordance with one technique, the standard deviation may be determined as follows:

$$\sigma_{S_{p_n}} = \mu_{S_{p_n}} \times \sqrt{e^{u_n^2 \times p_n} - 1} \quad (2)$$

In equation (2), $\sigma_{S_{p_n}}$ represents the standard deviation for exercise point $p_n$; and $u_n$ represents the uncertainty value at the respective exercise point, where the uncertainty may be represented as a decimal. For an example of the standard deviations for exercise points $p_n$, n=1, 2, 3 (t=0, 1, 3, 5), see Table 2.

As indicated above, the distributions $S_{p_n}$ may be alternatively determined in accordance with a discrete-time technique. For one exemplary discrete-time technique for determining the mean value and standard deviation for defining a distribution $S_{p_n}$, see the aforementioned U.S. patent application Ser. No. 10/453,395. In accordance with such techniques, an initial, mean asset value need not be defined for the initial time segment (t=0). Instead, the mean and standard deviation for defining a distribution at an exercise point may be determined based upon a quantitative measure of maturity of a technology of the asset (the measure of maturity being associated with a risk/return distribution), as well as a mean value associated with the technology.

After determining the mean asset value and standard deviation, a value distribution of contingent future value $S_{p_n}$ can be determined for the respective exercise point $p_n$ by defining each distribution of contingent future value according to the respective mean asset value and standard deviation. The distribution of contingent future value can be represented as any of a number of different types of distributions but, in one embodiment, the distribution of contingent future value is defined as a lognormal distribution. In this regard, FIG. 3 illustrates distributions of contingent future value $S_{p_n}$ defined for exercise points $p_n$, n=1, 2, 3 (t=1, 3, 5) for the example in Tables 1 and 2.

Further to determining distributions of contingent future value, relationships between respective distributions, and in particular between respective discrete-time distributions, for example, may be established. These relationships may be established in a number of different manners, such as via a correlation coefficient, as is known to those skilled in the art. The correlation coefficient may be selected or determined in any one of a number of manners. In one embodiment, for example, the correlation coefficient ($\text{Coeff}_{p_a,p_b}$) between a distribution of contingent future value at a particular exercise point $p_a$ (i.e., $S_{p_a}$), and the distribution of contingent future value at a another exercise point $p_b$ (i.e., $S_{p_b}$), may be determined as follows:

$$\text{Coeff}_{p_a,p_b} = \sqrt{\frac{u_a^2 p_a}{u_b^2 p_b}} \quad (3)$$

A correlation coefficient may similarly be selected for the expiration exercise point $p_N$ (t=T) being the particular exercise point $p_a$, but instead of being referenced to the expiration exercise point and a subsequent exercise point in equation (3) above, the respective correlation coefficient may refer back to the first exercise point or another preceding exercise point as the particular exercise point (e.g., $p_a=p_1$) and to the expiration exercise point as the other, subsequent exercise point (i.e., $p_b=p_N$). For an example of the correlation coefficients between distributions of contingent future value at a number of exercise points, see Table 2 above.

Irrespective of exactly how the distributions of contingent future value $S_{p_n}$ are determined, the value of the multi-stage option may be determined or otherwise calculated based thereon. Before determining the value of the multi-stage option, however, exemplary embodiments of the present invention may account for situations in which a reasonably prudent participant may not exercise an option at a particular exercise point (and thus any remaining exercise points). More particularly, exemplary embodiments of the present invention may calculate or otherwise determine a milestone threshold for at least some, if not all, of the exercise points, where each milestone threshold represents the minimum asset value at which a reasonably prudent participant will exercise the contingent claim at that exercise point.

As will be appreciated, one of the more important tasks in data mining is to determine a milestone that distinguishes a good decision from a bad decision. In the context of a contingent claim, for example, a good decision may be considered one whereby a decision to exercise the claim results in a discounted asset value (benefits) greater than or equal to the price required to achieve that value (current and any subsequent exercise prices) resulting in a minimum required rate of return on an initial investment; and a bad decision may be considered one that results in an asset value less than the price required to achieve that value resulting in a negative rate of return on an initial investment. To facilitate making such a decision (exercising an option), information from which the decision is made, such as the asset value at an exercise price, may be classified as to the outcome suggested or otherwise predicted by that information. Such prediction classifiers may include true positive (TP) and true negative (TN) whereby information from which the decision is made accurately suggests the outcome, whether a positive outcome (value greater than or equal to exercise price) or a negative outcome (value less than exercise price). In the case of a contingent claim, for example, a true positive indicator typically leads to a decision to exercise the claim and a resulting benefit; and a true negative indicator typically leads to a decision to not exercise the claim and an averted failure. However, prediction classifiers may also include false positive (FP) and false negative (FN) whereby such information falsely reflects the outcome. That is, information may be classified as a false positive when that information suggests a positive outcome, but a negative outcome actually follows from making the respective decision, thereby resulting in a regretful decision. Similarly, information may be classified as a false negative when that information suggests a negative outcome, but a positive outcome would actually follow from making the respective decision. But since many would not follow a negative indicator, false negatives typically result in decision omissions.

In view of the foregoing, performing a contingent claim valuation may include determining or otherwise calculating milestone thresholds P* at the exercise points before the expiration exercise point $p_n$, n=1, 2, . . . N−1, such as to facilitate maximizing benefits (TP) and minimize regrets (FP) and omissions FN on a risk-adjusted basis, as shown in block 18. In this regard, the milestone threshold for an exercise point P*$p_n$ may correspond to the asset value at the respective exercise point likely to result in a risk-adjusted, discounted final value at the expiration time segment substantially equal to the risk-adjusted, discounted exercise price at the current exercise point and any subsequent exercise points. In project management, for example, it may be desirable to have indicators or milestones that may help determine whether or not a project is proceeding along a trajectory that is at least equal to or exceeds a minimum rate of return for a given investment. In many current project management practices, however, the establishment of project milestones is ad hoc, often without regard to required rates of return, particularly with respect to intermediate decision points. It may therefore be desirable to establish a quantified milestone that may indicate a minimum risk-adjusted required rate of return at an intermediate decision point.

The milestone threshold for each exercise point may be determined or otherwise calculated in any of a number of different manners. Also, the milestone threshold for each exercise point may be determined in any order relative to the milestone threshold for any other exercise point. In one exemplary embodiment, however, the milestone thresholds may be determined in reverse sequential order beginning with the last exercise point $p_{N-1}$ before the expiration exercise point $p_N$. Further, the milestone thresholds $P^*p_n$ may be determined in accordance with a number of different techniques, such as in accordance with a "benefit-regret" technique, "arc" technique, "zero crossing" technique or "sorted list" technique for determining a milestone threshold. Each of the aforementioned techniques will now be described below with reference to FIGS. 2a-2d.

1. Benefit-Regret Technique for Determining Milestone Thresholds

Figure 2A:
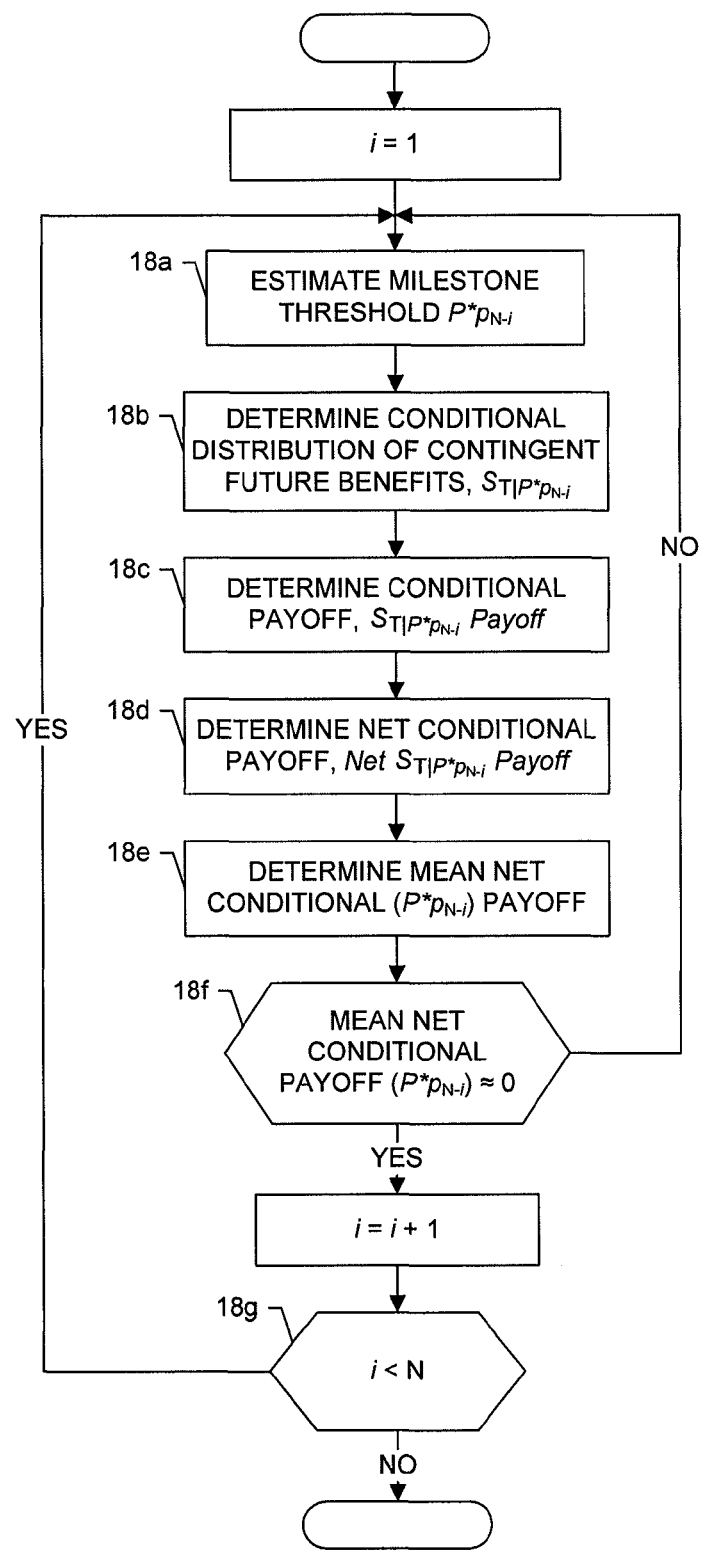

More particularly, determining each milestone threshold according to the benefit-regret technique of one exemplary embodiment of the present invention may include estimating a milestone threshold at the last exercise point $P^*p_{N-1}$ before the expiration exercise point $p_N(t=T)$, as shown in FIG. 2a, block 18a. The milestone threshold for this next-to-last exercise point within the period of time may be estimated in any of a number of different manners. For example, the milestone threshold at the next-to-last exercise point may be estimated to be approximately equal to the determined mean asset value at that exercise point $\mu_{S_{p_{N-1}}}$ (see equation (1)). Continuing the example of Tables 1 and 2, see Table 3 below for a more particular example of an estimated milestone threshold at the next-to-last exercise point $p_2$ (t=3) (the respective milestone threshold in the example being represented by $P^*p_2=P^*3$).

TABLE 3

| | Time Segment | | | | | |
|---|---|---|---|---|---|---|
| | 0 | 1 | 2 | 3 | 4 | 5 |
| Exercise Point | | $p_1 = 1$ | | $p_2 = 3$ | | Expiration ($p_3 = 5$) |
| Estimated Threshold ($P^*p_2$) | | | | $145.00 | | |
| $S_{5|P^*3}$ Mean Value | | | | | | $184.33 |
| $S_{5|P^*3}$ Standard Deviation | | | | | | $113.20 |

Irrespective of exactly how the milestone threshold at the next-to-last exercise point $P^*p_{N-1}$ is estimated, a value distribution at the expiration exercise point $p_N(t=T)$ may thereafter be determined, where the value distribution is conditioned on the estimated milestone threshold at the next-to-last exercise point, as shown in block 18b. This value distribution may be considered a conditional distribution of contingent future benefits at the expiration exercise point $p_N(t=T)$, conditioned on the estimated asset value (milestone threshold) at the next-to-last exercise point $P^*p_{N-1}$. The conditional distribution of contingent future benefits $S_{T|P^*p_{N-1}}$ may be determined in any of a number of different manners. In one embodiment, for example, the conditional distribution of contingent future benefits may be determined based upon a conditional mean asset value at the expiration exercise point $\mu_{S_{T|P^*p_{N-1}}}$ and a conditional standard deviation in time at the expiration exercise point $\sigma_{S_{T|P^*p_{N-1}}}$, such as in accordance with the following:

$$\mu_{S_{T|P^*p_{N-1}}} = P^*p_{N-1} \times e^{r1(T-pN-1)} \quad (4)$$

$$\sigma_{S_{T|P^*p_{N-1}}} = \mu_{S_{T|P^*p_{N-1}}} \times \sqrt{e^{u^2 \times (T-pN-1)} - 1} \quad (5)$$

For an example of the conditional mean value and standard deviation for a conditional distribution of future benefits at the expiration exercise point $p_N(t=T)$ of the example of Tables 1 and 2, and the estimated milestone threshold at the next-to-last exercise point $P^*p_{N-1}$, see Table 3.

After determining the conditional mean and standard deviation at the expiration exercise point, a conditional distribution of contingent future benefits at the expiration exercise point $S_{T|P^*p_{N-1}}$ can be determined by defining the conditional distribution according to the respective mean value and standard deviation. Again, the conditional distribution of contingent future benefits can be represented as any of a number of different types of distributions but, in one embodiment, the conditional distribution of contingent future benefits is defined as a lognormal distribution. In this regard, see FIG. 4 for a distribution of contingent future benefits $S_T$ at the expiration exercise point p3, (t=5), along with an estimated milestone threshold $P^*p_{N-1}$ and conditional distribution of contingent future benefits $S_{T|P^*p_{N-1}}$, for the example of Tables 1, 2 and 3.

Irrespective of exactly how the conditional distribution of contingent future benefits at the expiration exercise point $S_{T|P^*p_{N-1}}$ is determined, a conditional payoff or profit may be determined or otherwise calculated based thereon, as shown in block 18c. The conditional payoff can be determined in any of a number of different manners, including in accordance with the DM algorithm, as explained in the aforementioned U.S. patent application Ser. No. 10/309,659, and U.S. Pat. No. 6,862,579. In accordance with the DM algorithm, the conditional distribution of contingent future benefits may be discounted by the first discount rate $r_1$ (e.g., WACC) to present value at t=0, and the exercise price at the expiration exercise point $p_N(t=T)$ may be discounted by the second discount rate $r_2$ (e.g., risk-free rate) to present value at t=0.

In accordance with the DM algorithm, the conditional payoff at the expiration exercise point may be determined based upon the present value conditional distribution of contingent future benefits and the present value of the exercise price at the expiration exercise point (contingent future investment). The conditional payoff may be determined as the expected value of the difference between the present value conditional distribution of contingent future benefits and the present value of the exercise price at the expiration exercise point (e.g., contingent future investment) taking into account the relative probabilities associated with distribution of difference values. In determining the expected value of the difference between the present value distribution of contingent future benefits and the present value of the contingent future investment, a limit on the minimum permissible difference (minimum predefined value) may be established to take into account those situations that may exist at the time at which the contingent claim is to be exercised which would cause a participant to fail to exercise the contingent claim. In this regard, limiting the minimum permissible difference to zero, for example, may take into account those situations in which the exercise of the contingent claim would otherwise create a loss since a reasonably prudent participant will fail to exercise the contingent claim in these situations. And limiting the minimum possible difference to values other than zero, for example, may take into account those situations in which reserved assets may be sold at the expiration exercise point. Thus, written notationally, the conditional payoff $S_{T|P^*p_{N-1}}$ Payoff may be determined as follows:

$$S_{T|P^*p_{N-1}} \text{Payoff} = E[\max(S_{T|P^*p_{N-1}} e^{-r1T} - x_T e^{-r2T}, 0)] \quad (6)$$

In equation (6), E represents an expected value (mathematical expectation), and $x_T$ represents the exercise price (contingent future investment) at the expiration exercise point $p_N$ (t=T) (e.g., $120.00). Accordingly, a conditional payoff may be determined as a function of conditional future benefit values $s_{T|P^*p_{N-1}}$ from the conditional distribution of contingent future benefits $S_{T|P^*p_{N-1}}$ in accordance with the following:

$$S_{T|P^*p_{N-1}} \text{Payoff} = \max(s_{T|P^*p_{N-1}} e^{-r1T} - x_T e^{-r2T}, 0) \quad (6a)$$

Also, in equations (6) and (6a), "0" represents a minimum predefined value of zero, although it should be understood that the minimum predefined value may be a number of different values other than zero.

As or after determining the conditional payoff at the expiration exercise point $p_N$ (t=T), the net conditional payoff may be calculated or otherwise determined by accounting for the exercise price at the next-to-last exercise point $p_{N-1}$ (e.g., t=3), as shown in block 18d. Similar to the conditional payoff, the net conditional payoff can be determined in any of a number of different manners. In one embodiment, for example, the net conditional payoff may be determined by discounting the exercise price at the next-to-last exercise point by the second discount rate $r_2$ (e.g., risk-free rate), and subtracting that discounted exercise price from the conditional payoff $S_{T|P^*p_{N-1}}$ Payoff. Written notationally, for example, the net conditional payoff Net $S_{T|P^*p_{N-1}}$ Payoff may be determined as follows:

$$Net S_{T|P^*p_{N-1}} Payoff = S_{T|P^*p_{N-1}} Payoff - x_{p_{N-1}} e^{-r2pN-1} \quad (7)$$

where $x_{p_{N-1}}$ represents the exercise price (e.g., contingent future investment) at the next-to-last exercise point $p_{N-1}$ (e.g., $x_{p_{N-1}}$=$30.00).

From the net conditional payoff, the mean net conditional payoff may be determined, as shown in block 18e. For example, the mean net conditional payoff Mean Net $S_{T|P^*p_{N-1}}$ Payoff may be determined by selecting or otherwise forecasting a number of (e.g., 10,000) conditional future benefit values $s_{T|P^*p_{N-1}}$ from the conditional distribution of contingent future benefits $S_{T|P^*p_{N-1}}$; calculating, for those forecasted conditional future benefit values, conditional payoff and net conditional payoff values such as in accordance with equations (6a) and (7); and calculating or otherwise determining the mean of the calculated net conditional payoff values. In this regard, the aforementioned steps may be performed to effectuate equations (6) and (7), including the expected value expression of equation (6). The conditional future benefit values $s_{T|P^*p_{N-1}}$, and more generally values selected or otherwise forecasted from distributions as described herein, can be selected or otherwise forecasted in any of a number of different manners. For example, these values can be selected or otherwise forecasted according to a method for randomly selecting a value from a distribution, such as the Monte Carlo technique for randomly generating values.

FIG. 5 continues the example of FIG. 4, and illustrates two of a number of different a conditional paths the asset value may take from the next-to-last exercise point to the expiration exercise point for an estimated threshold, where one of the paths represents a true positive (TP) leading to a resulting benefit, and the other path represents a false positive (FP) leading to a resulting regret. And FIG. 6 furthers the example by illustrating a distribution of net conditional payoff values for a number of calculated net conditional payoff values (conditioned on a milestone threshold at the next-to-last exercise point $P^*p_{N-1}$).

As indicated above, the milestone threshold $P^*p_n$ is intended to result in a final discounted value (payoff value) at the expiration exercise point substantially equal to the discounted exercise price at the current exercise point and any subsequent exercise points. In other words, the milestone threshold is intended to result in an expected net conditional payoff value of approximately zero at time t=0, as shown in FIG. 2a, block 18f, and in FIG. 6. Thus, after determining the mean net conditional payoff value Mean Net $S_{T|P^*p_{N-1}}$ Payoff, if the mean net conditional payoff value does not equal approximately zero, another milestone threshold $P^*p_{N-1}$ may be estimated at the next-to-last exercise point $P^*p_{N-1}$. The method may then repeat determining a conditional distribution of contingent future benefits $S_{T|P^*p_{N-1}}$, determining a conditional payoff $S_{T|P^*p_{N-1}}$ Payoff, net conditional payoff Net $S_{T|P^*p_{N-1}}$ Payoff and mean net conditional payoff Mean Net $S_{T|P^*p_{N-1}}$ Payoff, and determining if the mean net conditional payoff value equals approximately zero. The method may continue in this manner until an estimated milestone threshold $P^*p_{N-1}$ results in a mean net conditional payoff value equal to approximately zero. This estimated milestone threshold may then be considered the milestone threshold at the respective exercise point. FIG. 7 illustrates two of a number of different conditional paths future benefits may take from the next-to-last exercise point to the expiration exercise point for three different candidate milestone thresholds, again in the context of the example provided above.

Written in other terms, it may be said that the threshold milestone $P^*p_{N-1}$ at the next-to-last exercise point $p_{N-1}$ solves the following expression:

$$E[Z_0^T(r_1,r_2)|_{(s_{T|P^*pN-1}=P^*pN-1)}] \approx x_{p_{N-1}} e^{-r2pN-1},$$

$$Z_{t_1}^{t_2}(r_1,r_2) = E[s_{t_2} e^{-r1(t_2-t_1)} - x_{t_2} e^{-r2(t_2-t_1)}]^+$$

In the preceding expressions, Z represents the aforementioned DM algorithm as a function of the first and second discount rates $r_1$ and $r_2$, between two successive time segments $t_1$ and $t_2$ (e.g., $t_1$=0, and $t_2$=T), and may correspond to a discounted payoff between the respective time segments. Also in the expression Z, the "+" superscript represents a maximization function limiting the discounted payoff to a minimum predefined value, such as zero. See, for example, equation (6) above. Thus, the above expression may be interpreted as solving for the case where the discounted payoff at the expiration exercise point (t=T), conditioned on contingent future benefits at the next-to-last exercise point equaling the estimated milestone threshold for that exercise point, equals approximately the discounted exercise price at the next-to-last exercise point.

As shown in block 18g, if or once the estimated milestone threshold $P^*p_{N-1}$ results in a mean net conditional payoff value equal to approximately zero, a milestone threshold may be estimated for any exercise points preceding the next-to-last exercise point, such as by starting with the exercise point $p_{N-2}$ immediately preceding the next-to-last exercise point $p_{N-1}$, as again shown in block 18a. As with the milestone threshold at the next-to-last exercise point, the milestone threshold at the preceding exercise point $P^*p_{N-2}$ may be estimated in any of a number of different manners. Again, for example, the milestone threshold at the preceding exercise point may be estimated to be substantially equal to the determined mean asset at that exercise point, as explained above. Continuing the example of Tables 1, 2 and 3, see Table 4 below for a more particular example of an estimated milestone threshold at the preceding exercise point $p_1$ (t=1) (the respective milestone threshold in the example being represented by $P^*p_1=P^*1$).

TABLE 4

|  | Time Segment | | | | |
| --- | --- | --- | --- | --- | --- |
|  | 0 | 1 | 2 | 3 | 4 | 5 |
| Exercise Point |  | $p_1$ = 1 |  | $p_2$ = 3 |  | Expiration ($p_3$ = 5) |
| Estimated Threshold ($P^*p_1$) |  | $101.00 |  |  |  |  |
| $S_{5|P^*1}$ & $S_{3|P^*1}$ |  |  |  | $128.40 |  | $163.22 |

TABLE 4-continued

| | Time Segment | | | | | |
|---|---|---|---|---|---|---|
| | 0 | 1 | 2 | 3 | 4 | 5 |
| Mean Values $S_{5|P*_1}$ & $S_{3|P*_1}$ Standard Dev. | | | | $78.85 | | $154.54 |

Distributions of contingent future value at the expiration exercise point $p_N$ (t=T) and the next-to-last exercise point $p_{N-1}$ may be determined, where both the value distribution at the expiration exercise point $S_{T|P*p_{N-2}}$, and the value distribution at the next-to-last exercise point $S_{p_{N-1}|P*p_{N-2}}$, are conditioned on the estimated milestone threshold at the preceding exercise point, as again shown in block 18b. Again, the value distributions may be considered distributions of contingent future value at the respective exercise points (i.e., expiration exercise point $p_N$ and next-to-last exercise point $p_{N-1}$), conditioned on the estimated value of the asset (milestone threshold) at the preceding exercise point $p_{N-2}$. And more particularly, the distribution at the expiration exercise point may be considered a distribution of contingent future benefits attributable to exercising the contingent claim at the expiration exercise point, conditioned on the aforementioned estimated asset value.

Each of the conditional distributions of contingent future value may be determined in any of a number of different manners. In one embodiment, for example, the conditional distributions of contingent future value may be determined based upon a conditional mean asset value at the respective exercise price $\mu_{S_{pn|P*pN-2}}$ and conditional standard deviation in time for the respective exercise price $\sigma_{S_{pn|P*pN-2}}$, such as in accordance with the following:

$$\mu_{S_{pn|P*pN-2}} = P*p_{N-2} \times e^{r_1(pn-pN-2)} \quad (8)$$

$$\sigma_{S_{pn|P*pN-2}} = \mu_{S_{pn|P*pN-2}} \times \sqrt{e^{v^2 \times (pn-pN-2)} - 1} \quad (9)$$

In the preceding equations (8) and (9), $p_n = p_N$ (t=T) for the conditional distribution of contingent future benefits (conditional distribution of contingent future value) at the expiration exercise point; and $p_n = p_{N-1}$ for the conditional distribution of contingent future value at the next-to-last exercise point. For examples of the conditional mean values and standard deviations for conditional distributions of contingent future value at the expiration exercise point $p_N$ (t=T) and the next-to-last exercise point $p_{N-1}$ of the example of Tables 1, 2 and 4, and the estimated milestone threshold at the preceding exercise point $P*p_{N-2}$, see Table 4.

After determining the conditional means and standard deviations at the expiration exercise point and the next-to-last exercise point, conditional distributions of contingent future value at the expiration exercise point $S_{T|P*p_{N-2}}$ and at the next-to-last exercise point $S_{p_{N-1}|P*p_{N-2}}$ can be determined by defining the conditional distributions according to their respective conditional means and standard deviations. Similar to the others, these conditional distributions of contingent future value can be represented as any of a number of different types of distributions but, in one embodiment, are defined as log-normal distributions.

Irrespective of exactly how the conditional distributions of contingent future value at the expiration exercise point $p_N$ (t=T) and next-to-last exercise point $p_{N-1}$ are determined, a conditional payoff or profit may be determined or otherwise calculated, as again shown in block 18c. The conditional payoff can be determined in any of a number of different manners, including in accordance with the aforementioned DM algorithm. In accordance with the DM algorithm, the conditional distribution of contingent future benefits at the expiration exercise point $p_N$ (t=T) and the exercise price at the expiration exercise point may be discounted by the first discount rate $r_1$ and the second discount rate $r_2$, respectively, to present value at t=0, such as in a manner similar to that described above. Then, an intermediate conditional payoff may be determined based upon the present value conditional distribution of contingent future benefits and the present value of the exercise price at the expiration exercise point, such as by determining the expected value of the difference therebetween, and including limiting the minimum permissible difference to a minimum predefined value, such as zero.

As or after determining the intermediate conditional payoff, the conditional payoff may be determined based thereon and accounting for the exercise price at the next-to-last exercise point $p_{N-1}$. In this regard, similar to above, the conditional payoff may be determined by discounting the exercise price at the next-to-last exercise point $p_{N-1}$ by the second discount rate $r_2$ to present value at t=0, such as in a manner similar to that described above. Then, the conditional payoff may be determined based upon the intermediate conditional payoff and the present value of the exercise price at the next-to-last exercise point, such as by determining the expected value of the difference therebetween. Similar to limiting the minimum permissible difference, determining the conditional payoff may be further conditioned on the asset value at the next-to-last exercise point $p_{N-1}$ ($S_{p_{N-1}|P*p_{N-2}}$) being at least as much as (i.e., $\geqq$) the estimated milestone threshold at the next-to-last exercise point $P*p_{N-1}$. In this regard, further conditioning the conditional payoff at the next-to-last exercise point takes into account those situations in which the asset value at the next-to-last exercise point $p_{N-1}$ ($S_{p_{N-1}|P*p_{N-2}}$) is less than the estimated milestone threshold at the next-to-last exercise point $P*p_{N-1}$, which may suggest a negative outcome (TN) and lead a reasonably prudent participant to forego exercising the contingent claim. Thus, written notationally, the conditional payoff $S_{T|P*p_{N-2}}$ Payoff may be determined as follows:

IF $S_{p_{N-1}|P*p_{N-2}} \geqq P*p_{N-1}$, then $S_{T|P*p_{N-2}}$Payoff=$E[\max(S_{T|P*p_{N-2}}e^{-r_1 T} - x_T e^{-r_2 T}, 0)] - x_{p_{N-1}}e^{-r_2 p_{N-1}}$;

else, $S_{T|P*p_{N-2}}$Payoff=0 (10)

And as a function of conditional asset values $s_{p_{N-1}|P*p_{N-2}}$ and $s_{T|P*p_{N-2}}$ from respective conditional distributions $S_{p_{N-1}|P*p_{N-2}}$ and $S_{T|P*p_{N-2}}$, the payoff $S_{T|P*p_{N-2}}$ Payoff may be determined as follows:

IF $s_{p_{N-1}|P*p_{N-2}} \geqq P*p_{n-1}$, then $S_{T|P*p_{N-2}}$Payoff=$\max(s_{T|P*p_{N-2}}e^{-r_1 T} - x_T e^{-r_2 T}, 0) - x_{p_{N-1}}e^{-r_2 p_{N-1}}$;

else, $S_{T|P*p_{N-2}}$Payoff=0

As or after determining the conditional payoff, the net conditional payoff may be calculated or otherwise determined by accounting for the exercise price at the preceding exercise point $p_{N-2}$ (e.g., t=1), as again shown in block 18d. Similar to the conditional payoff, the net conditional payoff can be determined in any of a number of different manners. In one embodiment, for example, the net conditional payoff may be determined by discounting the exercise price at the preceding exercise point by the second discount rate $r_2$ (e.g., risk-free rate), and subtracting that discounted exercise price from the conditional payoff. Written notationally, for example, the net conditional payoff Net $S_{T|P^*p_{N-2}}$ Payoff may be determined as follows:

$$\text{Net}S_{T|P^*p_{N-2}}\text{Payoff}=S_{T|P^*p_{N-2}}\text{Payoff}-x_{p_{N-2}}e^{-r_2p_{N-2}} \quad (11)$$

where $x_{p_{N-2}}$ represents the exercise price (e.g., contingent future investment) at the preceding exercise point $p_{N-2}$ (e.g., $x_{p_{N-2}}=\$15.00$).

From the net conditional payoff, the mean net conditional payoff may be determined, as again shown in block 18e. For example, the mean net conditional payoff Mean Net $S_{T|P^*p_{N-2}}$ Payoff may be determined by selecting or otherwise forecasting a number of conditional asset values at the expiration exercise point $s_{T|P^*p_{N-2}}$ and the next-to-last exercise point $s_{p_{N-1}|P^*p_{N-2}}$ from respective conditional distributions of contingent future value $S_{T|P^*p_{N-2}}$ and $S_{p_{N-1}|P^*p_{N-2}}$; calculating, for those forecasted conditional future asset values, conditional payoff and net conditional payoff values such as in accordance with equations (10a) and (11); and calculating or otherwise determining the mean of the calculated net conditional payoff values. Similar to the above with respect to equations (6) and (7), the aforementioned steps may be performed to effectuate equations (10) and (11), including the expected value expression of equation (10).

FIG. 8 furthers the example of FIGS. 3, 4 and 5, and illustrates a number of different a conditional paths the asset value may take from the preceding exercise point ($p_1$ in the example), through the next-to-last exercise point ($p_2$ in the example) to the expiration exercise point ($p_3$ in the example) for an estimated milestone threshold. As shown, a path at a particular exercise point may represent a true positive (TP) leading to exercising the option and a resulting benefit, or a false positive (FP) leading to exercising the option but a resulting regret. As other alternatives, a path at a particular exercise point may represent a true negative (TN) leading a decision to not exercise the option and a resulting averted failure, or a false negative (FN) leading to a decision to not exercise the option and a resulting omission, both of which may be generally referred to as a negative (N) since in either instance the decision may be made to forego exercising the option.

FIG. 9 furthers the example by illustrating a distribution of net conditional payoff values for a number of calculated net conditional payoff values (conditioned on a milestone threshold at a preceding exercise point $P^*p_{N-2}$). Similar to FIG. 6, FIG. 9 includes a probability accounting for those instances in which the conditional payoff has been limited to a predefined value, such as zero, to account for situations in which the exercise of the contingent claim would otherwise create a loss (negative) since a reasonably prudent participant will forego exercising the contingent claim in these situations.

As before, the milestone threshold $P^*p_n$ is intended to result in a net conditional payoff value of approximately zero, as again shown in block 18f. Thus, after determining the mean net conditional payoff value, if the mean net conditional payoff value does not equal approximately zero, another milestone threshold $P^*p_{N-2}$ may be estimated for the preceding exercise point. The method may then repeat determining conditional distributions of contingent future value at the expiration exercise point $S_{T|P^*p_{N-2}}$ and next-to-last exercise point $S_{p_{N-1}|P^*p_{N-2}}$; determining a conditional payoff $S_{T|P^*p_{N-2}}$ Payoff, net conditional payoff Net $S_{T|P^*p_{N-2}}$ Payoff and mean net conditional payoff Mean Net $S_{T|P^*p_{N-2}}$ Payoff, and determining if the mean net conditional payoff value equals approximately zero. The method may continue in this manner until an estimated milestone threshold $P^*p_{N-2}$ results in a mean net conditional payoff value equal to approximately zero, which may be selected as the milestone threshold at the respective exercise point.

Written in other terms, it may be said that the threshold milestone $P^*p_{N-2}$ at the preceding exercise point $p_{N-2}$ solves the following expression:

$$E_{S_{p_{N-2}}}\lfloor E_{S_{p_{N-1}}}\lfloor Z_0^T(r_1,r_2)|_{(s_{p_{N-2}}=P^*p_{N-2})}\rfloor-x_{p_{N-1}}$$
$$e^{-r_2p_{N-1}}\rfloor^+\times p(s_{p_{N-1}}\geqq P^*p_{N-1})\approx x_{p_{N-2}}e^{-r_2p_{N-2}}$$

The above expression may be interpreted as solving for the case where the difference between the discounted payoff at the expiration exercise point (t=T) and the estimated milestone threshold at the next-to-last exercise point, conditioned on the asset value at the preceding exercise point equaling the estimated milestone threshold for that exercise point, and multiplied by the probability that asset value at the next-to-last exercise point is greater than the milestone threshold for that exercise point, approximately equals the discounted exercise price at the preceding exercise point.

If or once the estimated milestone threshold at the preceding exercise point $P^*p_{N-2}$ results in a mean net conditional payoff value equal to approximately zero, the method may similarly continue for each further preceding exercise point, as again shown in block 18g. Thus, and more generally for each exercise point $p_n$, n=1, 2, ... N−1, a milestone threshold may be estimated $P^*p_n$; and conditional distributions of contingent future value may be determined for the expiration exercise point (distribution of contingent future benefits) $S_{T|P^*p_n}$ and any exercise points between the expiration exercise point and the respective exercise point $S_{p_m|P^*p_n}$, where m=n+1, n+2, ... N−1; and $p_m=p_{n+1}, p_{n+2}, ... p_{N-1}$ (noting that (n+1)>(N−1) results in the empty sets m=∅, and $p_m=∅$). A conditional payoff at the respective exercise point $S_{T|P^*p_n}$ Payoff may be determined or otherwise calculated, such as in accordance with the DM algorithm.

More particularly, for example, a conditional payoff (or intermediate payoff) may be determined as the expected value of the difference between a present value conditional distribution of contingent future benefits at the expiration exercise point (discounted by $r_1$), and the present value of the exercise price (discounted by $r_2$) at the expiration exercise point, including limiting the minimum permissible difference to a predefined value, such as zero. And for each exercise point preceding the next-to-last exercise point $p_{N-1}$, determining the conditional payoff may further include reducing the expected value of the difference (intermediate payoff) by the present values of the exercise prices (discounted by $r_2$) at the one or more exercise points between the expiration exercise point and the respective exercise point. As indicated above, however, determining the conditional payoff may be further conditioned on the conditional asset value at one or more, if not all, subsequent exercise points $S_{p_m|P^*p_n}$ being at least as much as (i.e., ≧) the estimated milestone threshold at the respective exercise points $P^*p_m$, such as by setting the conditional payoff to zero when the asset value at a subsequent exercise point is less than the milestone threshold at the respective subsequent exercise point. Thus, written notationally, the conditional payoff may be determined or otherwise calculated in accordance with the following:

IF $\forall_m (S_{p_m|P^*p_n} \geq P^* p_m)$, then (12)

$$S_{T|P^*p_n} \text{Payoff} = E[\max(S_{T|P^*p_n}e^{-r_1T} - x_Te^{-r_2T}, 0)] - \sum_{P_m} x_{P_m}e^{-r_2p_m};$$

else, $$S_{T|P^*p_n} \text{Payoff} = 0$$

And as a function of conditional asset values $s_{P_m|P^*p_n}$, $\forall_m$ and $s_{T|P^*p_n}$ from respective conditional distributions $S_{P_m|P^*p_n}$, $\forall_m$ and $S_{T|P^*p_n}$, the conditional payoff may be determined in accordance with the following:

IF $\forall_m (s_{P_m|P^*p_n} \geq P^* p_m)$, then (12a)

$$S_{T|P^*p_n} \text{Payoff} = \max(s_{T|P^*p_n}e^{-r_1T} - x_Te^{-r_2T}, 0) - \sum_{P_m} x_{P_m}e^{-r_2p_m};$$

else, $$S_{T|P^*p_n} \text{Payoff} = 0$$

As or after determining the conditional payoff for an exercise point $p_n$, a net conditional payoff at the respective exercise point may be determined or otherwise calculated, such as by reducing the conditional payoff by the present value of the exercise price (discounted by $r_2$) at the respective exercise point. Written notationally, the net conditional payoff may be determined or otherwise calculated in accordance with the following:

$$\text{Net}S_{T|P^*p_n}\text{Payoff} = S_{T|P^*p_n}\text{Payoff} - x_{p_n}e^{-r_2p_n} \quad (13)$$

where $x_{p_n}$ represents the exercise price (e.g., contingent future investment) at the respective exercise point $p_n$.

Then, from the net conditional payoff Net $S_{T|P^*p_n}$ Payoff, the mean net conditional payoff Mean Net $S_{T|P^*p_n}$ Payoff at the respective exercise point may be determined by selecting or otherwise forecasting a number of conditional asset values at the expiration exercise point (conditional future benefits) $p_N(t=T)$ and any exercise points between the expiration exercise point and the respective exercise point $s_{P_m|P^*p_n}$, $\forall_m$ and $s_{T|P^*p_n}$ from respective conditional distributions of contingent future value $S_{T|P^*p_n}$ and $S_{P_m|P^*p_n}$, $\forall_m$; calculating, for those forecasted conditional asset values, conditional payoff and net conditional payoff values such as in accordance with equations (12a) and (13); and calculating or otherwise determining the mean of the calculated net conditional payoff values, such as in a manner similar to that explained above. And if the mean net conditional payoff at the respective exercise point does not equal approximately zero, another milestone threshold $P^*p_n$ may be estimated for the respective exercise point, and the method repeated for determining a new mean net conditional payoff. In yet a further similar manner, the aforementioned steps may be performed to effectuate equations (12) and (13) to calculate $P^*p_n$, including the expected value expression of equation (12).

In other terms, it may be said that the threshold milestone $P^*p_n$ at exercise point $p_n$ solves the following expression:

$$E[E_{S_{p_m}} \quad \ldots \quad [E_{S_{pN-1}}[Z_0^T(r_1,r_2)|_{(s_{pn}=P^*p_n)}] - x_{p_{N-1}}e^{-r_2p_{N-1}}]^+ \ldots -x_{p_n}e^{-r_2p_n}]^+ \times p(s_{S_{p_m}} \geq P^*p_m, \forall_m) = x_{p_n}e^{-r_2p_n}$$

The above expression may be interpreted by understanding that the value of the multi-stage option may be viewed as the value of a series of embedded expectations, with each expectation stage having an associated cost to continue to the subsequent stage. These expectations may arise because of the uncertainty of the payoff at each stage, thus valued as a mean or expected value of the sum total of all potential outcomes at each stage. The expectations may be embedded because success (or net payoff greater than zero) at an earlier stage allows forward progress to the subsequent stage of the project. Failure (or net payoffs which are limited to zero) may terminate forward progress of the project. Milestone thresholds $P^*p_n$ may be calculated for each stage or exercise point before the expiration exercise point. If project value at a subsequent stage or exercise point m is such that $s_{p_m} \geq P^*p_m$, there may be sufficient probability to expect that the subsequent stage(s) will be successful, and therefore the participant may incur a cost $x_{p_n}$ as the cost of proceeding to the next stage n+1. The cost $x_{p_n}$ may be weighted by the probability of actually incurring the cost dependent on the success or failure of proceeding stages.

2. Arc Technique for Determining Milestone Thresholds

Figure 2B:
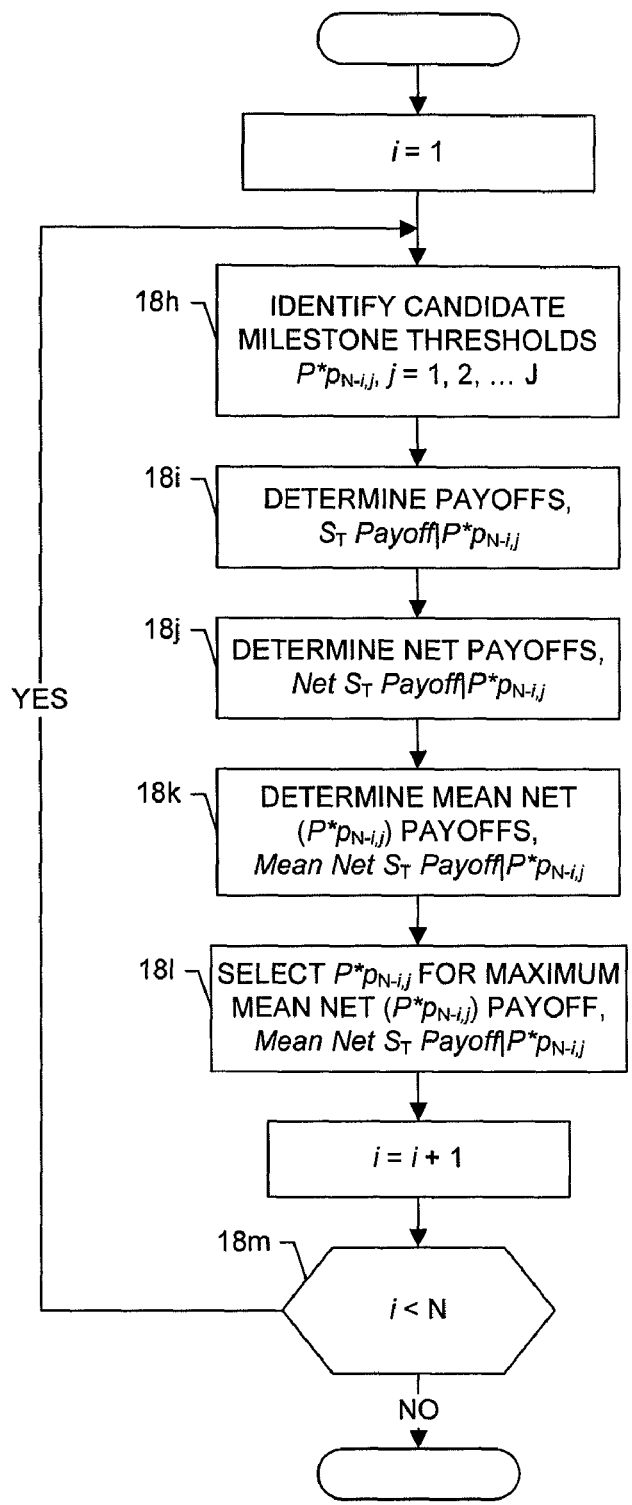
Figure 2C:
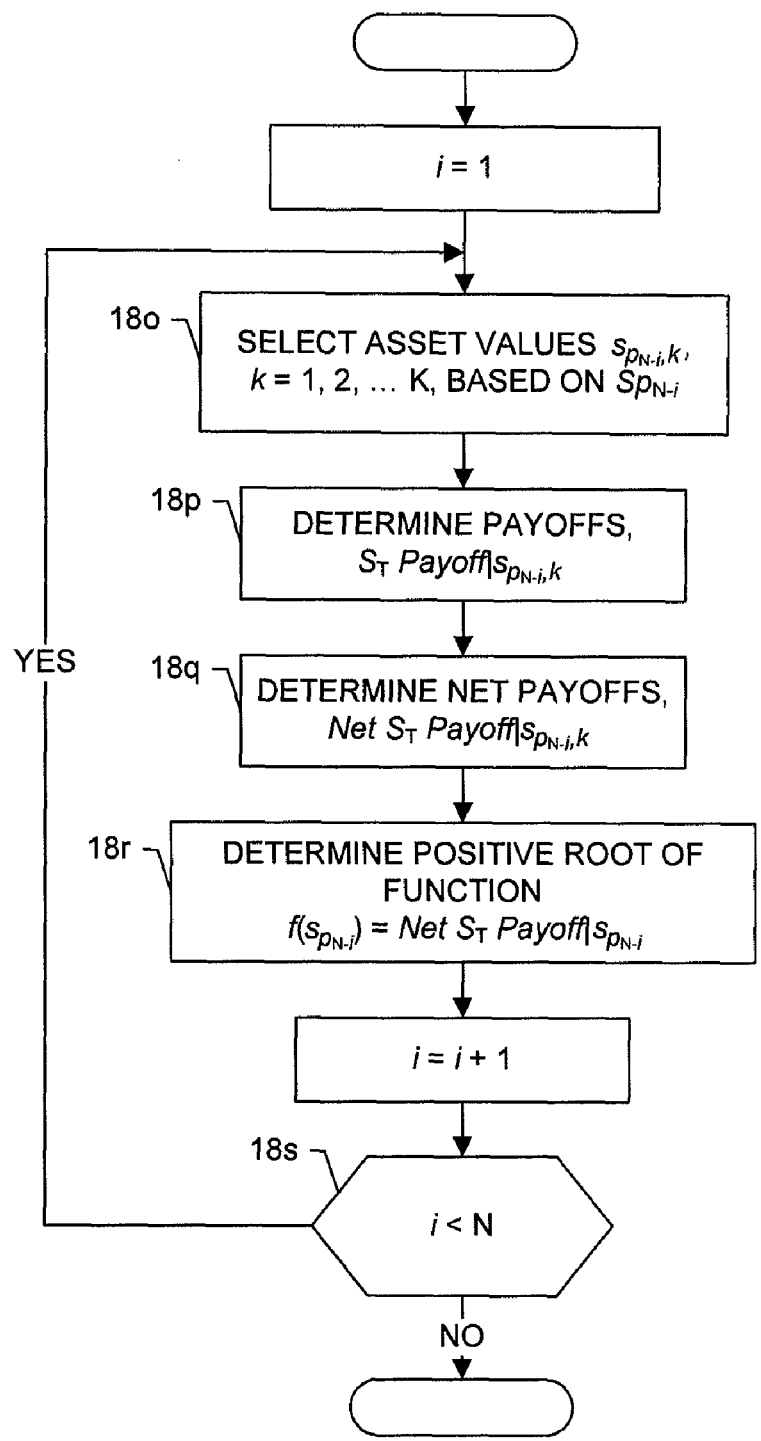

Referring now to FIG. 2b, determining each milestone threshold according to the arc technique of one exemplary embodiment of the present invention may include identifying J candidate milestone thresholds for the next-to-last exercise point $P^*p_{N-1,j}$, j=1, 2, . . . J, as shown in block 18h. The candidate milestone thresholds for this next-to-last exercise point may be identified in any of a number of different manners. For example, the milestone thresholds for the next-to-last exercise point may be identified to be a number of equidistant values on either side of the determined mean asset value at that exercise point $\mu_{S_{pN-1}}$ (see equation (1)).

Irrespective of exactly how the candidate milestone thresholds at the next-to-last exercise point $P^*p_{N-1,j}$ are identified, respective payoffs or profits may be determined or otherwise calculated based thereon, as shown in block 18i. In this regard, the payoffs or profits may be conditioned on respective candidate milestone thresholds, and determined in any of a number of different manners, including in accordance with the DM algorithm. Written notationally, for example, the payoffs $S_T$ Payoff$|P^*p_{N-1,j}$ may be determined as follows:

IF $S_{p_{N-1}} \geq P^*p_{N-1,j}$, then $$S_T\text{Payoff}|P^*p_{N-1,j} = E[\max(S_Te^{-r_1T} - x_Te^{-r_2T}, 0)];$$

else, $$S_T\text{Payoff}|P^*p_{N-1,j} = 0 \quad (14)$$

And as a function of asset values $s_{p_{N-1}}$ and $s_T$ from respective distributions $S_{p_{N-1}}$ and $S_T$, the payoffs $S_T$Payoff$|P^*p_{N-1,j}$ may be determined as follows:

IF $s_{p_{N-1}} \geq P^*p_{N-1,j}$, then $$S_T\text{Payoff}|P^*p_{N-1,j} = \max(s_Te^{-r_1T} - x_Te^{-r_2T}, 0);$$

else, $$S_T\text{Payoff}|P^*p_{N-1,j} = 0 \quad (14a)$$

As or after determining the payoffs at the expiration exercise point $p_N$ (t=T), net payoffs may be calculated or otherwise determined by accounting for the exercise price at the next-to-last exercise point $p_{N-1}$ (e.g., t=3), as shown in block 18*j*. Similar to the payoffs, the net payoffs can be determined in any of a number of different manners. In one embodiment, for example, the net payoffs may be determined by discounting the exercise price at the next-to-last exercise point by the second discount rate $r_2$ (e.g., risk-free rate), and subtracting that discounted exercise price from respective payoffs at t=T. Written notationally, for example, the net payoffs Net $S_T$ Payoff|$P^*p_{N-1,j}$ may be determined as follows:

$$\text{Net}S_T\text{Payoff}|P^*p_{N-1,j} = S_T\text{Payoff}|P^*p_{N-1,j} - x_{p_{N-1}} e^{-r2p_{N-1}} \quad (15)$$

where $x_{p_{N-1}}$ represents the exercise price (e.g., contingent future investment) at the next-to-last exercise point $p_{N-1}$ (e.g., $x_{p_{N-1}}=\$30.00$).

From the net payoffs, respective mean net payoffs Mean Net $S_T$ Payoff|$P^*p_{N-1,j}$ may be determined for respective candidate milestone thresholds $P^*p_{N-1,j}$, as shown in block 18*k*. For example, the mean net payoffs may be determined by first selecting or otherwise forecasting a number of asset values $s_{p_{N-1}}$ and $s_T$ from respective distributions of contingent future value $S_{p_{N-1}}$ and $S_T$. For those forecasted asset values, then, respective payoff and net payoff values may be calculated such as in accordance with equations (14*a*) and (15). The means of the calculated net payoff values may then be calculated or otherwise determined for respective candidate milestone thresholds $P^*p_{N-1,j}$. The aforementioned steps thereby effectuating equations (14) and (15), including the expected value expression of equation (14).

As indicated above, the milestone threshold $P^*p_n$ is intended to maximize benefits (TP) and minimize regrets (FP) and omissions FN on a risk-adjusted basis. Thus, after determining the mean net payoff values, a maximum mean net payoff value may be selected from the determined or otherwise calculated mean net payoffs. The candidate milestone threshold associated with the respective mean net payoff value may then be selected as the milestone threshold at the respective exercise point, as shown in block 18*l*. And in this regard, see FIG. 10*a* for a graph plotting a number of mean net payoff values for a number of candidate milestone thresholds, and including a selected milestone threshold associated with a maximum mean net payoff value.

As shown in block 18*m*, after selecting a candidate milestone threshold $P^*p_{N-1,j}$ that results in a maximum mean net payoff value, a number of candidate milestone thresholds may be identified for any exercise points preceding the next-to-last exercise point, such as by starting with the exercise point immediately preceding the next-to-last exercise point $P^*p_{N-2}$, as again shown in block 18*h*. As with the candidate milestone thresholds at the next-to-last exercise point, the candidate milestone thresholds for the preceding exercise point may be identified in any of a number of different manners. Again, for example, the candidate milestone thresholds for the preceding exercise point may be identified to be a number of equidistant values on either side of the determined mean asset value at that exercise point, as explained above.

After identifying the candidate milestone thresholds at the preceding exercise point $P^*p_{N-2,j}$, respective payoffs or profits may be determined or otherwise calculated based thereon, as again shown in block 18*i*. In this regard, the payoffs or profits may be conditioned on respective candidate milestone thresholds, and determined in any of a number of different manners, including in accordance with the DM algorithm.

Written notationally, for example, the payoffs $S_T$ Payoff|$P^*p_{N-2,j}$ may be determined as follows:

IF $S_{p_{N-2}} \geq P^*p_{N-2,j}$, $S_{p_{N-1}} \geq P^*p_{N-1}$, then $$S_T\text{Payoff}|P^*p_{N-2,j} = E[\max(S_T e^{-r1T} - x_T e^{-r2T}, 0)] - x_{p_{N-1}} e^{-r2p_{N-1}};$$

else, $$S_T\text{Payoff}|P^*p_{N-2,j} = 0 \quad (16)$$

And as a function of asset values $s_{p_{N-2}}$, $s_{p_{N-1}}$ and $s_T$ from respective distributions $S_{p_{N-2}}$, $S_{p_{N-1}}$ and $S_T$, the payoffs $S_T$ Payoff|$P^*p_{N-2,j}$ may be determined as follows:

IF $s_{p_{N-2}} \geq P^*p_{N-2,j}$, $s_{p_{N-1}} \geq P^*p_{N-1}$, then $$S_T\text{Payoff}|P^*p_{N-2,j} = \max(s_T e^{-r1T} - x_T e^{-r2T}, 0) - x_{p_{N-1}} e^{-r2p_{N-1}};$$

else, $$S_T\text{Payoff}|P^*p_{N-2,j} = 0 \quad (16a)$$

As or after determining the payoffs at the expiration exercise point $p_N$ (t=T), net payoffs may be calculated or otherwise determined by accounting for the exercise price at the preceding exercise point $p_{N-2}$ (e.g., t=1), as again shown in block 18*j*. Similar to the payoffs, the net payoffs can be determined in any of a number of different manners. In one embodiment, for example, the net payoffs may be determined by discounting the exercise price at the preceding exercise point by the second discount rate $r_2$ (e.g., risk-free rate), and subtracting that discounted exercise price from respective payoffs at t=T. Written notationally, for example, the net payoffs Net $S_T$ Payoff|$P^*p_{N-2,j}$ may be determined as follows:

$$\text{Net}S_T\text{Payoff}|P^*p_{N-2,j} = S_T\text{Payoff}|P^*p_{N-2,j} - x_{p_{N-2}} e^{-r2p_{N-2}} \quad (17)$$

where $x_{p_{N-2}}$ represents the exercise price (e.g., contingent future investment) at the preceding exercise point $p_{N-2}$ (e.g., $x_{p_{N-2}}=\$15.00$).

From the net payoffs, respective mean net payoffs Mean Net $S_T$ Payoff|$P^*p_{N-2,j}$ may be determined for respective candidate milestone thresholds $P^*p_{N-2,j}$, as again shown in block 18*k*. For example, the mean net payoffs may be determined by first selecting or otherwise forecasting a number of asset values from respective distributions of contingent future value $S_{p_{N-2}}$, $S_{p_{N-1}}$ and $S_T$. For those forecasted asset values, then, respective payoff and net payoff values may be calculated such as in accordance with equations (16*a*) and (17). The means of the calculated net payoff values may then be calculated or otherwise determined for respective candidate milestone thresholds $P^*p_{N-2,j}$. The aforementioned steps thereby effectuating equations (16) and (17), including the expected value expression of equation (16).

Similar to before, after determining the mean net payoff values, a maximum mean net payoff value may be selected from the determined or otherwise calculated mean net payoffs. The candidate milestone threshold associated with the respective mean net payoff value may then be selected as the milestone threshold for the respective exercise point, as again shown in block 18*l*. And in this regard, see FIG. 10*b* for a graph plotting a number of mean net payoff values for a number of candidate milestone thresholds, and including a selected milestone threshold associated with a maximum mean net payoff value.

After selecting a candidate milestone threshold for the preceding exercise point $P^*p_{N-2}$ that results in a maximum mean net payoff value, the method may similarly continue for each further preceding exercise point, as again shown in block

18$m$. Thus, and more generally for each exercise point $p_n$, $n=1, 2, \ldots N-1$, a number of candidate milestone thresholds may be identified $P^*p_{n,j}$. Having selected the candidate milestone thresholds $P^*p_{n,j}$, payoffs (or intermediate payoffs) may then be determined as the expected value of the difference between a present value distribution of contingent future benefits at the expiration exercise point (discounted by $r_1$), and the present value of the exercise price (discounted by $r_2$) at the expiration exercise point, and including limiting the minimum permissible difference to a predefined value, such as zero. And for each exercise point preceding the next-to-last exercise point $p_{N-1}$, determining the payoffs may further include reducing the expected values of the difference (intermediate payoffs) by the present values of the exercise prices (discounted by $r_2$) at the one or more exercise points between the expiration exercise point and the respective exercise point. However, determining the payoffs may be further conditioned on the asset value at the respective exercise point and one or more, if not all, subsequent exercise points before the expiration exercise point $S_{p_n}$ being at least as much as, if not greater than (i.e., $\geqq$), the candidate milestone threshold at the respective exercise points $P^*p_{n,j}$, such as by setting the payoffs to zero when the asset value at an exercise point is less than the milestone threshold at the respective exercise point. Thus, written notationally, the payoffs may be determined or otherwise calculated in accordance with the following:

$$\text{IF } S_{p_n} \geq P^* p_{n,j}, \forall_m (S_{p_m} \geq P^* p_m), \text{ then} \tag{18}$$

$$S_T \text{Payoff} \mid P^* p_{n,j} = E[\max(S_T e^{-r_1 T} - x_T e^{-r_2 T}, 0)] - \sum_{p_m} x_{p_m} e^{-r_2 p_m};$$

else, $$S_T \text{Payoff} \mid P^* p_{n,j} = 0$$

where $m=n+1, n+2, \ldots N-1$; and $p_m = p_{n+1}, p_{n+2}, \ldots p_{N-1}$ (noting that $(n+1)>(N-1)$ results in the empty sets $m=\emptyset$, and $p_m = \emptyset$).

And as a function of asset values $s_{p_n}$, $s_{p_m}$, $\forall_m$ and $s_T$ from respective distributions $S_{p_n}$, $S_{p_m}$, $\forall_m$ and $S_T$, the payoffs $S_T$ Payoff$|P^*p_{n,j}$ may be determined as follows:

$$\text{IF } s_{p_n} \geq P^* p_{n,j}, \forall_m (s_{p_m} \geq P^* p_m), \text{ then} \tag{18a}$$

$$S_T \text{Payoff} \mid P^* p_{n,j} = \max(s_T e^{-r_1 T} - x_T e^{-r_2 T}, 0) - \sum_{p_m} x_{p_m} e^{-r_2 p_m};$$

else, $$S_T \text{Payoff} \mid P^* p_{n,j} = 0$$

As or after determining the payoffs for an exercise point $p_n$, respective net payoffs at the respective exercise point may be determined or otherwise calculated, such as by reducing the payoffs by the present value of the exercise price (discounted by $r_2$) at the respective exercise point. Written notationally, the net payoffs may be determined or otherwise calculated in accordance with the following:

$$\text{Net}S_T\text{Payoff}|P^*p_{n,j} = S_T\text{Payoff}|P^*p_{n,j} - x_{p_n} e^{-r_2 p_n} \tag{19}$$

From the net payoffs Net $S_T$ Payoff$|P^*p_{n,j}$, respective mean net payoffs Mean Net $S_T$ Payoff$|P^*p_{n,j}$ may be determined for respective candidate milestone thresholds $P^*p_{n,j}$. Again, for example, the mean net payoffs may be determined by first selecting or otherwise forecasting a number of asset values $s_{p_n}$, $s_{p_m}$, $\forall_m$ and $s_T$ from respective distributions of contingent future value $S_{p_n}$, $S_{p_m}$, $\forall_m$ and $S_T$. For those forecasted asset values, then, respective payoff and net payoff values may be calculated such as in accordance with equations (18a) and (19). The means of the calculated net payoff values may then be calculated or otherwise determined, and a maximum mean net payoff value selected from the determined or otherwise calculated mean net payoffs. The aforementioned steps being performed to thereby effectuate equations (18) and (19), including the expected value expression of equation (18). The candidate milestone threshold associated with the respective mean net payoff value may then be selected as the milestone threshold for the respective exercise point $p_n$.

3. Zero-Crossing Technique for Determining Milestone Thresholds

Referring to FIG. 2$c$, determining each milestone threshold according to the zero-crossing technique of one exemplary embodiment of the present invention may include selecting or otherwise forecasting K asset values at the next-to-last exercise point $s_{p_{N-1},k}$, $k=1, 2, \ldots K$, as shown in block 18$o$. The asset values at this next-to-last exercise point may be selected or otherwise forecasted in any of a number of different manners. In one embodiment, for example, the asset values may be selected or otherwise forecasted from the distribution of contingent future value $S_{p_{N-1}}$, such as in accordance with the Monte Carlo technique for randomly generating values. In such instances, the distribution of contingent future value may have been determined in the manner explained above with reference to equations (1) and (2).

Irrespective of exactly how the asset values are forecasted, respective payoffs or profits may be determined or otherwise calculated based thereon, as shown in block 18$p$. In this regard, the payoffs or profits may be conditioned on respective forecasted asset values, and determined in any of a number of different manners, including in accordance with the DM algorithm, such as in a manner similar to that explained above for the benefit-regret and arc techniques. Written notationally, the payoffs $S_T$ Payoff$|s_{p_{N-1},k}$ may be determined as follows:

$$S_T\text{Payoff}|s_{p_{N-1},k} = E[\max(S_T e^{-r_1 T} - x_T e^{-r_2 T}, 0)]|s_{p_{N-1},k} \tag{20}$$

And as a function of asset values $s_T$ from the distribution of contingent future benefits $S_T$, the payoffs $S_T$ Payoff$|s_{p_{N-1},k}$ may be determined as follows:

$$S_T\text{Payoff}|s_{p_{N-1},k} = \max(s_T e^{-r_1 T} - x_T e^{-r_2 T}, 0)|s_{p_{N-1},k} \tag{20a}$$

As or after determining the payoffs at the expiration exercise point $p_N$ (t=T), net payoffs may be calculated or otherwise determined by accounting for the exercise price at the next-to-last exercise point $p_{N-1}$ (e.g., t=3), as shown in block 18$q$. Similar to the payoffs, the net payoffs can be determined in any of a number of different manners. In one embodiment, for example, the net payoffs may be determined by discounting the exercise price at the next-to-last exercise point by the second discount rate $r_2$ (e.g., risk-free rate), and subtracting that discounted exercise price from respective payoffs at t=T. Written notationally, for example, the net payoffs Net $S_T$ Payoff$|s_{p_{N-1},k}$ may be determined as follows:

$$\text{Net}S_T\text{Payoff}|s_{p_{N-1},k} = S_T\text{Payoff}|s_{p_{N-1},k} - x_{p_{N-1}} e^{-r_2 p_{N-1}} \tag{21}$$

where $x_{p_{N-1}}$ represents the exercise price (e.g., contingent future investment) at the next-to-last exercise point $p_{N-1}$ (e.g., $x_{p_{N-1}} = \$30.00$).

From the net payoffs, a positive root may be determined for a function defined based thereon $f(s_{p_{N-1}}) = \text{Net } S_T \text{Payoff}|s_{p_{N-1}}$, as shown in block 18*r*. The function may comprise a function of any of a number of different orders, and may be defined based upon the net payoffs Net $S_T$ Payoff$|s_{p_{N-1},k}$ for respective forecasted asset values $s_{p_{N-1},k}$ in any of a number of different manners. In one exemplary embodiment, example, the function may be defined by first selecting or otherwise forecasting a number of future benefit values $s_{T,k}$ (asset values at the expiration exercise point) from the distribution of contingent future benefits $S_T$ based upon respective forecasted asset values $s_{p_{N-1},k}$ and the correlation coefficient $\text{Coeff}_{p_{N-1},p_T}$ between the distribution of contingent future value at the next-to-last exercise point (i.e., $S_{p_{N-1}}$) and the distribution of contingent future benefits (distribution of contingent future value) at the expiration exercise point (i.e., $S_T$) This operation may result in an array of paired values $[s_{p_{N-1},k}, s_{T,k}]$. For those forecasted asset values, then, respective payoff and net payoff values may be calculated such as in accordance with equations (20a) and (21). The result of this operation, then, may be an array of paired values $[s_{p_{N-1},k}, \text{Net } S_T \text{Payoff}|s_{p_{N-1},k}]$.

After determining the net payoffs Net $S_T$ Payoff$|s_{p_{N-1},k}$ for respective forecasted asset values $s_{p_{N-1},k}$, a function may be defined based on the respective forecasted asset values and associated net payoffs. More particularly, for example, a second-order quadratic function (or other order function) may be defined based on the respective values in accordance with a least-squares technique. In this regard, see FIG. 11*a* for a scatter plot of a number of net payoff values for a number of forecasted asset values, and including the exemplary quadratic function $f(s_{p_{N-1}})=\text{Net } S_T \text{ Payoff}|s_{p_{N-1}}=0.0008(s_{p_{N-1}})^2+0.1084(s_{p_{N-1}})-29.983$ defined based thereon, again in the context of the example provided above.

Again, the milestone threshold $P^*p_n$ is intended to result in a final value (payoff value) at the expiration exercise point substantially equal to the exercise price at the current exercise point and any subsequent exercise points. Thus, after defining the function $f(s_{p_{N-1}})=\text{Net } S_T \text{Payoff}|s_{p_{N-1}}$, the function may be solved for a positive root thereof (i.e., value of $s_{p_{N-1}}$ resulting in a net payoff value Net $S_T$ Payoff$|s_{p_{N-1}}$ of approximately zero), such as in accordance with any of a number of different techniques. This forecasted asset value may then be selected as the milestone threshold for the respective exercise point.

As shown in block 18*s*, after finding a positive root of the aforementioned function to thereby determine the milestone threshold $P^*p_{N-1}$, the technique may repeat for any exercise points preceding the next-to-last exercise point. In this regard, K asset values may be selected or otherwise forecasted for any exercise points preceding the next-to-last exercise point, such as by starting with the exercise point immediately preceding the next-to-last exercise point $p_{N-2}$, as again shown in block 18*o*. The asset values $s_{p_{N-2},k}$ for this next-to-last exercise point may be selected or otherwise forecasted in any of a number of different manners. In one embodiment, for example, the asset values may be selected or otherwise forecasted from the distribution of contingent future value $S_{p_{N-2}}$.

After selecting or otherwise forecasting the asset values, respective payoffs or profits may be determined or otherwise calculated based thereon, as again shown in block 18*p*. In this regard, the payoffs or profits may be conditioned on respective forecasted asset values, and determined in any of a number of different manners, including in accordance with the DM algorithm, such as in a manner similar to that explained above for the benefit-regret and arc techniques. Written notationally, the payoffs $S_T$ Payoff$|s_{p_{N-2},k}$ may be determined as follows:

IF $S_{p_{N-1}}|s_{p_{N-2},k} \geq P^*p_{n-1}$, then $S_T\text{Payoff}|s_{p_{N-2},k}=E[\max(S_T e^{-r1T}-x_T e^{-r2T},0)]|s_{p_{N-2},k}-x_{p_{N-1}}e^{-r2p_{N-1}};$ else, $S_T\text{Payoff}|s_{p_{N-2},k}=0$ (22)

And as a function of asset values $s_{p_{N-1}}$ and $s_T$ from respective distributions of contingent future value $S_{p_{N-1}}$ and $S_T$, the payoffs $S_T$ Payoff$|s_{p_{N-2},k}$ may be determined as follows:

IF $s_{p_{N-1}}|s_{p_{N-2},k} \geq P^*p_{N-1}$, then $S_T\text{Payoff}|s_{p_{N-2},k}=\max(s_T e^{-r1T}-x_T e^{-r2T},0)|s_{p_{N-2},k}-x_{p_{N-1}}e^{-r2p_{N-1}};$ else, $S_T\text{Payoff}|s_{p_{N-2},k}0$ (22a)

As or after determining the payoffs at the expiration exercise point $p_N$ (t=T), net payoffs may be calculated or otherwise determined by accounting for the exercise price at the preceding exercise point $p_{N-2}$ (e.g., t=1), as again shown in block 18*q*. Similar to the payoffs, the net payoffs can be determined in any of a number of different manners. In one embodiment, for example, the net payoffs may be determined by discounting the exercise price at the preceding exercise point by the second discount rate $r_2$ (e.g., risk-free rate), and subtracting that discounted exercise price from respective payoffs at t=T. Written notationally, for example, the net payoffs Net $S_T$ Payoff$|s_{p_{N-2},k}$ may be determined as follows:

$\text{Net}S_T\text{Payoff}|s_{p_{N-2},k}=S_T\text{Payoff}|s_{p_{N-2},k}-x_{p_{N-2}}e^{-r2p_{N-2}}$ (23)

From the net payoffs, a positive root may be determined for a function defined based thereon $f(s_{p_{N-2}})=\text{Net } S_T \text{Payoff}|s_{p_{N-2}}$, as again shown in block 18*r*. The function may comprise a function of any of a number of different orders, and may be defined based upon the net payoffs Net $S_T$ Payoff$|s_{p_{N-2}}$ for respective forecasted asset values $s_{p_{N-2},k}$ in any of a number of different manners. In this regard, the function may be defined by first selecting or otherwise forecasting a number of asset values at the next-to-last expiration point $s_{p_{N-1},k}$ from a respective distribution of contingent future value $S_{p_{N-1}}$ based upon the forecasted asset values $s_{p_{N-2},k}$, and the correlation coefficient $\text{Coeff}_{p_{N-2},p_{N-1}}$. Similarly, for example, a number of asset values at the expiration exercise point $s_{T,k}$ (future benefit values) may be selected or otherwise forecasted from the distribution of contingent future benefits (distribution of contingent future value) $S_T$ based upon respective forecasted asset values at the next-to-last expiration point $p_{N-1}$, and the correlation coefficient $\text{Coeff}_{p_{N-1},T}$. For those forecasted asset values, then, respective payoff and net payoff values may be calculated such as in accordance with equations (22a) and (23).

After determining the net payoffs Net $S_T$ Payoff$|s_{p_{N-2},k}$ for respective forecasted asset values $s_{p_{N-2},k}$, a function may be defined based thereon $f(s_{p_{N-2}})=\text{Net } S_T\text{Payoff}|s_{p_{N-2}}$, such as by defining a second-order, quadratic function (or other order function) based on the respective forecasted asset values and associated net payoffs in accordance with a least-squares technique. In this regard, see FIG. 11*b* for a scatter plot of a number of net payoff values for a number of forecasted asset values, and including the exemplary quadratic function $f(s_{p_{N-2}})=\text{Net } S_T \text{Payoff}|s_{p_{N-2}}=0.002(s_{p_{N-2}})^2+0.054(s_{p_{N-2}})-26.545$ defined based thereon, again in the context of the example provided above.

Again, the milestone threshold $P^*p_n$ is intended to result in a final value (payoff value) at the expiration exercise point substantially equal to the exercise price at the current exercise point and any subsequent exercise points. Thus, after defining the function $f(s_{p_{N-2}})=\text{Net } S_T\text{Payoff}|s_{p_{N-2}}$, the function may be solved for a positive root thereof (i.e., value of $s_{p_{N-2}}$ resulting in a net payoff value Net $S_T\text{Payoff}|s_{p_{N-2}}$ of approximately zero), such as in accordance with any of a number of different techniques. This forecasted asset value may then be selected as the milestone threshold for the respective exercise point.

After finding a positive root of the aforementioned function to thereby determine the milestone threshold $P^*p_{N-2}$, the technique may similarly continue for each further preceding exercise point, as again shown in block 18s. Thus, and more generally for each exercise point $p_n$, n=1, 2, . . . N−1, asset values $s_{p_n,k}$ may be selected or otherwise forecasted from a respective distribution of contingent future value $S_{p_n}$, such as in accordance with the Monte Carlo technique for randomly generating values.

In addition to selecting or otherwise forecasting asset values $s_{p_n,k}$, payoffs (or intermediate payoffs) may be determined as the expected value of the difference between a present value distribution of contingent future benefits at the expiration exercise point (discounted by $r_1$), and the present value of the exercise price (discounted by $r_2$) at the expiration exercise point, including limiting the minimum permissible difference to a predefined value, such as zero. And for each exercise point preceding the next-to-last exercise point $p_{N-1}$, determining the payoffs may further include reducing the expected values of the difference (intermediate payoffs) by the present values of the exercise prices (discounted by $r_2$) at the one or more exercise points between the expiration exercise point and the respective exercise point. Again, however, determining the payoffs may be further conditioned on the asset value at one or more, if not all, subsequent exercise points $S_{p_m}|s_{p_n,k}$ being at least as much as, if not greater than (i.e., $\geqq$), the milestone threshold at the respective exercise points $P^*p_m$, such as by setting the payoffs to zero when the asset value for a subsequent exercise point is less than the milestone threshold at the respective subsequent exercise point. Thus, written notationally, the payoffs may be determined or otherwise calculated in accordance with the following:

IF $\forall_m (S_{p_m}|s_{p_n,k} \geq P^*p_m)$, then (24)

$$S_T\text{Payoff}|s_{p_{n,k}} = E[\max(S_T e^{-r_1 T} - x_T e^{-r_2 T}, 0)]|s_{p_{n,k}} - \sum_{p_m} x_{p_m} e^{-r_2 p_m};$$

else, $$S_T\text{Payoff}|s_{p_n,k} = 0$$

And as a function of asset values $s_{p_m}$, $\forall_m$ and $s_T$ from respective distributions of contingent future value $S_{p_m}$, $\forall_m$ and $S_T$, the payoffs $S_T\text{Payoff}|s_{p_n,k}$ may be determined as follows:

IF $\forall_m (s_{p_m}|s_{p_n,k} \geq P^*p_m)$, then (24a)

$$S_T\text{Payoff}|s_{p_{n,k}} = \max(s_T e^{-r_1 T} - x_T e^{-r_2 T}, 0)|s_{p_{n,k}} - \sum_{p_m} x_{p_m} e^{-r_2 p_m};$$

else, $$S_T\text{Payoff}|s_{p_n,k} = 0$$

As or after determining the payoffs for an exercise point $p_n$, respective net payoffs at the respective exercise point may be determined or otherwise calculated, such as by reducing the payoffs by the present value of the exercise price (discounted by $r_2$) at the respective exercise point. Written notationally, the net payoffs may be determined or otherwise calculated in accordance with the following:

$$\text{Net}S_T\text{Payoff}|s_{p_n,k} = S_T\text{Payoff}|s_{p_n,k} - x_{p_n} e^{-r_2 p_n} \quad (25)$$

where $x_{p_n}$ represents the exercise price (e.g., contingent future investment) at the preceding exercise point $p_n$.

From the net payoffs Net $S_T$ Payoff$|s_{p_n,k}$, a positive root may be determined for a function $f(s_{p_n}) = \text{Net } S_T$ Payoff$|s_{p_n}$ defined based on the net payoffs Net $S_T$ Payoff$|s_{p_n,k}$ and respective forecasted asset values $s_{p_n,k}$. Again, for example, the function may be defined by first selecting or otherwise forecasting a number of asset values $s_{p_m,k}$, $\forall_m$ from respective distributions of contingent future values $S_{p_m}$, $\forall_m$ based upon the forecasted asset values $s_{p_n,k}$, and respective correlation coefficients Coeff$_{p_n,p_m}$, $\forall_m$. Similarly, for example, a number of future benefit values $s_{T,k}$ (asset values at the expiration exercise point) may be selected or otherwise forecasted from the distribution of contingent future benefits $S_T$ based upon respective forecasted asset values $s_{p_n,k}$ and the correlation coefficient Coeff$_{p_n,T}$. For those forecasted asset values, then, respective payoff and net payoff values may be calculated such as in accordance with equations (24a) and (25), after which a function $f(s_{p_n}) = \text{Net } S_T$ Payoff$|s_{p_n}$ may be defined based on the net payoffs Net $S_T$ Payoff$|s_{p_n,k}$ and respective forecasted asset values $s_{p_n,k}$. This function may then be solved for its root, and that forecasted asset value may then be selected as the milestone threshold for the respective exercise point $p_n$.

As explained above, K asset values $s_{p_n,k}$ may be forecasted (see step 18o) before determining respective payoffs (see step 18p), net payoffs (see step 18q), and the root of the function $f(s_{p_n}) = \text{Net } S_T$ Payoff$|s_{p_n}$ (see step 18r). This may be referred to as a static determination of the milestone threshold $P^*p_n$. Alternatively, however, the payoff, net payoffs, and root of the aforementioned function may be determined as each of the K asset values is forecast, in a manner referred to as a dynamic determination of the milestone threshold $P^*p_n$. In such instances, the payoff and net payoffs may be determined based upon the currently forecasted asset value. The function and its root, however, may be determined based upon the net payoff for the currently forecasted asset value, as well as the net payoffs for any, or all, previously forecasted asset values. In this regard, the function and its root may be built and refined as more asset values are forecasted.

4. Sorted List Technique for Determining Milestone Thresholds

Figure 2D:
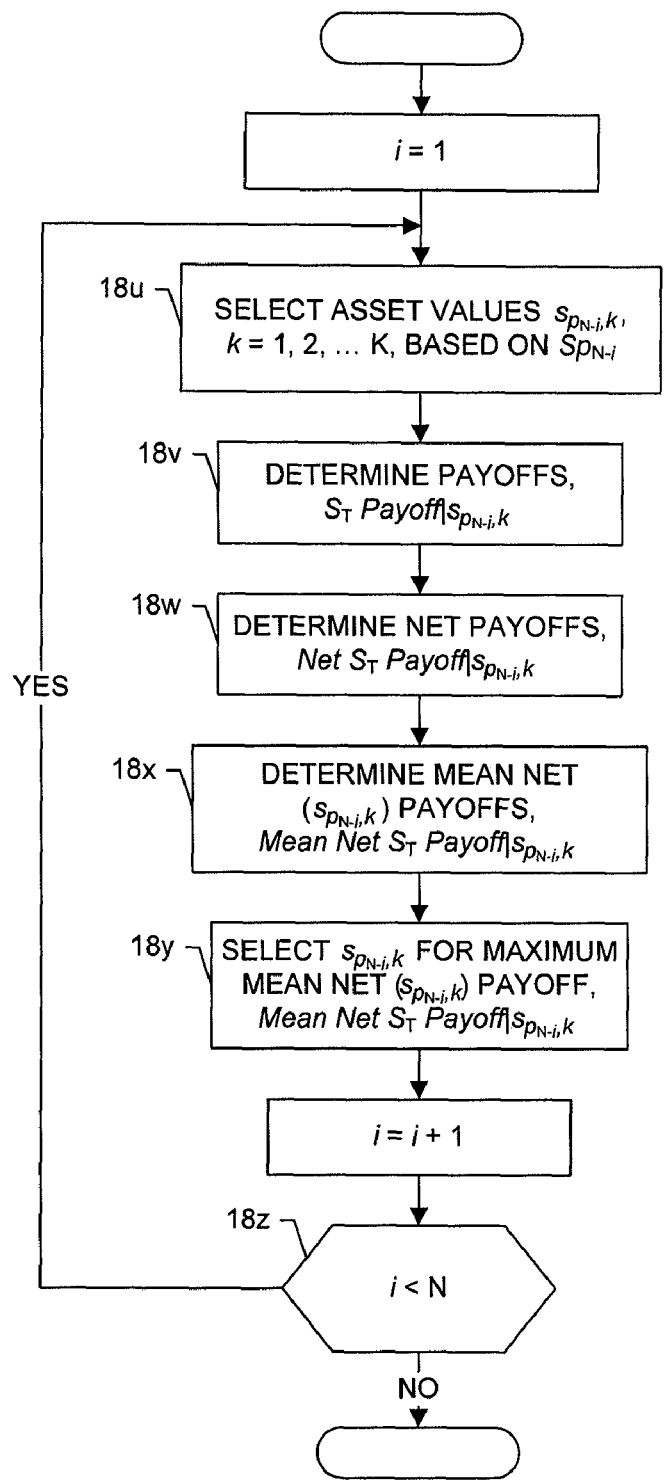

Referring to FIG. 2d, determining each milestone threshold according to the sorted-list technique of one exemplary embodiment of the present invention may include selecting or otherwise forecasting K asset values at the next-to-last exercise point $s_{p_{N-1},k}$, k=1, 2, . . . K, as shown in block 18u. The asset values at this next-to-last exercise point may be selected or otherwise forecasted in any of a number of different manners. In one embodiment, for example, the asset values may be selected or otherwise forecasted from the distribution of contingent future value $S_{p_{N-1}}$, such as in accordance with the Monte Carlo technique for randomly generating values. In such instances, the distribution of contingent future value may have been determined in the manner explained above with reference to equations (1) and (2).

Irrespective of exactly how the asset values are forecasted, respective payoffs or profits may be determined or otherwise calculated based thereon, as shown in block 18v. In this regard, the payoffs or profits may be conditioned on respective forecasted asset values, and determined in any of a number of different manners, including in accordance with the DM algorithm, such as in a manner similar to that explained above for the benefit-regret and arc techniques. Written notationally, the payoffs $S_T \text{Payoff}|s_{p_{N-1},k}$ may be determined as follows:

IF $S_{p_{N-1}} \geq s_{p_{N-1},k}$, then $$S_T\text{Payoff}|s_{p_{N-1},k} = E[\max(S_T e^{-r_1 T} - x_T e^{-r_2 T}, 0)];$$

else, $$S_T\text{Payoff}|s_{p_{N-1},k} = 0 \quad (26)$$

And as a function of asset values $s_{p_{N-1}}$ and $s_T$ from respective distributions $S_{p_{N-1}}$ and $S_T$, the payoffs $S_T\text{Payoff}|s_{p_{N-1},k}$ may be determined as follows:

IF $s_{p_{N-1}} \geq s_{p_{N-1},k}$, then $$S_T\text{Payoff}|s_{p_{N-1},k} = \max(s_T e^{-r_1 T} - x_T e^{-r_2 T}, 0);$$

else, $$S_T\text{Payoff}|s_{p_{N-1},k} = 0 \quad (26a)$$

As or after determining the payoffs at the expiration exercise point $p_N$ (t=T), net payoffs may be calculated or otherwise determined by accounting for the exercise price at the next-to-last exercise point $p_{N-1}$ (e.g., t=3), as shown in block 18w. Similar to the payoffs, the net payoffs can be determined in any of a number of different manners. In one embodiment, for example, the net payoffs may be determined by discounting the exercise price at the next-to-last exercise point by the second discount rate $r_2$ (e.g., risk-free rate), and subtracting that discounted exercise price from respective payoffs at t=T. Written notationally, for example, the net payoffs Net $S_T$ Payoff|$P^*p_{N-1,j}$ may be determined as follows:

$$\text{Net } S_T\text{Payoff}|s_{p_{N-1},k} = S_T\text{Payoff}|s_{p_{N-1},k} - x_{p_{N-1}} e^{-r_2 p_{N-1}} \quad (27)$$

From the net payoffs, respective mean net payoffs Mean Net $S_T$ Payoff|$s_{p_{N-1},k}$ may be determined for respective forecasted asset values $s_{p_{N-1},k}$, as shown in block 18x. For example, the mean net payoffs may be determined by first selecting or otherwise forecasting a number of asset values $s_{p_{N-1}}$ and $s_T$ from respective distributions of contingent future value $S_{p_{N-1}}$ and $S_T$. For those forecasted asset values, then, respective payoff and net payoff values may be calculated such as in accordance with equations (26a) and (27). The means of the calculated net payoff values may then be calculated or otherwise determined for respective forecasted asset values $s_{p_{N-1},k}$. The aforementioned steps thereby effectuating equations (26) and (27), including the expected value expression of equation (26).

As indicated above, the milestone threshold $P^*p_n$ is intended to maximize benefits (TP) and minimize regrets (FP) and omissions FN on a risk-adjusted basis. Thus, after determining the mean net payoff values, a maximum mean net payoff value may be selected from the determined or otherwise calculated mean net payoffs. The forecasted asset value $s_{p_{N-1},k}$ associated with the respective mean net payoff value may then be selected as the milestone threshold $P^*p_{N-1}$ at the respective exercise point, as shown in block 18y. And in this regard, see FIG. 12 for a graph plotting a number of mean net payoff values for a number of forecasted asset values $s_{p_{N-1},k}$, and including a selected milestone threshold associated with a maximum mean net payoff value.

As shown in block 18z, after selecting a forecasted asset value $s_{p_{N-1},k}$ that results in a maximum mean net payoff value to thereby determine the milestone threshold $P^*p_{N-1}$, the technique may repeat for any exercise points preceding the next-to-last exercise point. In this regard, K asset values may be selected or otherwise forecasted for any exercise points preceding the next-to-last exercise point, such as by starting with the exercise point immediately preceding the next-to-last exercise point $p_{N-2}$, as again shown in block 18u. The asset values $s_{p_{N-2},k}$ for this next-to-last exercise point may be selected or otherwise forecasted in any of a number of different manners. In one embodiment, for example, the asset values may be selected or otherwise forecasted from the distribution of contingent future value $S_{p_{N-2}}$.

After identifying the forecasted asset values at the preceding exercise point $s_{p_{N-2},k}$, respective payoffs or profits may be determined or otherwise calculated based thereon, as again shown in block 18v. In this regard, the payoffs or profits may be conditioned on respective forecasted asset values, and determined in any of a number of different manners, including in accordance with the DM algorithm. Written notationally, for example, the payoffs $S_T\text{Payoff}|s_{p_{N-2},k}$ may be determined as follows:

IF $S_{p_{N-2}} \geq s_{p_{N-2},k}$, $S_{p_{N-1}} \geq P^*p_{N-1}$, then $$S_T\text{Payoff}|s_{p_{N-2},k} = E[\max(S_T e^{-r_1 T} - x_T e^{-r_2 T}, 0)] - x_{p_{N-1}} e^{-r_2 p_{N-1}};$$

else, $$S_T\text{Payoff}|s_{p_{N-2},k} = 0 \quad (28)$$

And as a function of asset values $s_{p_{N-2}}$, $s_{p_{N-1}}$ and $s_T$ from respective distributions $S_{p_{N-2}}$, $S_{p_{N-1}}$ and $S_T$, the payoffs $S_T\text{Payoff}|s_{p_{N-2},k}$ may be determined as follows:

IF $s_{p_{N-2}} \geq s_{p_{N-2},k}$, $s_{p_{N-1}} \geq P^*p_{N-1}$, then $$S_T\text{Payoff}|s_{p_{N-2},k} = \max(s_T e^{-r_1 T} - x_T e^{-r_2 T}, 0) - x_{p_{N-1}} e^{-r_2 p_{N-1}};$$

else, $$S_T\text{Payoff}|s_{p_{N-2},k} = 0 \quad (28a)$$

As or after determining the payoffs at the expiration exercise point $p_N$ (t=T), net payoffs may be calculated or otherwise determined by accounting for the exercise price at the preceding exercise point $p_{N-2}$ (e.g., t=1), as again shown in block 18w. Similar to the payoffs, the net payoffs can be determined in any of a number of different manners. In one embodiment, for example, the net payoffs may be determined by discounting the exercise price at the preceding exercise point by the second discount rate $r_2$ (e.g., risk-free rate), and subtracting that discounted exercise price from respective payoffs at t=T. Written notationally, for example, the net payoffs Net $S_T$ Payoff|$s_{p_{N-2},k}$ may be determined as follows:

$$\text{Net} S_T\text{Payoff}|s_{p_{N-2},k} = S_T\text{Payoff}|s_{p_{N-2},k} - x_{p_{N-2}} e^{-r_2 p_{N-2}} \quad (29)$$

From the net payoffs, respective mean net payoffs Mean Net $S_T$ Payoff|$s_{p_{N-2},k}$ may be determined for respective forecasted asset values $s_{p_{N-2},k}$, as again shown in block 18x. For example, the mean net payoffs may be determined by first selecting or otherwise forecasting a number of asset values from respective distributions of contingent future value $S_{p_{N-2}}$, $S_{p_{N-1}}$ and $S_T$. For those forecasted asset values, then, respective payoff and net payoff values may be calculated such as in accordance with equations (28a) and (29). The means of the calculated net payoff values may then be calculated or otherwise determined for respective forecasted asset values $s_{p_{N-2},k}$. The aforementioned steps thereby effectuating equations (28) and (29), including the expected value expression of equation (28).

Similar to before, after determining the mean net payoff values, a maximum mean net payoff value may be selected from the determined or otherwise calculated mean net payoffs. The forecasted asset value associated with the respective mean net payoff value may then be selected as the milestone threshold for the respective exercise point, as again shown in block 18y.

After selecting a forecasted asset value for the preceding exercise point $s_{p_{N-2},k}$ that results in a maximum mean net payoff value to thereby determine the milestone threshold $P^*p_{N-2}$, the method may similarly continue for each further preceding exercise point, as again shown in block 18z. Thus, and more generally for each exercise points $p_n$, n=1, 2, ... N−1, asset values $s_{p_n,k}$ may be selected or otherwise forecasted from a respective distribution of contingent future value $S_{p_n}$, such as in accordance with the Monte Carlo technique for randomly generating values.

In addition to selecting or otherwise forecasting asset values $s_{p_n,k}$, payoffs (or intermediate payoffs) may be determined as the expected value of the difference between a present value distribution of contingent future benefits at the expiration exercise point (discounted by $r_1$), and the present value of the exercise price (discounted by $r_2$) at the expiration exercise point, including limiting the minimum permissible difference to a predefined value, such as zero. And for each exercise point preceding the next-to-last exercise point $p_{N-1}$, determining the payoffs may further include reducing the expected values of the difference (intermediate payoffs) by the present values of the exercise prices (discounted by $r_2$) at the one or more exercise points between the expiration exercise point and the respective exercise point. However, determining the payoffs may be further conditioned on the asset value at the respective exercise point and one or more, if not all, subsequent exercise points before the expiration exercise point $S_{p_n}$ being at least as much as, if not greater than (i.e., $\geq$), the forecasted asset values at the respective exercise points $s_{p_n,k}$, such as by setting the payoffs to zero when the asset value at an exercise point is less than the milestone threshold at the respective exercise point. Thus, written notationally, the payoffs may be determined or otherwise calculated in accordance with the following:

IF $S_{p_n} \geq s_{p_n,k}$, $\forall_m (S_{p_m} \geq P^* p_m)$, then (30)

$$S_T \text{Payoff} | s_{p_n,k} = E[\max(S_T e^{-r_1 T} - x_T e^{-r_2 T}, 0)] - \sum_{p_m} x_{p_m} e^{-r_2 p_m};$$

else, $$S_T \text{Payoff} | s_{p_n,k} = 0$$

where m=n+1, n+2, ... N−1; and $p_m = p_{n+1}, p_{n+2}, \ldots p_{N-1}$ (noting that (n+1)>(N−1) results in the empty sets m=∅, and $p_m = \emptyset$).

And as a function of asset values $s_{p_n}, s_{p_m}, \forall_m$ and $s_T$ from respective distributions $S_{p_n}, S_{p_m}, \forall_m$ and $S_T$, the payoffs $S_T$ Payoff|$s_{p_n,k}$ may be determined as follows:

IF $s_{p_n} \geq s_{p_n,k}$, $\forall_m (s_{p_m} \geq P^* p_m)$, then (30a)

$$S_T \text{Payoff} | s_{p_n,k} = \max(s_T e^{-r_1 T} - x_T e^{-r_2 T}, 0) - \sum_{p_m} x_{p_m} e^{-r_2 p_m};$$

else, $$S_T \text{Payoff} | s_{p_n,k} = 0$$

As or after determining the payoffs for an exercise point $p_n$, respective net payoffs at the respective exercise point may be determined or otherwise calculated, such as by reducing the payoffs by the present value of the exercise price (discounted by $r_2$) at the respective exercise point. Written notationally, the net payoffs may be determined or otherwise calculated in accordance with the following:

$$\text{Net} S_T \text{Payoff} | s_{p_n,k} = S_T \text{Payoff} | s_{p_n,k} - x_{p_n} e^{-r_2 p_n} \quad (31)$$

From the net payoffs Net $S_T$ Payoff|$s_{p_n,k}$, respective mean net payoffs Mean Net $S_T$ Payoff|$s_{p_n,k}$ may be determined for respective forecasted asset values $s_{p_n,k}$. Again, for example, the mean net payoffs may be determined by first selecting or otherwise forecasting a number of asset values $s_{p_n}, s_{p_m}, \forall_m$ and $s_T$ from respective distributions of contingent future value $S_{p_n}, S_{p_m}, \forall_m$ and $S_T$. For those forecasted asset values, then, respective payoff and net payoff values may be calculated such as in accordance with equations (30a) and (31). The means of the calculated net payoff values may then be calculated or otherwise determined, and a maximum mean net payoff value selected from the determined or otherwise calculated mean net payoffs. The aforementioned steps being performed to thereby effectuate equations (30) and (31), including the expected value expression of equation (30). The forecasting asset value $s_{p_n,k}$ associated with the respective mean net payoff value may then be selected as the milestone threshold for the respective exercise point $p_n$.

Similar to the zero-crossing technique, K asset values $s_{p_n,k}$ may be forecasted (see step 18u) before determining respective payoffs (see step 18v), net and mean net payoffs (see steps 18w and 18x), and the maximum mean net payoff Mean Net $S_T$ Payoff|$s_{p_n}$ (see step 18y). This may be referred to as a static determination of the milestone threshold $P^*p_n$. Alternatively, however, the payoff, net and mean net payoffs, and maximum mean net payoff may be determined as each of the K asset values is forecast, in a manner referred to as a dynamic determination of the milestone threshold $P^*p_n$. In such instances, the payoff, net and mean net payoffs may be determined based upon the currently forecasted asset value. The mean net payoff, however, may be determined based upon the net payoff for the currently forecasted asset value, as well as the net payoffs for any, or all, previously forecasted asset values. In this regard, the function and its root may be built and refined as more asset values are forecasted.

Returning to FIG. 1, irrespective of exactly how the milestone thresholds $P^*p_n$ at the exercise points $p_n$, n=1, 2, ... N−1 before the expiration exercise point $p_N$ are estimated or otherwise determined, the value of the multi-stage option may thereafter be determined or otherwise calculated based thereon. The value of the multi-stage option may be determined in any of a number of different manners. For example, the value of the multi-stage option may be considered a payoff, which may be determined based upon the previously determined distributions of contingent future value $S_{p_n}$, n=1, 2, ... N, as shown in block 20. More particularly, for example, determining a payoff $S_T$ Payoff may include determining the expected value of the difference between a present value distribution of contingent future benefits at the expiration exercise point $p_N$ (t=T) (discounted by $r_1$), and the present value of the exercise price (discounted by $r_2$) at the expiration exercise point, including limiting the minimum permissible difference to a predefined value, such as zero. The expected value of the difference may be further reduced by the present values of the exercise prices (discounted by $r_2$) at the one or more exercise points preceding the expiration exercise point ($p_n$, n<N).

As indicated above, the milestone thresholds $P^*p_n$ at the exercise points may represent the minimum asset value (future benefits value) at which a reasonably prudent participant will exercise the contingent claim at the respective exercise point. Thus, determining the payoff may be further conditioned on the asset value at one or more, if not all, exercise points up to the expiration exercise point $(p_{n+1}, p_{n+2}, \ldots p_{N-1})$ being at least as much as, if not greater than (i.e., $\geq$), the milestone threshold at the respective exercise points $(P^*p_{n+1}, P^*p_{n+2}, \ldots P^*p_{N-1})$, such as by setting or otherwise reducing the payoff to zero when the asset value at an exercise point is less than the milestone threshold at the respective exercise point. Thus, written notationally, the payoff may be determined or otherwise calculated in accordance with the following:

$$\text{IF } \forall_{n<N} (s_{p_n} \geq P^* p_n), \text{ then} \qquad (32)$$

$$S_T Payoff = E[\max(S_T e^{-r_1 T} - x_T e^{-r_2 T}, 0)] - \sum_{n<N} x_{p_n} e^{-r_2 p_n};$$

else, $$S_T Payoff = 0$$

And as a function of asset values $s_{p_n}$, $\forall_{n<N}$ and $s_T$ from respective distributions of contingent future value $S_{p_n}$, $\forall_{n<N}$ and $S_T$, the payoff $S_T$ Payoff may be determined as follows:

$$\text{IF } \forall_{n<N} (s_{p_n} \geq P^* p_n), \text{ then} \qquad (32a)$$

$$S_T Payoff = \max(s_T e^{-r_1 T} - x_T e^{-r_2 T}, 0) - \sum_{n<N} x_{p_n} e^{-r_2 p_n};$$

else, $$S_T Payoff = 0$$

As or after determining the payoff for the multi-stage option, the mean payoff for the multi-stage option (value of the multi-stage option) may be determined, such as by selecting or otherwise forecasting a number of asset values $s_{p_n}$, $\forall_{n<N}$ and $s_T$ from respective distributions of contingent future value $S_{p_n}$, $\forall_{n<N}$ and $S_T$; calculating, for those forecasted asset values, payoff values such as in accordance with equation (32a); and calculating or otherwise determining the mean of the calculated payoff values, such as in a manner similar to that explained above, as shown in block 22. The aforementioned steps thereby effectuating equation (32), including the expected value expression.

Written in other terms, the value of the multi-stage option may be expressed as follows:

$$E[E_{S_{p1}} \ldots [E_{S_{pN-2}}[E_{S_{pN-1}}[Z_0^T(r_1,r_2)] - x_{pN-1}e^{-r_2 pN-1}]-x_{pN-1}e^{-r_2 pN-2}] \ldots -x_{p1}e^{-r_2 p1}] \times p(\forall_{n<N}(S_{p_n} \geq P^* p_n))$$

The above expression may be interpreted as subtracting, from the discounted payoff at the expiration exercise point (t=T), the discounted exercise prices for all of the exercise points before the expiration exercise point; and multiplying the resulting payoff by the probability that, for the exercise points before the expiration exercise point, the asset values at the exercise points are greater than respective milestone thresholds for those exercise points. Also in the expression the "+" superscript represents a maximization function limiting the discounted payoff to a minimum predefined value, such as zero.

From the above, the value of the multi-stage option can be understood as the value of a series of embedded expectations, with each expectation stage having an associated cost to continue to the subsequent stage. The expectations may arise because of the uncertainty of the payoff at each stage, thus valued as a mean or expected value of the sum total of all potential outcomes at each stage. The expectations may be embedded because success (or net payoff greater than zero) at an earlier stage allows forward progress to the subsequent stage of the project. Failure (or net payoffs which are limited to zero) may terminate forward progress of the project. Milestone thresholds $P^*p_n$ are calculated for each stage or exercise point before the expiration exercise point. If project value at Stage n is such that $s_{p_n} > P^* p_n$, there may be sufficient probability to expect that the subsequent stage(s) will be successful, and therefore a cost $x_{p_n}$ may be incurred to continue to the subsequent stage. The cost $x_{p_n}$ may be weighted by the probability of actually incurring the cost dependent on the success or failure of proceeding stages. The value of the multi-stage option may be the present value of the expiration point payoffs less the cost of having traversed some or all the intermediate decision points, and thus incurred a cost $x_{p_n}$ to continue to a subsequent point weighted by the probability of actually traversing some or all of the intermediate decision points.

FIG. 13 furthers the example of FIGS. 3, 4, 5 and 8, and illustrates a number of different a conditional paths the asset value may take from the preceding exercise point, through the next-to-last exercise point to the expiration exercise point for an initial mean asset value. Similar to FIG. 8, as shown in FIG. 13, a path at a particular exercise point may represent a TP, FP or N. FIG. 14, then, furthers the example by illustrating a distribution of payoff values for a number of calculated payoff values for valuation of the multi-stage option.

B. Early-Launch Option

In accordance with one exemplary embodiment of the present invention, a contingent-claim valuation may be performed for an early-launch option over a period of time including one or more payout points (e.g., dividend points), and an expiration point. A payout at a payout point may represent reduction or impairment of total value of the asset at the expiration point. The impairment may be the result of any number of events, such as a competitor entering the market and taking market share by sale of a competing product or technology, and thus reducing the total project value available at the expiration point. In such instances, in an effort to prevent the possible impairment of project value, the product or technology may be launched early into the market, prior to that of the competitor's product or technology, thus potentially preserving the entire project value. However, this may require the flexibility to launch early, prior to the expected expiration point. Such additional flexibility may be valuable, and the value may be in addition to that of the expiration option. Valuation of early launch option in accordance with exemplary embodiments of the present invention therefore may calculate or otherwise determine the total value of the flexibility in determining a launch point that attempts to preserve the full project value.

As indicated above, an early-launch option may include a contingent claim at a single, variable exercise point, which may coincide with any of the payout point(s) within the period of time. Exemplary embodiments of the present invention will now be described with reference to a period of time including a single payout point at which the contingent claim may or may not be exercised early, before the expiration point. But it should be understood that embodiments of the present invention may be equally applicable to instances in which the period of time includes multiple payout points.

Referring to FIG. 15, a method of performing a contingent claim valuation of an early-launch option according to one exemplary embodiment of the present invention may begin by defining a period of time and a payout point within that period of time, as shown in block 30. Again, the period of time can begin at t=0 and extend to t=T, and can be divided into a number of different time segments. Within the defined period of time, a time segment may correspond to the payout point, and another time segment may correspond to a final or expiration exercise point at t=T, where the payout point and expiration exercise point may generally be referred to as "decision points" within the period of time. In one embodiment, for example, the time period T is defined such that each time segment and decision point can be represented as an integer divisors of T, i.e., t=0, 1, 2, ... T. The number N of decision points may be defined as $p_n$, n=1, 2, ... N≦T, where each $p_n$ corresponds to a selected time segment of the period of time; and where for one payout point, $p_1$ may refer to the payout point, and $p_2$ may refer to the expiration exercise point. Thus, for example, the period of time can be defined as a number of years (e.g., T=5) divided into a number of one-year time segments which, including the initial time t=0, totals the number of years plus one time segment (e.g., t=0, 1, 2, ... 5). Again, each time segment may begin at time t and end at time t+1 (presuming the time segment is an integer divisor of T), and may be defined by the beginning time t. Thus, time segment t=1 may extend from time t=1 to time t=2. Similarly, time segment t=2 may extend from t=2 to t=3. For an example of the time segments for a period of time, as well as the decision points within that period of time, see Table 5 below.

TABLE 5

First Discount Rate 12% Second Discount Rate 5%

| | Time Segment | | | | | |
|---|---|---|---|---|---|---|
| | 0 | 1 | 2 | 3 | 4 | 5 |
| Decision Point | | | | | $p_1 = 4$ | Expiration ($p_2 = 5$) |
| Uncertainty | 40% | 40% | 40% | 40% | 40% | 40% |
| Payout Price | | | | | $50.00 | |
| Exercise Price | | | | | | $140.00 |

Before, during or after defining the time period, a number of parameters may be selected, determined or otherwise calculated for subsequent use in performing a contingent-claim valuation in accordance with this exemplary embodiment of the present invention, as shown in block 32. These parameters may include first and second discount rates, $r_1$ and $r_2$; uncertainty, or volatility, in the market including the asset for each decision point $p_n$ (or more generally for each segment of the period of time t); a payout (e.g., dividend) price y that may impair the value of the asset (future benefits value) subsequent to the payout point, and an exercise price x for the expiration exercise point. These parameters may be selected, determined or otherwise calculated in any of a number of different manners, such as in a manner similar to that explained above with reference to performing a multi-stage option valuation. For examples of these parameters, see Table 5. And more particularly as to the payout price y, the price may be represented as an absolute value. Alternatively, however, the price y may be represented as a relative value with respect to a mean value of the asset at the respective decision point or at a subsequent decision point. For example, the price $y_{p_n}$ may be represented as a percentage of the asset value $s_{p_n}$ at the respective decision point. Note that the payout price $y_{p_n}$ may be defined as occurring immediately prior to $S_{p_n}$ such that $S_{p_n^-} = S_{p_n^-} - y_{p_n}$, where $S_{p_n^-}$ may represent a distribution of contingent future value at the respective decision point, but before the payout at that point.

Also before, during or after defining the time period, an initial, mean asset value may, but need not, be defined for the initial time segment (t=0), such as in a manner similar to that explained above with reference to performing a multi-stage option valuation, as shown in block 34. Also, a revenue or value distribution S can be determined or otherwise calculated for each decision point $p_n$ (payout and expiration exercise points), and may be determined or otherwise calculated along with correlation coefficients representing relationships between successive distributions, as shown in block 36. Further, as suggested above, a revenue or value distribution may be determined for the payout point $p_1$, but before the payout; and also for the payout point after the payout. Thus, $p_T$ may refer to the payout point before the payout at that point, and $p_1$ may refer to the payout point after the payout. As before, each value distribution may be considered a distribution of contingent future value. In the early-launch case, however, the distribution of contingent future value at both the expiration exercise point and the decision point before the expiration exercise point, $p_n$, may be considered a distribution of contingent future benefits as the contingent claim may be exercised at the expiration exercise point, or at a decision point before the expiration exercise point. Each distribution of contingent future benefits $S_{p_n}$ and correlation coefficient $Coeff_{p_a, p_b}$ can be determined in any of a number of different manners, such as in a manner similar to that explained above with reference to performing a multi-stage option valuation (including determining the mean value $\mu_{S_{pn}}$ and standard deviation $\sigma_{S_{pn}}$). As the payout price at the payout point may impair the asset value subsequent to the payout point, however, the mean value from which the distribution of contingent future benefits at the expiration exercise point may be determined in a manner that more particularly accounts for this impairment. More particularly, for example, the mean value and standard deviation at the expiration exercise point may be determined as follows:

$$\mu_{S_T} = (\mu_{S_{p1}} - y_{p1}) \times e^{r1(T-p1)} \tag{33}$$

$$\sigma_{S_T} = \mu_{S_T} \times \sqrt{e^{v^2 \times (T-p1)} - 1} \tag{34}$$

where $\mu_{S_{p1}}$ represents the mean value at the payout point and may be determined in accordance with equation (1).

Continuing the example of Table 5 above, see Table 6 below for an example of the initial mean value, as well as the mean values and standard deviations each of the decision points $p_n$, n=1, 2 (t=4, 5), and the correlation coefficient for the distribution at decision point $p_1$ with reference to the distribution at decision point $p_2$. Further, FIG. 17 illustrates distributions of contingent future benefits $S_{p_n}$ defined for decision points $p_n$, n=1, 2 (t=4, 5) for the example in Tables 1 and 2.

TABLE 6

Initial Mean Value $100.00

| | Time Segment | | | | | |
|---|---|---|---|---|---|---|
| | 0 | 1 | 2 | 3 | 4 | 5 |
| Decision Point | | | | | $p_1 = 4$ | Expiration ($p_2 = 5$) |
| Mean Value | $100.00 | | | | $161.61 | $125.84 |
| Standard Deviation | $ 0.00 | | | | $153.01 | $139.31 |

TABLE 6-continued

Initial Mean Value $100.00

| | Time Segment | | | | | |
|---|---|---|---|---|---|---|
| | 0 | 1 | 2 | 3 | 4 | 5 |
| Correlation Coefficient | | | | | 0.89 ($p_4$, $p_5$) | |

Irrespective of exactly how the distributions of contingent future benefits $S_{p_n}$ are determined, the value of the early-launch option may be determined or otherwise calculated based thereon. Before determining the value of the early-launch option, however, exemplary embodiments of the present invention may account for situations in which a reasonably prudent participant may exercise the option at the payout point before the expiration exercise point, owing to a typical reduction in the expiration payoff due to the payout at the respective point. More particularly, exemplary embodiments of the present invention may calculate or otherwise determine a milestone threshold for the payout point $p_1$, where the milestone threshold represents the minimum asset value at which a reasonably prudent participant will exercise the contingent claim early at that payout point.

Similar to performing the contingent claim valuation of a multi-stage option, performing a contingent claim valuation of an early-launch option may include determining or otherwise calculating a milestone threshold P* for the payout point, such as to facilitate maximizing benefits (TP) and minimize regrets (FP) and omissions FN on a risk-adjusted basis, as shown in block 38. In this regard, the milestone threshold for the payout point P*$p_1$ may correspond to the asset value at the payout point likely to result in a final value at the expiration time segment substantially equal to a value associated with exercising the option at the respective payout point (e.g., an asset value plus expiration exercise price being expended at the payout point). Note that the milestone threshold P*$p_1$ may be defined with respect to the payout point before the payout, such as with respect to $S_{p_n}$.

The milestone threshold for the payout point P*$p_1$ may be determined in any of a number of different manners, such as in accordance with one or more of the aforementioned "benefit-regret" technique, "arc" technique, "zero-crossing" technique or "sorted list" technique for determining a milestone threshold, or in accordance with a "conditional" technique for determining a milestone threshold. The benefit-regret, arc, sorted list and conditional techniques will now be described below with reference to FIGS. 16a-16d.

1. Benefit-Regret Technique for Determining Milestone Thresholds

Figure 16A:
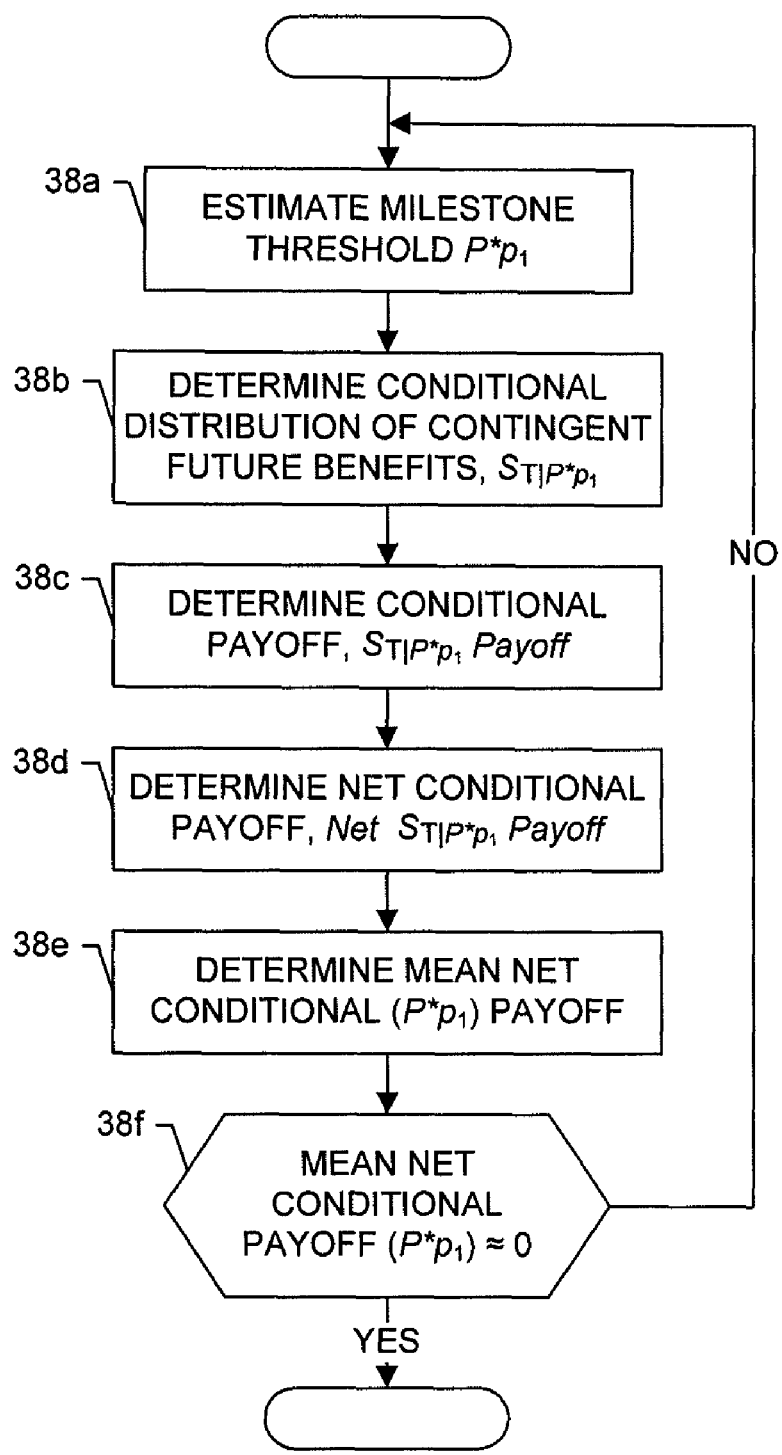

Referring to FIG. 16a, determining the milestone threshold according to the benefit-regret technique of one exemplary embodiment of the present invention may include estimating a milestone threshold for the payout point P*$p_1$, as shown in block 38a. The milestone threshold for this next-to-last decision point may be estimated in any of a number of different manners. For example, the milestone threshold for the payout point may be estimated to be approximately equal to the determined mean asset value at that decision point $\mu_{S_{p_1}}$ (see equation (1)). Continuing the example of Tables 5 and 6, see Table 7 below for a more particular example of an estimated milestone threshold for the payout point $p_1$ (t=4) (the respective milestone threshold in the example being represented by P*$p_1$=P*4).

TABLE 7

| | Time Segment | | | | | |
|---|---|---|---|---|---|---|
| | 0 | 1 | 2 | 3 | 4 | 5 |
| Decision Point | | | | | $p_1$ = 1 | Expiration ($p_3$ = 5) |
| Estimated Threshold (P*$p_1$) | | | | | $200.00 | |
| $S_{5|P*4}$ Mean Value | | | | | | $169.12 |
| $S_{5|P*4}$ Standard Deviation | | | | | | $ 70.45 |

Irrespective of exactly how the milestone threshold for the payout point P*$p_1$ is estimated, a value distribution at the expiration exercise point $p_2$ (t=T) may thereafter be determined, where the value distribution is conditioned on the estimated milestone threshold at the payout point, as shown in block 38b. In this regard, the value distribution may be considered a conditional distribution of contingent future benefits at the expiration exercise point $p_2$ (t=T), conditioned on the estimated value of the asset (milestone threshold) at the payout point P*$p_1$. This conditional distribution of contingent future benefits $S_{T|P*p_1}$ may be determined in any of a number of different manners ($S_{T|P*p_n}$ more generally referring to the distribution of contingent future benefits, conditioned on the estimated value at the payout point P*$p_n$). In one embodiment, for example, the conditional distribution of contingent future benefits may be determined based upon a conditional mean asset value at the expiration exercise point $\mu_{S_{T|P*p_1}}$ and a conditional standard deviation in time for the expiration exercise point $\sigma_{S_{T|P*p_1}}$, such as in accordance with the following:

$$\mu_{S_{T|P*p1}} = (P*p_1 - y_{p1}) \times e^{r1(T-p1)} \quad (35)$$

$$\sigma_{S_{T|P*p1}} = \mu_{S_{T|P*p1}} \times \sqrt{e^{u^2 \times (T-p1)} - 1} \quad (36)$$

In the preceding equation (35), $y_{p_1}$ represents the payout price at the payout point $p_1$ (e.g., $50.00) ($y_{p_n}$ more generally representing the payout price at the payout point $p_n$). For an example of the mean value and standard deviation for a conditional distribution of future benefits for the expiration exercise point $p_2$ (t=T) of the example of Tables 5 and 6, and the estimated milestone threshold for the payout point P*$p_{N-1}$, see Table 7.

After determining the conditional mean and standard deviation for the expiration exercise point, a conditional distribution of contingent future benefits at the expiration exercise point $S_{T|P*p_1}$ can be determined by defining the conditional distribution according to the respective mean value and standard deviation. Again, the conditional distribution of contingent future benefits can be represented as any of a number of different types of distributions but, in one embodiment, the conditional distribution of contingent future benefits is defined as a lognormal distribution. In this regard, see FIG. 18 for a distribution of contingent future benefits $S_T$ for the expiration exercise point $p_2$, (t=5), along with an estimated milestone threshold P*$p_1$ and conditional distribution of contingent future benefits $S_{T|P*p_1}$ for the payout point $p_1$ (t=4), for the example of Tables 5, 6 and 7. In addition, FIG. 18 illustrates, with reference to the distribution of contingent future benefits, a similar distribution without accounting for any impairment resulting from the payout of the payout price at the payout point $y_{p_1}$.

Irrespective of exactly how the conditional distribution of contingent future benefits at the expiration exercise point $S_{T|P*p_1}$ is determined, a conditional payoff or profit may be determined or otherwise calculated based thereon, as shown in block 38c. The conditional payoff $S_{T|P*p_1}$ Payoff can be determined in any of a number of different manners, such as in a manner similar to that explained above with reference to performing a multi-stage option valuation (see equations (6) and (6a)).

As or after determining the conditional payoff at the expiration exercise point $p_2$ (t=T), the net conditional payoff may be calculated or otherwise determined by accounting for the payout price at the payout point $p_1$ (e.g., t=4) and again accounting for the exercise price at the expiration exercise point, now representing a price for exercising the option at the payout point, as shown in block 38d. Similar to the conditional payoff, the net conditional payoff can be determined in any of a number of different manners. In one embodiment, for example, the net conditional payoff may be determined by discounting the estimated milestone threshold $P^*p_1$ by the first discount rate and discounting the exercise price at the expiration exercise point by the second discount rate $r_2$ (accounting for early exercise of the contingent claim at the payout point), and subtracting the difference of the discounted milestone threshold and exercise price from the conditional payoff at t=T. Written notationally, for example, the net conditional payoff Net $S_{T|P^*p_1}$ Payoff may be determined as follows:

$$\text{Net} S_{T|P^*p_1}\text{Payoff} = S_{T|P^*p_1}\text{Payoff} - (P^*p_1 e^{-r_1 p_1} - x_T e^{-r_2 p_1}) \quad (37)$$

where $x_T$ again represents the exercise price (e.g., contingent future investment) at the expiration exercise point $p_2$ (t=T) (e.g., $x_T$=$140.00).

From the net conditional payoff, the mean net conditional payoff may be determined, as shown in block 38e. For example, the mean net conditional payoff Mean Net $S_{T|P^*p_1}$ Payoff may be determined by selecting or otherwise forecasting a number of conditional asset values $s_{T|P^*p_1}$ from the conditional distribution of contingent future benefits $S_{T|P^*p_1}$; calculating, for those forecasted asset values, conditional payoff and net conditional payoff values such as in accordance with equations (6a) and (37); and calculating or otherwise determining the mean of the calculated net conditional payoff values. The aforementioned steps thereby effectuating equations (6) and (37), including the expected value expression of equation (6).

FIG. 19 continues the example of FIG. 18, and illustrates two of a number of different a conditional paths the asset value may take from the payout point to the expiration exercise point for an estimated threshold, where one of the paths represents a true positive (TP) leading to a resulting benefit, and the other path represents a false positive (FP) leading to a resulting regret. And FIG. 20 furthers the example by illustrating a distribution of net conditional payoff values for a number of calculated net conditional payoff values (conditioned on a milestone threshold at the payout point $P^*p_1$).

As indicated above, the milestone threshold $P^*p_1$ is intended to result in a final value (payoff value) at the expiration exercise point substantially equal to a value associated with exercising the option at the payout point (e.g., an asset value plus expiration exercise price being expended at the payout point). In other words, the milestone threshold is intended to result in a net conditional payoff value of approximately zero, as shown in FIG. 16a, block 38f, and in FIG. 20. Thus, after determining the mean net conditional payoff value Mean Net $S_{T|P^*p_1}$ Payoff, if the mean net conditional payoff value does not equal approximately zero, another milestone threshold $P^*p_1$ may be estimated for the payout point $P^*p_1$. The method may then repeat determining a conditional distribution of contingent future benefits $S_{T|P^*p_1}$, determining a conditional payoff $S_{T|P^*p_1}$ Payoff, net conditional payoff Net $S_{T|P^*p_1}$ Payoff and mean net conditional payoff Mean Net $S_{T|P^*p_1}$ Payoff, and determining if the mean net conditional payoff value equals approximately zero. The method may continue in this manner until an estimated milestone threshold $P^*p_1$ results in a mean net conditional payoff value equal to approximately zero. This estimated milestone threshold may then be considered the milestone threshold for the respective decision point. FIG. 21 illustrates two of a number of different conditional paths the asset value may take from the payout point to the expiration exercise point for three different candidate milestone thresholds, again in the context of the example provided above.

Written in other terms, it may be said that the threshold milestone $P^*p_1$ for the payout point $p_1$ solves the following expression:

$$E[Z_0^T(r_1, r_2)|_{(s_{pT}=P^*p_1)}] = E[Z_0^{pT}(r_1, r_2)|_{(s_{pT}=P^*p_1)}],$$

$$Z_{t_1}^{t_2}(r_1, r_2) = [s_{t_2} e^{-r_1(t_2-t_1)} - x_{t_2} e^{-r_2(t_2-t_1)}]^+,$$

$$E[Z_0^{pT}(r_1, r_2)|_{(s_{pT}=P^*p_1)}] = [P^*p_1 e^{-r_1 p_1} - x_T e^{-r_2 p_1}]$$

In the preceding, the milestone threshold $P^*p_1$ may be the asset value $s_{pT}$ of indifference between the decision to immediately launch at the respective payout point before the payout in an attempt to preserve total asset value, and the decision to wait or delay another period of time until the expiration point, at which another decision to launch or terminate the project may be made. The valuation to immediately launch may be equal to the asset value $s_{pT}$ less the exercise cost $x_T$, and may be referred to as the intrinsic value. The valuation to wait or delay may be subject to uncertainty and calculated according to a single-stage option, such as in accordance with the DM algorithm, or Z-function. Thus, the expression $s_{pT} \approx P^*p_1$ may result when both the intrinsic value and the option value, discounted to t=0, are equal (or approximately equal). Note that the intrinsic value defined at $P^*p_1$ may be a constant.

2. Arc Technique for Determining Milestone Thresholds

Figure 16B:
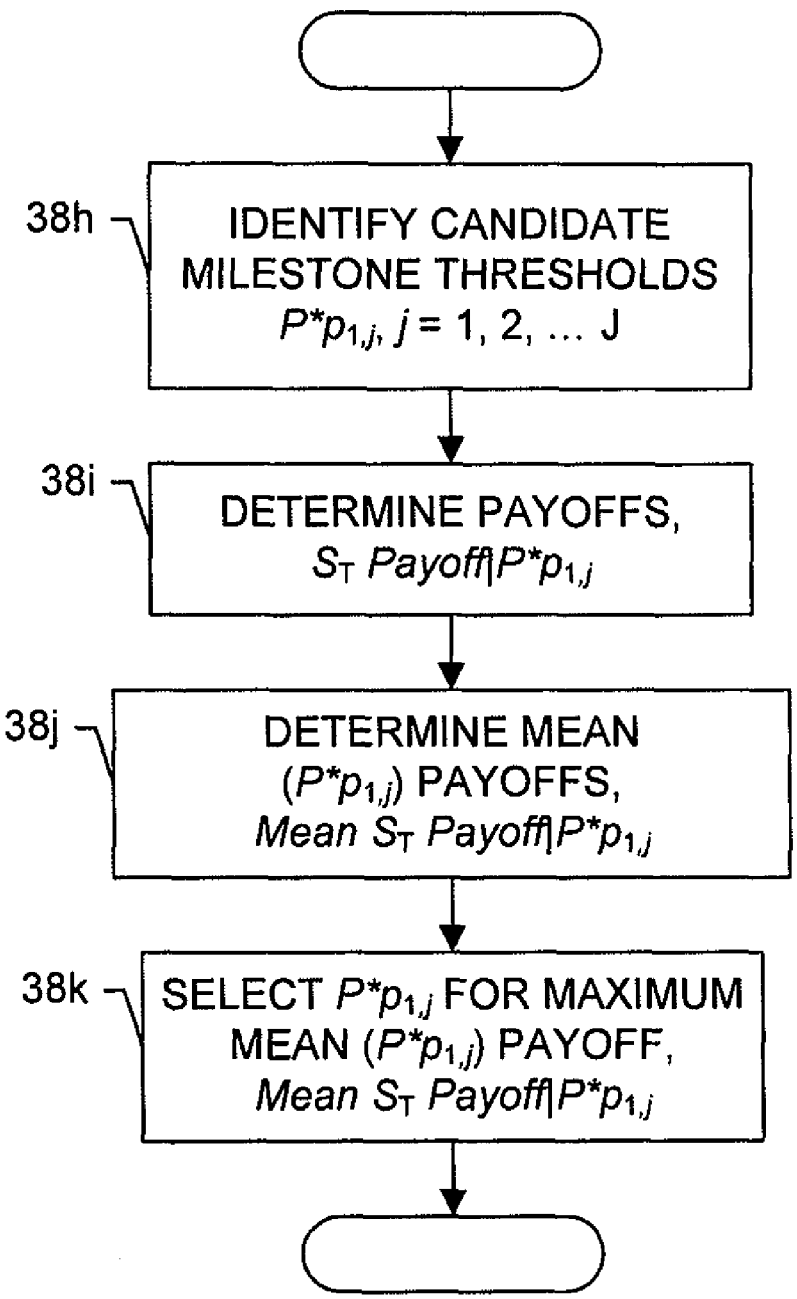

Referring to FIG. 16b, determining each milestone threshold according to the arc technique of one exemplary embodiment of the present invention may include identifying J candidate milestone thresholds for the payout point $P^*p_{1,j}$, j=1, 2, . . . J, as shown in block 38h. The candidate milestone thresholds for the payout point may be identified in any of a number of different manners. For example, the milestone thresholds for the payout point may be identified to be a number of equidistant values on either side of the determined mean asset value at that point $\mu_{S_{p1}}$ (see equation (1)).

Irrespective of exactly how the candidate milestone thresholds for the payout point $P^*p_{1,j}$ are identified, respective payoffs or profits may be determined or otherwise calculated based thereon, as shown in block 38i. In this regard, the payoffs or profits may be conditioned on respective candidate milestone thresholds, and determined in any of a number of different manners, including in accordance with the DM algorithm. Written notationally, for example, the payoffs $S_T$ Payoff|$P^*p_{1,j}$ may be determined as follows:

IF $S_{p_1} \geq P^*p_{1,j}$, then $$S_T \text{Payoff}|P^*p_{1,j} = S_{p_1} e^{-r_1 p_1} - x_T e^{-r_2 p_1};$$

else, $$S_T \text{Payoff}|P^*p_{1,j} = E[\max(S_T e^{-r_1 T} - x_T e^{-r_2 T}, 0)] \quad (38)$$

And as a function of asset values $s_{p_1}$ and $s_T$ from respective distributions of contingent future value $S_{p_1}$ and $S_T$, the payoffs $S_T$ Payoff|$P^*p_{1,j}$ may be determined as follows:

IF $s_{p_1} \geq P^*p_{1,j}$, then $$S_T \text{Payoff}|P^*p_{1,j} = s_{p_1} e^{-r_1 p_1} - x_T e^{-r_2 p_1};$$

else, $$S_T \text{Payoff}|P^*p_{1,j} = \max(s_T e^{-r_1 T} - x_T e^{-r_2 T}, 0) \quad (38a)$$

As or after determining the payoffs at the expiration exercise point $p_2$ (t=T), respective mean payoffs Mean $S_T$ Payoff|$P^*p_{1,j}$ may be determined for respective candidate milestone thresholds $P^*p_{1,j}$, as shown in block 38j. For example, the mean payoffs may be determined by first selecting or otherwise forecasting a number of asset values $s_{p_1}$ and $s_T$ from respective distributions of contingent future benefits $S_{p_1}$ and $S_T$. For those forecasted asset values, then, respective payoff values may be calculated such as in accordance with equation (38a). The means of the calculated payoff values may then be calculated or otherwise determined for respective candidate milestone thresholds $P^*p_{1,j}$. The aforementioned steps thereby effectuating equation (38), including its expected value expression.

Again, the milestone threshold $P^*p_1$ is intended to maximize benefits (TP) and minimize regrets (FP) and omissions FN on a risk-adjusted basis, as indicated above. Thus, after determining the mean payoff values, a maximum mean payoff value may be selected from the determined or otherwise calculated mean payoffs. The candidate milestone threshold associated with the respective mean payoff value may then be selected as the milestone threshold for the payout point, as shown in block 18k. And in this regard, see FIG. 22 for a graph plotting a number of mean net payoff values for a number of candidate milestone thresholds, and including a selected milestone threshold associated with a maximum mean payoff value.

3. Sorted List Technique for Determining Milestone Thresholds

Figure 16C:
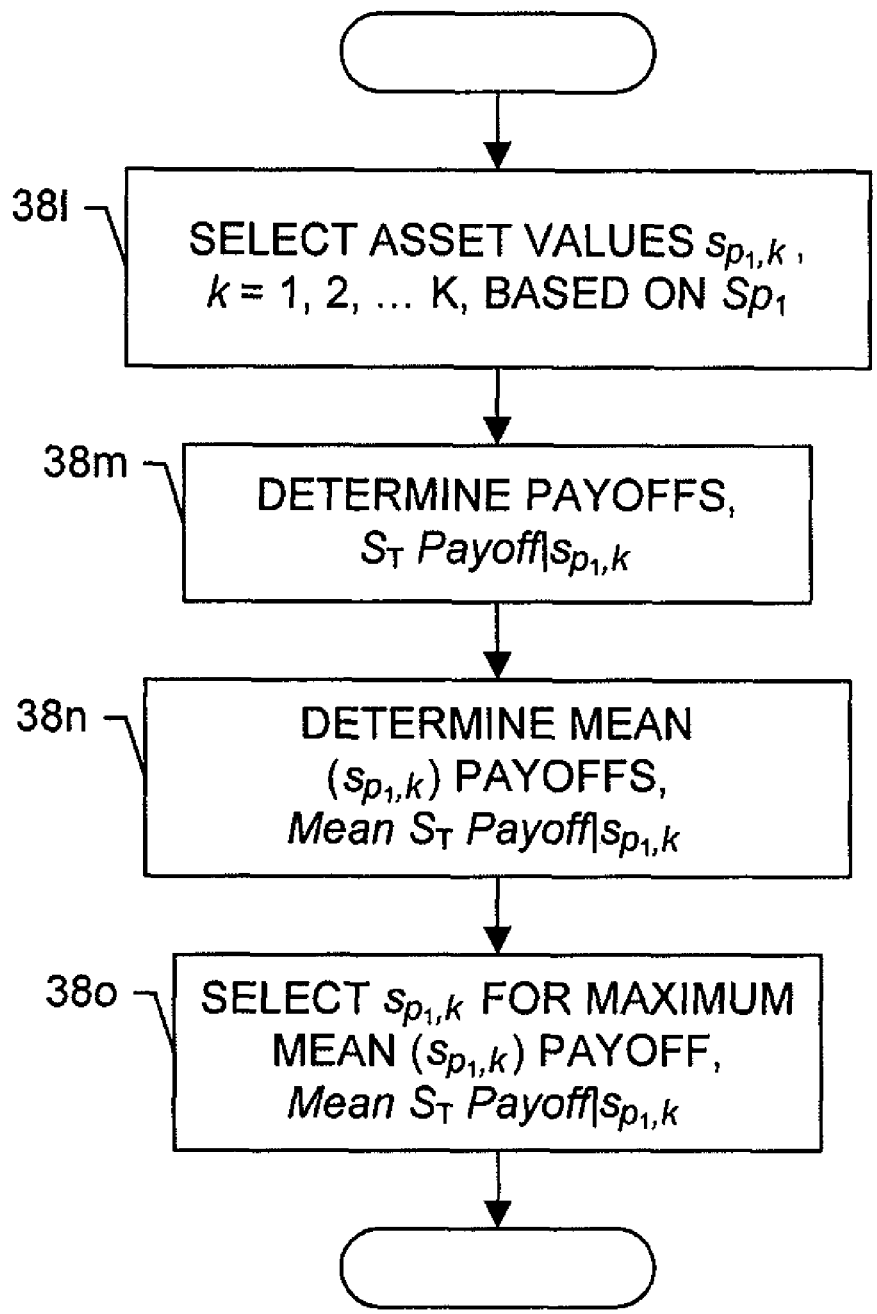

Referring to FIG. 16c, determining each milestone threshold according to the sorted-list technique of one exemplary embodiment of the present invention may include selecting or otherwise forecasting K asset values at the payout point $s_{p_1,k}$, k=1, 2, . . . K, as shown in block 38l. The asset values at the payout point may be selected or otherwise forecasted in any of a number of different manners. In one embodiment, for example, the asset values may be selected or otherwise forecasted from the distribution of contingent future value $S_{p_1}$, such as in accordance with the Monte Carlo technique for randomly generating values. In such instances, the distribution of contingent future value may have been determined in the manner explained above with reference to equations (1) and (2).

Irrespective of exactly how the asset values are forecasted, respective payoffs or profits may be determined or otherwise calculated based thereon, as shown in block 38m. In this regard, the payoffs or profits may be conditioned on respective forecasted asset values, and determined in any of a number of different manners, including in accordance with the DM algorithm. Written notationally, for example, the payoffs $S_T$ Payoff|$s_{p_1,k}$ may be determined as follows:

IF $S_{p_1} \geq s_{p_1,k}$, then $$S_T \text{Payoff}|s_{p_1,k} S_{p_1} e^{-r_1 p_1} - x_T e^{-r_2 p_1};$$

else, $$S_T \text{Payoff}|s_{p_1,k} = E[\max(S_T e^{-r_1 T} - x_T e^{-r_2 T}, 0)] \quad (39)$$

And as a function of asset values $s_{p_1}$ and $s_T$ from respective distributions of contingent future value $S_{p_1}$ and $S_T$, the payoffs $S_T$ Payoff|$s_{p_1,k}$ may be determined as follows:

IF $s_{p_1} \geq s_{p_1,k}$, then $$S_T \text{Payoff}|s_{p_1,k} = s_{p_1} e^{-r_1 p_1} - x_T e^{-r_2 p_1};$$

else, $$S_T \text{Payoff}|s_{p_1,k} = \max(s_T e^{-r_1 T} - x_T e^{-r_2 T}, 0) \quad (39a)$$

As or after determining the payoffs at the expiration exercise point $p_2$ (t=T), respective mean payoffs Mean $S_T$ Payoff|$s_{p_1,k}$ may be determined for respective forecasted asset values $s_{p_1,k}$, as shown in block 38n. For example, the mean payoffs may be determined by first selecting or otherwise forecasting a number of asset values $s_{p_1}$ and $s_T$ from respective distributions of contingent future benefits $S_{p_1}$ and $S_T$. For those forecasted asset values, then, respective payoff values may be calculated such as in accordance with equation (39a). The means of the calculated payoff values may then be calculated or otherwise determined for respective forecasted asset values $s_{p_1,k}$. The aforementioned steps thereby effectuating equation (39), including its expected value expression.

Similar to the case of the arc technique, the milestone threshold $P^*p_1$ is intended to maximize benefits (TP) and minimize regrets (FP) and omissions FN on a risk-adjusted basis, as indicated above. Thus, after determining the mean payoff values, a maximum mean payoff value may be selected from the determined or otherwise calculated mean payoffs. The forecasted asset value $s_{p_1,k}$ associated with the respective mean payoff value may then be selected as the milestone threshold for the payout point $P^*p_1$, as shown in block 18o.

4. Conditional Technique for Determining Milestone Thresholds

Figure 16D:
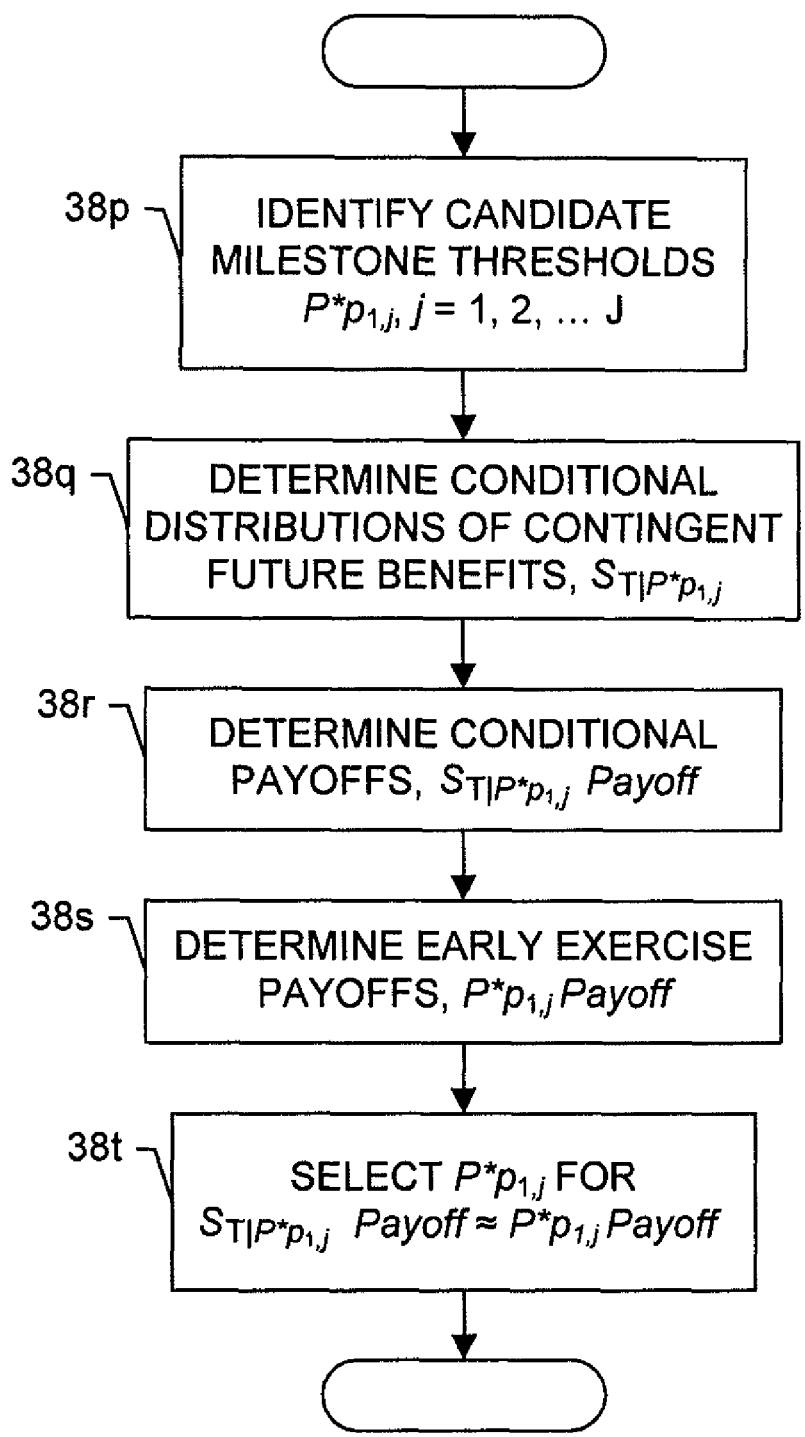

Referring to FIG. 16d, determining the milestone threshold according to the conditional technique of one exemplary embodiment of the present invention may include identifying J candidate milestone thresholds for the payout point $P^*p_{1,j}$, j=1, 2, . . . J, as shown in block 38p. The candidate milestone threshold for the payout point may be identified in any of a number of different manners. For example, the milestone threshold for the payout point may be identified to be a number of equidistant values on either side of the determined mean value of the asset at that payout point $\mu_{S_{p_1}}$ (see equation (1)).

Irrespective of exactly how the candidate milestone thresholds for the payout point $P^*p_{1,j}$ are identified, value distributions at the expiration exercise point $p_2$ (t=T) may thereafter be determined, where the value distributions are conditioned on respective estimated milestone thresholds at the payout point, as shown in block 38q. In this regard, the value distributions may be considered conditional distributions of contingent future benefits at the expiration exercise point, conditioned on respective asset values (candidate milestone thresholds) at the payout point $P^*p_{1,j}$. These conditional distributions of contingent future benefits $S_{T|P^*p_{1,j}}$ may be determined in any of a number of different manners. In one embodiment, for example, the conditional distributions of contingent future benefits may be determined based upon respective conditional mean asset values at the expiration exercise point $\mu_{S_{T|P^*p_{1,j}}}$ and conditional standard deviations in time at the expiration exercise point $\sigma_{S_{T|P^*p_{1,j}}}$, such as in accordance with the following:

$$\mu_{S_{T|P^*p_{1,j}}} = (P^*p_{1,j} - y_{p_1}) \times e^{r_1(T-p_1)} \quad (40)$$

$$\sigma_{S_{T|P^*p_{1,j}}} = \mu_{S_{T|P^*p_{1,j}}} \times \sqrt{e^{v^2 \times (T-p_1)} - 1} \quad (41)$$

After determining the conditional means and standard deviations at the expiration exercise point, the conditional distributions of contingent future benefits at the expiration exercise point $S_{T|P^*p_{1,j}}$ can be determined by defining the conditional distributions according to the respective means and standard deviations. Again, the conditional distributions of contingent future benefits can be represented as any of a number of different types of distributions but, in one embodiment, the conditional distributions of contingent future benefits are defined as lognormal distributions.

After determining the conditional distribution of contingent future benefits $S_{T|P^*p_{1,j}}$, respective conditional payoffs or profits may be determined or otherwise calculated based thereon, as shown in block 38r. The conditional payoffs $S_{T|P^*p_{1,j}}$ Payoff can be determined in any of a number of different manners, such as in accordance with the DM algorithm. Written notationally, for example, the conditional payoffs may be determined as follows:

$$S_{T|P^*p_{1,j}}\text{Payoff}=E[\max(S_{T|P^*p_{1,j}}e^{-r_1T}-x_Te^{-r_2T},0)] \quad (42)$$

And as a function of conditional asset values $s_{T|P^*p_{1,j}}$ from a respective distribution of contingent future value $S_{T|P^*p_{1,j}}$, the conditional payoffs $S_{T|P^*p_{1,j}}$ Payoff may be determined as follows:

$$S_{T|P^*p_{1,j}}\text{Payoff}=\max(s_{T|P^*p_{1,j}}e^{-r_1T}-x_Te^{-r_2T},0) \quad (42a)$$

Also after identifying the candidate milestone thresholds for the payout point $P^*p_{1,j}$, respective payoffs or profits for exercising the early-launch option at the payout $p_1$ may be determined or otherwise calculated based thereon, as shown in block 38s. These early exercise payoffs $P^*p_{1,j}$ Payoff may be determined in any of a number of different manners, but in one exemplary embodiment, may be determined by discounting respective candidate milestone thresholds $P^*p_{1,j}$ by the first discount rate and discounting the exercise price at the expiration exercise point by the second discount rate $r_2$, and subtracting or otherwise differencing the discounted milestone threshold and exercise price. Written notationally, the early exercise payoffs may be determined as follows:

$$P^*p_{1,j}\text{Payoff}=P^*p_{1,j}e^{-r_1p_1}-x_Te^{-r_2p_1} \quad (43)$$

After determining the conditional payoffs $S_{T|P^*p_{1,j}}$ Payoff and the early exercise payoffs $P^*p_{1,j}$ Payoff for the candidate milestone thresholds $P^*p_{1,j}$, the conditional payoffs may be compared to respective early exercise payoffs to identify a conditional payoff approximately equal thereto. More particularly, for example, mean conditional payoffs may be compared to respective early exercise payoffs to identify a mean conditional payoff approximately equal thereto. In this regard, mean conditional payoffs may be determined by selecting or otherwise forecasting a number of conditional asset values $s_{T|P^*p_{1,j}}$ from a respective distribution of contingent future value $S_{T|P^*p_{1,j}}$; calculating, for those forecasted conditional asset values, conditional payoff values such as in accordance with equation (42a); and calculating or otherwise determining the mean of the calculated conditional payoff values. The aforementioned steps thereby effectuating equation (42), including its expected value expression.

The situation where the mean conditional payoff approximately equals a respective early exercise payoff may represent a situation in which the final value or payoff foregoing early exercise of the early-launch option approximately equals the final value or payoff having exercised the option at the payout point. And as such, the candidate milestone threshold for which respective conditional and early exercise payoffs are approximately equal may be selected as the milestone threshold for the respective decision point, as shown in block 38t. In this regard, see FIG. 23 for a graph plotting conditional payoffs $S_{T|P^*p_{1,j}}$ Payoff and early exercise payoffs $P^*p_{1,j}$ Payoff for a number of candidate milestone thresholds $P^*p_{1,j}$, and identifying a milestone threshold for which the conditional payoff and early exercise payoff are approximately equal.

Irrespective of exactly how the milestone threshold $P^*p_1$ for the payout point is estimated or otherwise determined, the value of the early-launch option may thereafter be determined or otherwise calculated based thereon. The value of the early-launch option may be determined in any of a number of different manners. The value of the early-launch option may be considered a payoff $S_T$ Payoff, which may represent the payoff should the participant exercise the contingent claim at the payout point, or the payoff should the participant forego early exercise of the option and instead exercise the contingent claim at the expiration exercise point. Again, the milestone threshold $P^*p_1$ for the payout point may therefore represent the minimum asset value (future benefits value) at which a reasonably prudent participant will exercise the contingent claim early at that point. Thus, the particular payoff may be determinable based upon the milestone threshold for the payout point, as shown in block 40. Written notationally, for example, the payoff $S_T$ Payoff may be determined as follows:

IF $S_{p_1} \geq P^*p_1$, then $$S_T\text{Payoff}=S_{p_1}e^{-r_1p_1}-x_Te^{-r_2p_1};$$

else, $$S_T\text{Payoff}=E[\max(S_Te^{-r_1T}-x_Te^{-r_2T},0)] \quad (44)$$

And as a function of asset values $s_{p_1}$ and $s_T$ from respective distributions of contingent future value $S_{p_1}$ and $S_T$, the payoff $S_T$ Payoff may be determined as follows:

IF $s_{p_1} \geq P^*p_1$, then $$S_T\text{Payoff}=s_{p_1}e^{-r_1p_1}-x_Te^{-r_2p_1};$$

else, $$S_T\text{Payoff}=\max(s_Te^{-r_1T}-x_Te^{-r_2T},0) \quad (44a)$$

As or after determining the payoff for the early-launch option, the mean payoff for the early-launch option (value of the early-launch option) may be determined, such as by selecting or otherwise forecasting a number of asset values $s_{p_1}$ and $s_T$ from respective distributions of contingent future benefits $S_{p_1}$ and $S_T$; calculating, for those forecasted asset values, payoff values such as in accordance with equation (44a); and calculating or otherwise determining the mean of the calculated payoff values, such as in a manner similar to that explained above, as shown in block 42. The aforementioned steps thereby effectuating equation (44), including its expected value expression.

Written in other terms, the value of the early-launch option may be expressed as follows:

$$E[Z_0^T(r_1,r_2)]|_{(s_{\overline{p_1}}<P^*p_1)}]\times p(s_{pT}<P^*p_1)+E[Z_0^{pT}(r_1,r_2)]|_{(s_{\overline{p}_1\geq P^*p_1})}]\times p(s_{pT}\geq P^*p_1),$$

In the preceding, the value of the early-launch option may be interpreted as the sum of the value of the opportunity to launch early to preserve the total project or asset value, and the value of the waiting or delaying the launch decision until the expiration exercise point. At the expiration exercise point, additional information may be available about the impact of the impaired project value such that a decision may be made whether to launch or to terminate the project. The milestone threshold $P^*p_1$ may represent the value $s_{pT}$ at which the reasonably prudent participant may be indifferent between immediately launching or exercising the option at the payout point (prior to the payout) in an attempt to preserve total project or asset value, and the decision to wait or delay until the expiration exercise point, at which another decision to launch or terminate the project may be made. At this milestone threshold $P^*p_1$, if the asset value is high such that $s_{PT} \geq P^*p_1$, then an early launch (exercising the contingent claim or option) may maximize the total value of the project. If, on the other hand, the value of the project is low such that $s_{PT} < P^*p_1$, then waiting or delaying the decision to launch the project may maximize the total value of the project or asset. The sum of the value of the opportunity to launch early, and the value of the waiting or delaying the launch decision, may be weighted by the probability or likelihood of each event, thus appropriate valuing the early-launch option, reflecting the total value of flexibility.

FIG. 24 furthers the above example for the early-launch option, and illustrates a number of different a conditional paths the asset value may take from the beginning of the period of time, to the exemplary payout point $p_1$, and if the payoff by early exercise of the option at that decision point is less than or equal to the milestone threshold for the respective point, through to the expiration exercise point. FIG. 25, then, furthers the example by illustrating a distribution of payoff values for a number of calculated payoff values for valuation of the early-launch option.

C. Combination Option

In accordance with yet other exemplary embodiments of the present invention, a contingent-claim valuation may be performed for a combination option including a plurality of decision points over a period of time, where each decision point may include a go, no-go decision point and/or an early-launch decision point. Similar to that explained above, exemplary embodiments of the present invention will be described with reference to a period of time including a plurality of exercise points at which respective contingent claims may or may not be exercised (go, no-go decision points), and single payout point at which the contingent claim may or may not be exercised early, before the expiration point (early-launch decision point). It should be understood, however, that exemplary embodiments of the present invention may be equally applicable to instances in which the period of time includes a single go, no-go decision point and a plurality of early-launch decision points, a plurality of go, no-go decision points and early-launch decision points, or a single go, no-go decision point and a single early-launch decision point.

Referring to FIG. 26, a method of performing a contingent claim valuation of a combination option according to one exemplary embodiment of the present invention may begin by defining a period of time, a plurality of exercise point and a payout point within that period of time, as shown in block 50. Again, the period of time can begin at t=0 and extend to t=T, and can be divided into a number of different time segments. Within the defined period of time, a time segment may correspond to one of the exercise points and/or the payout point, and another time segment may correspond to a final or expiration exercise point at t=T, where the exercise points (including the expiration exercise point) and payout point may generally be referred to as "decision points" within the period of time. In one embodiment, for example, the time period T is defined such that each time segment and decision point can be represented as an integer divisors of T, i.e., t=0, 1, 2, ... T. The number N of decision points may be defined as $p_n$, n=1, 2, ... N$\leq$T. In the preceding, each $p_n$ corresponds to a selected time segment of the period of time, and may include an exercise point $ep_{n'}$ (n'=1, 2, ... N'$\leq$N) and/or a payout point $pp_{n''}$ (n''=1, 2, ... N''$\leq$N; and for one payout point n''=1). For an example of the time segments for a period of time, as well as the decision points within that period of time, see Table 8 below.

TABLE 8

First Discount Rate 12% Second Discount Rate 5%

| | Time Segment | | | | | |
|---|---|---|---|---|---|---|
| | 0 | 1 | 2 | 3 | 4 | 5 |
| Decision Point | | $p_1 = 1$ | | | $p_2 = 4$ | Expiration |
| | | $ep_1 = 1$ | | | $ep_2 = 4$ | ($p_3 = 5$) |
| | | | | | $pp_1 = 4$ | ($ep_3 = 5$) |
| Uncertainty | 60% | 60% | 60% | 60% | 60% | 40% |
| Payout Price | | | | | $50.00 | |
| Exercise Price | | $5.00 | | | $10.00 | $140.00 |

Before, during or after defining the time period, a number of parameters may be selected, determined or otherwise calculated for subsequent use in performing a contingent-claim valuation in accordance with this exemplary embodiment of the present invention, as shown in block 52. These parameters may include first and second discount rates, $r_1$ and $r_2$; uncertainty, or volatility, in the market including the asset for each decision point $p_n$ (or more generally for each segment of the period of time t); a payout (e.g., dividend) price y that may impair the value of the asset (future benefits value) subsequent to the payout point, and exercise prices x for respective exercise points (including the expiration exercise point). These parameters may be selected, determined or otherwise calculated in any of a number of different manners, such as in a manner similar to that explained above with reference to performing a multi-stage option valuation or an early-launch option valuation. For examples of these parameters, see Table 8.

Also before, during or after defining the time period, an initial, mean asset value may, but need not, be defined for the initial time segment (t=0), such as in a manner similar to that explained above with reference to performing a multi-stage option valuation or early-launch option valuation, as shown in block 54. Also, a revenue or value distribution S can be determined or otherwise calculated for each decision point $p_n$, and may be determined or otherwise calculated along with correlation coefficients representing relationships between successive distributions, as shown in block 56. As before, each value distribution may be considered a distribution of contingent future value. Each distribution of contingent future benefits $S_{p_n}$ and correlation coefficient $Coeff_{p_a,p_b}$ can be determined in any of a number of different manners, such as in a manner similar to that explained above with reference to performing a multi-stage option valuation or early-launch option (including determining the mean value $\mu_{S_{p_n}}$ and standard deviation $\sigma_{S_{p_n}}$). In various instances, however, the correlation coefficient may be modified or otherwise adjusted from its calculated value, or one or more of the uncertainties upon which the correlation coefficient may be calculated may be modified or otherwise adjusted. In this regard, the payout at the payout point may introduce additional, instantaneous volatility or uncertainty, which may effectuate a reduction in the correlation coefficient in a manner proportional to the size of the payout relative to the asset value at the respective payout point.

Further, as the payout price at the payout point may impair the asset value subsequent to the payout point, however, the mean value from which the distribution of contingent future benefits at the first exercise point following the payout point (and, in turn, the remaining exercise points) may be determined in a manner that more particularly accounts for this impairment. More particularly, for example, the mean value and standard deviation at an exercise point $p_{n+1}$ subsequent a payout point $p_n$ may be determined as follows:

$$\mu_{S_{n+1}} = (\mu_{S_{p_n}} - y_{p_n}) \times e^{r_1(p_{n+1} - p_2)} \quad (45)$$

$$\sigma_{S_{n+1}} = \mu_{S_{n+1}} \times \sqrt{e^{u^2 \times (p_{n+1} - p_1)} - 1} \quad (46)$$

where $\mu_{S_n}$ represents the mean value at the payout point and may be determined in accordance with equation (1).

Continuing the example of Table 8 above, see Table 9 below for an example of the initial mean value, as well as the mean values and standard deviations each of the decision points $p_n$, n=1, 2, 3 (t=1, 4, 5), and the correlation coefficients $\text{Coeff}_{p_1, p_2}$ and $\text{Coeff}_{p_2, p_3}$.

TABLE 9

Initial Mean Value $100.00

| | Time Segment | | | | |
|---|---|---|---|---|---|
| | 0 | 1 | 2 | 3 | 4 | 5 |
| Decision Point | | $p_1 = 1$ | | | $p_2 = 4$ | Expiration ($p_3 = 5$) |
| Mean Value | $100.00 | $112.75 | | | $161.61 | $125.84 |
| Standard Deviation | $ 0.00 | $ 74.22 | | | $153.01 | $139.31 |
| Correlation Coefficient | | | 0.50 ($p_1, p_2$) | | 0.89 ($p_2, p_3$) | |

Irrespective of exactly how the distributions of contingent future benefits $S_{p_n}$ are determined, the value of the combination option may be determined or otherwise calculated based thereon. Before determining the value of the combination option, however, exemplary embodiments of the present invention may account for situations in which a reasonably prudent participant may not exercise an option at a particular exercise point (and thus any remaining exercise points); or may exercise the option at the payout point before the expiration exercise point, owing to a typical reduction in the expiration payoff due to the payout at the respective point. Similar to that above, exemplary embodiments of the present invention may calculate or otherwise determine milestone thresholds for the exercise and payout points. More particularly, exemplary embodiments of the present invention may calculate or otherwise determine go, no-go milestone thresholds $P^*ep_{n'}$ for respective exercise points before the expiration exercise point; and/or calculate or otherwise determine an early-launch milestone threshold $P^*pp_{n''}$ for the payout point. Again, the go, no-go milestone threshold for each exercise point represents the minimum asset value at which a reasonably prudent participant will exercise the contingent claim at that exercise point; and the early-launch milestone threshold for the payout point represents the minimum asset value at which a reasonably prudent participant will exercise the contingent claim early at that payout point.

Similar to performing the contingent claim valuation of a multi-stage option or an early-launch option, performing a contingent claim valuation of a combination option may include determining or otherwise calculating milestone thresholds for the exercise points $P^*ep_{n'}$ and the payout point $P^*pp_{n''}$, such as to facilitate maximizing benefits (TP) and minimize regrets (FP) and omissions FN on a risk-adjusted basis, as shown in block 58. In this regard, the milestone threshold for each exercise point $P^*ep_{n'}$ may correspond to the asset value at the respective exercise point likely to result in a risk-adjusted, discounted final value at the expiration time segment substantially equal to the risk-adjusted, discounted exercise price at the current exercise point and any subsequent exercise points. And the milestone threshold for the payout point $P^*pp_{n''}$ may correspond to the asset value at the payout point likely to result in a final value at the expiration time segment substantially equal to a value associated with exercising the option at the respective payout point (e.g., an asset value plus expiration exercise price being expended at the payout point).

The milestone thresholds for the exercise points $P^*ep_{n'}$ and the payout point $P^*pp_{n''}$ may be determined in any of a number of different manners, such as in accordance with one or more of the aforementioned "benefit-regret" technique, "arc" technique, "zero-crossing" technique, "sorted list" technique or "conditional" technique for determining a milestone threshold, such as in a manner similar to that explained above for the multi-stage option and early-launch option. The benefit-regret and arc techniques will now be more particularly described below with reference to FIGS. 27a and 27b.

1. Benefit-Regret Technique for Determining Milestone Thresholds

Determining the milestone threshold for each exercise point $P^*ep_{n'}$ according to the benefit-regret technique of one exemplary embodiment of the present invention may proceed in a manner similar to that for the multi-stage option. Thus, and generally for each exercise point $ep_{n'}$, n'=1, 2, ... N'−1, a milestone threshold may be estimated $P^*ep_{n'}$ (see FIG. 2a, block 18a). Also, conditional distributions of contingent future value may be determined for the expiration exercise point (distribution of contingent future benefits) $S_{T|P^*ep_{n'}}$, and any exercise points between the expiration exercise point and the respective exercise point $S_{p_{m'}|P^*ep_{n'}}$, where m'=n'+1, n'+2, ... N'−1; and $ep_{m'} = ep_{n'+1}, ep_{n'+2}, \ldots ep_{N'-1}$ (noting that (n'+1)>(N'−1) results in the empty sets m'=Ø, and $ep_{m'}$=Ø) (see block 18b). Continuing the example of Tables 8 and 9, see Table 10 below for a more particular example of an estimated milestone threshold at the next-to-last exercise point $ep_2$ (t=4) (the respective milestone threshold in the example being represented by $P^*ep_2=P^*4'$), as well as the mean and standard deviation for an exemplary conditional distribution of contingent future benefits $S_{T|P^*ep_2}$.

TABLE 10

| | Time Segment | | | | |
|---|---|---|---|---|---|
| | 0 | 1 | 2 | 3 | 4 | 5 |
| Exercise Point | | $ep_1 = 1$ | | | $ep_2 = 4$ | Expiration ($ep_3 = 5$) |
| Estimated Threshold (P*4') | | | | | $170.00 | |
| $S_{5|P*4'}$:Mean Value | | | | | | $135.30 |
| $S_{5|P*4'}$:Standard Deviation | | | | | | $ 89.06 |
| Estimated Threshold (P*4'') | | | | | $198.00 | |
| $S_{5|P*4''}$:Mean Value | | | | | | $166.87 |
| $S_{5|P*4''}$:Standard Deviation | | | | | | $109.85 |

After estimating a milestone threshold and determining the conditional distributions of contingent future value, a conditional payoff at the respective exercise point $S_{T|P^*ep_{n'}}$ Payoff may be determined or otherwise calculated, such as in accordance with the DM algorithm (see block 18c). More particularly, for example, a conditional payoff (or intermediate payoff) may be determined as the expected value of the difference between a present value conditional distribution of contingent future benefits at the expiration exercise point (discounted by $r_1$), and the present value of the exercise price (discounted by $r_2$) at the expiration exercise point, including limiting the minimum permissible difference to a predefined value, such as zero. And for each exercise point preceding the next-to-last exercise point $ep_{N'-1}$, determining the conditional payoff may further include reducing the expected value of the difference (intermediate payoff) by the present values of the exercise prices (discounted by $r_2$) at the one or more exercise points between the expiration exercise point and the respective exercise point. As indicated above, however, determining the conditional payoff may be further conditioned on the conditional asset value at one or more, if not all, subsequent exercise points $S_{p_{m'}|P^*ep_{n'}}$ being at least as much as (i.e., $\geqq$) the estimated milestone threshold at the respective exercise points $P^*ep_{m'}$, such as by setting the conditional payoff to zero when the asset value at a subsequent exercise point is less than the milestone threshold at the respective subsequent exercise point. Thus, written notationally, the conditional payoff may be determined or otherwise calculated in accordance with the following:

$$\text{IF } \forall_{m'} \left( S_{p_{m'}|P^*ep_{n'}} \geq P^*ep_{m'} \right), \text{ then} \quad (47)$$

$$S_{T|P^*ep_{n'}} Payoff =$$

$$E[\max(S_{T|P^*ep_{n'}} e^{-r_1 T} - x_T e^{-r_2 T}, 0)] - \sum_{ep_{m'}} x_{ep_{m'}} e^{-r_2 ep_{m'}};$$

else, $$S_{T|P^*ep_{n'}} Payoff = 0$$

And as a function of conditional asset values $s_{ep_{m'}|P^*ep_{n'}}$, $\forall_{m'}$ and $s_{T|P^*ep_{n'}}$ from respective conditional distributions $S_{ep_{m'}|P^*ep_{n'}}$, $\forall_{m'}$ and $S_{T|P^*ep_{n'}}$, the conditional payoff may be determined in accordance with the following:

$$\text{IF } \forall_{m'} \left( s_{ep_{m'}|P^*ep_{n'}} \geq P^*ep_{m'} \right), \text{ then} \quad (47a)$$

$$S_{T|P^*ep_{n'}} Payoff =$$

$$\max(s_{T|P^*ep_{n'}} e^{-r_1 T} - x_T e^{-r_2 T}, 0) - \sum_{ep_{m'}} x_{ep_{m'}} e^{-r_2 ep_{m'}};$$

else, $$S_{T|P^*ep_{n'}} Payoff = 0$$

As or after determining the conditional payoff for an exercise point $ep_{n'}$, a net conditional payoff at the respective exercise point may be determined or otherwise calculated, such as by reducing the conditional payoff by the present value of the exercise price (discounted by $r_2$) at the respective exercise point (see block 18d). Written notationally, the net conditional payoff may be determined or otherwise calculated in accordance with the following:

$$Net S_{T|P^*ep_{n'}} Payoff = S_{T|P^*ep_{n'}} Payoff - x_{ep_{n'}} e^{-r_2 ep_{n'}} \quad (48)$$

where $x_{ep_{n'}}$ represents the exercise price (e.g., contingent future investment) at the respective exercise point $ep_{n'}$.

Then, from the net conditional payoff Net $S_{T|P^*ep_{n'}}$ Payoff, the mean net conditional payoff Mean Net $S_{T|P^*ep_{n'}}$ Payoff at the respective exercise point may be determined, such as by selecting or otherwise forecasting a number of conditional asset values at the expiration exercise point (conditional future benefits) $ep_{N'}$ (t=T) and any exercise points between the expiration exercise point and the respective exercise point $s_{ep_{m'}|P^*ep_{n'}}$, $\forall_{m'}$ and $s_{T|P^*ep_{n'}}$ from respective conditional distributions of contingent future value $S_{T|P^*ep_{n'}}$ and $S_{ep_{m'}|P^*ep_{n'}}$, $\forall_{m'}$; calculating, for those forecasted conditional asset values, conditional payoff and net conditional payoff values such as in accordance with equations (47a) and (48); and calculating or otherwise determining the mean of the calculated net conditional payoff values, such as in a manner similar to that explained above (see block 18e). And if the mean net conditional payoff at the respective exercise point does not equal approximately zero, another milestone threshold $P^*ep_{n'}$ may be estimated for the respective exercise point, and the method repeated for determining a new mean net conditional payoff (see block 18f). In yet a further similar manner, the aforementioned steps may be performed to effectuate equations (47) and (48), including the expected value expression of equation (47).

Determining the milestone threshold for the payout point $P^*pp_1$ according to the benefit-regret technique of one exemplary embodiment of the present invention may proceed in a manner similar to that for the early-launch option. Thus, determining the milestone threshold may include estimating a milestone threshold for the payout point $P^*pp_1$ (see FIG. 16a, block 38a). Again, see Table 10 above for a more particular example of an estimated milestone threshold for the payout point $pp_1$ (t=4) (the respective milestone threshold in the example being represented by $P^*pp_1$=P*4"). Then, a distribution of contingent future benefits at the expiration exercise point $p_2$ (t=T), conditioned on the estimated value of the asset (milestone threshold) at the payout point $P^*pp_1$, may be determined (see block 38b). For an example of the mean value and standard deviation for an exemplary conditional distribution of future benefits $S_{T|P^*pp_1}$, see Table 10.

The method of determining the milestone threshold for the payout point may further include determining or otherwise calculating a conditional payoff or profit (see block 38c). The conditional payoff $S_{T|P^*pp_1}$ Payoff can be determined in any of a number of different manners, such as in a manner similar to that explained above with reference to performing a multi-stage option valuation (see equations (6) and (6a)). The net conditional payoff may be calculated or otherwise determined by accounting for the payout price at the payout point $p_1$ (e.g., t=4) and again accounting for the exercise price at the expiration exercise point, now representing a price for exercising the option at the payout point (see block 38d). In addition, however, the net conditional payoff may further account for the exercise prices of any exercise points coinciding with the payout point and/or between the payout point and the expiration exercise point. Written notationally, for example, the net conditional payoff Net $S_{T|P^*pp_1}$ Payoff may be determined as follows:

$$Net S_{T|P^*pp_1} Payoff = S_{T|P^*pp_1} Payoff - \quad (49)$$

$$(P^*pp_1 e^{-r_1 pp_1} - x_T e^{-r_2 pp_1}) - \sum_{ep_{n'} \geq pp_1} x_{ep_{n'}} e^{-r_2 ep_{n'}}$$

where $x_{ep_{n'}}$ represents the exercise price (e.g., contingent future investment) at exercise point $ep_{n'}$.

From the net conditional payoff, the mean net conditional payoff may be determined (see block 38e). For example, the mean net conditional payoff Mean Net $S_{T|P^*pp_1}$ Payoff may be determined by selecting or otherwise forecasting a number of conditional asset values $s_{T|P^*pp_1}$ from the conditional distribution of contingent future benefits $S_{T|P^*pp_1}$; calculating, for those forecasted asset values, conditional payoff and net conditional payoff values such as in accordance with equations (6a) and (49); and calculating or otherwise determining the mean of the calculated net conditional payoff values. The aforementioned steps thereby effectuating equations (6) and (49), including the expected value expression of equation (6). Then, after determining the mean net conditional payoff value Mean Net $S_{T|P^*p_1}$ Payoff, if the mean net conditional payoff value does not equal approximately zero, another milestone threshold $P^*pp_1$ may be estimated for the payout point $P^*pp_1$ (see block 38f). The method may then repeat determining a conditional distribution of contingent future benefits $S_{T|P^*pp_1}$, determining a conditional payoff $S_{T|P^*pp_1}$ Payoff, net conditional payoff Net $S_{T|P^*pp_1}$ Payoff and mean net conditional payoff Mean Net $S_{T|P^*pp_1}$ Payoff, and determining if the mean net conditional payoff value equals approximately zero. The method may continue in this manner until an estimated milestone threshold $P^*pp_1$ results in a mean net conditional payoff value equal to approximately zero. This estimated milestone threshold may then be considered the milestone threshold for the respective payout point.

2. Arc Technique for Determining Milestone Thresholds

Determining the milestone threshold for each exercise point $P^*ep_{n'}$ according to the benefit-regret technique of one exemplary embodiment of the present invention may proceed in a manner similar to that for the multi-stage option. Thus, and generally for each exercise point $ep_{n'}$, n'=1, 2, ... N'−1, a number of candidate milestone thresholds may be identified $P^*ep_{n',j}$ (see FIG. 2b, block 18h). Having selected the candidate milestone thresholds $P^*ep_{n',j}$, payoffs (or intermediate payoffs) may then be determined (see block 18i). In this regard, the payoffs (or intermediate payoffs) may be determined as the expected value of the difference between a present value distribution of contingent future benefits at the expiration exercise point (discounted by $r_1$), and the present value of the exercise price (discounted by $r_2$) at the expiration exercise point, and including limiting the minimum permissible difference to a predefined value, such as zero. And for each exercise point preceding the next-to-last exercise point $ep_{N'-1}$, determining the payoffs may further include reducing the expected values of the difference (intermediate payoffs) by the present values of the exercise prices (discounted by $r_2$) at the one or more exercise points between the expiration exercise point and the respective exercise point. However, determining the payoffs may be further conditioned on the asset value at the respective exercise point and one or more, if not all, subsequent exercise points before the expiration exercise point $S_{ep_{n'}}$ being at least as much as, if not greater than (i.e., ≧), the candidate milestone threshold at the respective exercise points $P^*ep_{n',j}$, such as by setting the payoffs to zero when the asset value at an exercise point is less than the milestone threshold at the respective exercise point. Thus, written notationally, the payoffs may be determined or otherwise calculated in accordance with the following:

IF $S_{ep_{n'}} \geq P^*ep_{n',j}$, $\forall_{m'}$ ($S_{p_{m'}} \geq P^*ep_{m'}$), then    (50)

$S_T Payoff \mid P^*ep_{n',j} =$ $E[\max(S_T e^{-r_1 T} - x_T e^{-r_2 T}, 0)] - \sum_{ep_{m'}} x_{ep_{m'}} e^{-r_2 ep_{m'}}$;

else, $S_T Payoff \mid P^*ep_{n',j} = 0$ where m'=n'+1, n'+2, ... N'−1, and $p_{m'}=p_{n'+1}, p_{n'+2}, \ldots p_{N'-1}$ (noting that (n'+1)>(N'−1) results in the empty sets m'=Ø, and $p_{m'}=$Ø).

And as a function of asset values $s_{ep_{n'}}$, $s_{ep_{m'}}$, $\forall_{m'}$ and $s_T$ from respective distributions $S_{ep_{n'}}$, $S_{ep_{m'}}$, $\forall_{m'}$ and $S_T$, the payoffs $S_T$ Payoff|$P^*ep_{n',j}$ may be determined as follows:

IF $s_{ep_{n'}} \geq P^*ep_{n',j}$, $\forall_{m'}$ ($s_{ep_{m'}} \geq P^*ep_{m'}$), then    (50a)

$S_T Payoff \mid P^*ep_{n',j} =$ $\max(s_T e^{-r_1 T} - x_T e^{-r_2 T}, 0) - \sum_{ep_{m'}} x_{ep_{m'}} e^{-r_2 ep_{m'}}$;

else, $S_T Payoff \mid P^*ep_{n',j} = 0$

As or after determining the payoffs for an exercise point $ep_n$, respective net payoffs at the respective exercise point may be determined or otherwise calculated, such as by reducing the payoffs by the present value of the exercise price (discounted by $r_2$) at the respective exercise point (see block 18j). Written notationally, the net payoffs may be determined or otherwise calculated in accordance with the following:

Net $S_T$ Payoff|$P^*ep_{n',j} = S_T$ Payoff|$P^*ep_{n',j} - x_{ep_{n'}} e^{-r_2 ep_{n'}}$    (51)

From the net payoffs Net $S_T$ Payoff|$P^*ep_{n',j}$, respective mean net payoffs Mean Net $S_T$ Payoff|$P^*ep_{n',j}$ may be determined for respective candidate milestone thresholds $P^*ep_{n',j}$ (see block 18k). Again, for example, the mean net payoffs may be determined by first selecting or otherwise forecasting a number of asset values $s_{ep_{n'}}$, $s_{ep_{m'}}$, $\forall_{m'}$ and $s_T$ from respective distributions of contingent future value $S_{ep_{n'}}$, $S_{ep_{m'}}$, $\forall_{m'}$ and $S_T$. For those forecasted asset values, then, respective payoff and net payoff values may be calculated such as in accordance with equations (50a) and (51). The means of the calculated net payoff values may then be calculated or otherwise determined, and a maximum mean net payoff value selected from the determined or otherwise calculated mean net payoffs. The aforementioned steps being performed to thereby effectuate equations (50) and (51), including the expected value expression of equation (51). The candidate milestone threshold associated with the respective mean net payoff value may then be selected as the milestone threshold for the respective exercise point $ep_n$.

Determining the milestone threshold for the payout point $P^*pp_1$ according to the arc technique of one exemplary embodiment of the present invention may proceed in a manner similar to that for the early-launch option. Thus, determining the milestone threshold may include identifying J candidate milestone thresholds for the payout point $P^*pp_{1,j}$, j=1, 2, ... J, and calculating or otherwise determining respective payoffs or profits based thereon (see FIG. 16b, blocks 38h, 38i). In this regard, the payoffs or profits may be conditioned on respective candidate milestone thresholds, and determined in any of a number of different manners, including in accordance with the DM algorithm. In contrast to the early-launch case, however, the payoffs may further account for the exercise prices of any exercise points. Written notationally, for example, the payoffs $S_T$ Payoff|$P^*pp_{1,j}$ may be determined as follows:

IF $S_{pp_1} \geq P^*pp_{1,j}$, then    (52)

$S_T Payoff \mid P^*pp_{1,j} =$

-continued $$S_{pp_1} e^{-r_1 pp_1} - x_T e^{-r_2 pp_1} - \sum_{ep_{n'} < pp_1} x_{ep_{n'}} e^{-r_2 ep_{n'}};$$

else, $$S_T Payoff \mid P^* pp_{1,j} =$$

$$E[\max(S_T e^{-r_1 T} - x_T e^{-r_2 T}, 0)] - \sum_{ep_{n'} < p_N} x_{ep_{n'}} e^{-r_2 ep_{n'}}$$

As above, $x_{ep_{n'}}$ again represents the exercise price (e.g., contingent future investment) at exercise point $ep_{n'}$. And as a function of asset values $s_{pp_1}$ and $s_T$ from respective distributions of contingent future value $S_{pp_1}$ and $S_T$, the payoffs $S_T$ Payoff|P*$pp_{1,j}$ may be determined as follows:

IF $s_{pp_1} \geq P^* pp_{1,j}$, then (52a)

$$S_T Payoff \mid P^* pp_{1,j} =$$

$$s_{pp_1} e^{-r_1 pp_1} - x_T e^{-r_2 pp_1} - \sum_{ep_{n'} < pp_1} x_{ep_{n'}} e^{-r_2 ep_{n'}};$$

else, $$S_T Payoff \mid P^* pp_{1,j} =$$

$$\max(s_T e^{-r_1 T} - x_T e^{-r_2 T}, 0) - \sum_{ep_{n'} < p_N} x_{ep_{n'}} e^{-r_2 ep_{n'}}$$

As or after determining the payoffs at the expiration exercise point $p_2$ (t=T), respective mean payoffs Mean $S_T$ Payoff|P*$pp_{1,j}$ may be determined for respective candidate milestone thresholds P*$pp_{1,j}$ (see block 38j). For example, the mean payoffs may be determined by first selecting or otherwise forecasting a number of asset values $s_{pp_1}$ and $s_T$ from respective distributions of contingent future benefits $S_{pp_1}$ and $S_T$. For those forecasted asset values, then, respective payoff values may be calculated such as in accordance with equation (52a). The means of the calculated payoff values may then be calculated or otherwise determined for respective candidate milestone thresholds P*$pp_{1,j}$. The aforementioned steps thereby effectuating equation (52), including its expected value expression. Thus, a maximum mean payoff value may then be selected from the determined or otherwise calculated mean payoffs. The candidate milestone threshold associated with the respective mean payoff value may then be selected as the milestone threshold for the payout point (see block 18k).

Irrespective of exactly how the milestone thresholds P*$p_n$ at the exercise points $ep_{n'}$ and the payout point $pp_1$ before the expiration exercise point $p_N$ are estimated or otherwise determined, the value of the combination option may thereafter be determined or otherwise calculated based thereon. The value of the combination option may be determined in any of a number of different manners. Again, for example, the value of the combination option may be considered a payoff $S_T$ Payoff, which may be determined based upon the previously determined distributions of contingent future value $S_{p_n}$, n=1, 2, ... N, as shown in block 60. And more particularly, the value of the combination option may represent the payoff should the participant exercise the contingent claim at the payout point (after having exercised contingent claims at exercise points up to the respective payout point), or the payoff should the participant forego early exercise of the option and instead exercise the contingent claim at the expiration exercise point (again, after having exercised contingent claims at exercise points up to the expiration exercise point).

In this regard, the milestone threshold P*$pp_1$ for the payout point may again represent the minimum asset value (future benefits value) at which a reasonably prudent participant will exercise the contingent claim early at that point.

Written notationally, for example, the payoff $S_T$ Payoff may be determined as follows:

IF $\exists_{p_n = pp_1} (S_{p_n} \geq P^* pp_1)$, then (53)

$$S_T Payoff = S_{p_n} e^{-r_1 pp_1} - x_T e^{-r_2 pp_1} - \sum_{ep_{n'} < pp_1} x_{ep_{n'}} e^{-r_2 ep_{n'}};$$

else,

IF $\forall_{p_n = ep_{n'} < p_N} (S_{p_n} \geq P^* ep_{n'})$, then $$S_T Payoff =$$

$$E[\max(S_T e^{-r_1 T} - x_T e^{-r_2 T}, 0)] - \sum_{ep_{n'} < p_N} x_{ep_{n'}} e^{-r_2 ep_{n'}};$$

else, $$S_T Payoff = 0$$

And as a function of asset values $s_{p_n}, \forall_{n < N}$ and $s_T$ from respective distributions of contingent future value $S_{p_n}, \forall_{n < N}$ and $S_T$, the payoff $S_T$ Payoff may be determined as follows:

IF $\exists_{p_n = pp_1} (s_{p_n} \geq P^* pp_1)$, then (53a)

$$S_T Payoff = s_{p_n} e^{-r_1 pp_1} - x_T e^{-r_2 pp_1} - \sum_{ep_{n'} < pp_1} x_{ep_{n'}} e^{-r_2 ep_{n'}};$$

else,

IF $\forall_{p_n = ep_{n'} < p_N} (s_{p_n} \geq P^* ep_{n'})$, then $$S_T Payoff =$$

$$\max(s_T e^{-r_1 T} - x_T e^{-r_2 T}, 0) - \sum_{ep_{n'} < p_N} x_{ep_{n'}} e^{-r_2 ep_{n'}};$$

else, $$S_T Payoff = 0$$

As or after determining the payoff for the combination option, the mean payoff for the combination option (value of the combination option) may be determined, such as by selecting or otherwise forecasting a number of asset values $s_{p_n}, \forall_{n < N}$ and $s_T$ from respective distributions of contingent future value $S_{p_n}, \forall_{n < N}$ and $S_T$; calculating, for those forecasted asset values, payoff values such as in accordance with equation (53a); and calculating or otherwise determining the mean of the calculated payoff values, such as in a manner similar to that explained above, as shown in block 62. The aforementioned steps thereby effectuating equation (53), including the expected value expression.

Written in other terms, the value of the combination option may be expressed as follows:

$$E\Big[\ldots E_{S_{p_{N-2}}}\Big[$$

$$E_{S_{p_{N-1}}}\Big[Z_{t_0}^T(\mu, r)\Big] - x_{p_{N-1}} e^{-r_2 p_{N-1}}\Big]^+ \times p(P^* pp_{N-1} > s_{p_{N-1}} > P^* ep_{N-1}) +$$

$$E[Z_{t_0}^{p_{N-1}}(\mu, r)] \times p(s_{p_{N-1}} > P^* pp_{N-1}) -$$

-continued $x_{p_{N-2}} e^{-r_2 p_{N-2}}]^+ \times p(P^* pp_{N-2} > s_{p_{N-2}} > P^* ep_{N-2}) +$ $E[Z_{t_0}^{p_{N-2}}(\mu, r)] \times p(s_{p_{N-2}} > P^* pp_{N-2}) -$ $\vdots$ $x_{p_1} e^{-r_2 p_1}]^+ \times p(P^* pp_1 > s_{p_1} > P^* ep_1) + E[Z_{t_0}^{p_1}(\mu, r)] \times p(s_{p_1} > P^* pp_1);$ $n = n' = n''; N = N' = N'';$ $p_n = ep_{n'} = pp_{n''};$ $\exists P^* pp_{n''} \text{ iff } y_{pp_{n''}} > 0;$ $\exists P^* ep_{n'} \text{ iff } x_{ep_{n'}} > 0$ The above expression may be interpreted as subtracting, from the discounted payoff at the expiration exercise point (t=T), the discounted exercise prices for all of the exercise points before the expiration exercise point; and multiplying the resulting payoff by the probability that, for the exercise points before the expiration exercise point, the asset values at the exercise points are greater than respective milestone thresholds for those exercise points. Also in the expression the "+" superscript represents a maximization function limiting the discounted payoff to a minimum predefined value, such as zero. In addition, at each exercise point, there may be the option for an early-launch, which may be interpreted as the sum of the value of the opportunity to launch early to preserve the total project or asset value, and the value of the waiting or delaying the launch decision (contingent claim) until the next exercise point. Each early-launch decision payoff may be multiplied by the probability that, for the exercise points before the expiration exercise point, the asset values at the exercise points are greater than respective milestone thresholds for those exercise points. The cumulative probabilities for all decision points sums to a value of one, including the probabilities of early termination of the project, i.e., the asset values at the exercise points are less than the respective milestone thresholds for those exercise points.

At each exercise point, one or both of a go, no-go decision or an early-launch decision may be made available. Each additional decision type at each exercise point increases the flexibility of the entire project proposition, and therefore increases the value of the total combination option. The type of decision available at each exercise point depends on the anticipated business environment and investment plan. If there is no anticipation of an impaired project value at a particular decision point, i.e., $y_n=0$, then $P^* pp_n$ for the early-launch decision may approach infinity $P^* pp_n \to \infty$, and may result accordingly be set or otherwise reduced to an empty set $P^* pp_n = \emptyset$ for the respective decision point before the expiration exercise point. Additionally, if there is no investment required to proceed to the next decision point, i.e., $x_{p_n}=0$, then $P^* ep_n$ for the go, no-go decision may approach zero $P^* ep_n \to 0$, and may result accordingly be set or otherwise reduced to an empty set $P^* ep_n = \emptyset$ for the respective decision point before the expiration exercise point.

From the above, the value of the combination option can be understood as the value of a series of embedded expectations, with each expectation stage having the ability to either: (a) launch the project early in the event of anticipated impairment of cash or asset value, or (b) continue the project if the net payoff of the subsequent stage(s) or decision point(s) is greater than zero, or (c) terminate the project if the associated cost to continue to the subsequent stage is too costly. The expectations may arise because of the uncertainty of the payoff at each stage, thus valued as a mean or expected value of the sum total of all potential outcomes at each stage. The expectations may be embedded because success (or net payoff greater than zero) at an earlier stage allows forward progress to the subsequent stage of the project. Failure (or net payoffs which are limited to zero) may terminate forward progress of the project. Milestone thresholds $P^* p_n$ ($P^* ep_n$ and/or $P^* pp_n$) may be calculated for each stage or exercise point before the expiration exercise point.

The value of the combination option may be the present value of the expiration point payoffs less the cost of having traversed some or all the intermediate decision points, and thus incurred a cost $x_{p_n}$ to continue to a subsequent point weighted by the probability of actually traversing some or all of the intermediate decision points, plus the present value of an early-launch decision payoff weighted by the probability or likelihood of the event of actually launching the project early at any one of the intermediate decision points.

As shown in FIG. 27, the system of the present invention is typically embodied by a processing element and an associated memory device, both of which are commonly comprised by a computer 60 or the like. In this regard, as indicated above, the method of embodiments of the present invention can be performed by the processing element manipulating data stored by the memory device with any one of a number of commercially available computer software programs. In one embodiment, the method can be performed with data that is capable of being manipulated and/or presented in spreadsheet form. For example, the method can be performed by the processing element manipulating data stored by the memory device with Excel, a spreadsheet software program distributed by the Microsoft Corporation of Redmond, Wash., including Crystal Ball, a Monte Carlo simulation software program distributed by Decisioneering, Inc. of Denver, Colo. The computer can include a display 62 for presenting information relative to performing embodiments of the method of the present invention, including the various distributions, models and/or conclusions as determined according to embodiments of the present invention. To plot information relative to performing embodiments of the method of the present invention, the computer can further include a printer 64.

Also, the computer 60 can include a means for locally or remotely transferring the information relative to performing embodiments of the method of the present invention. For example, the computer can include a facsimile machine 66 for transmitting information to other facsimile machines, computers or the like. Additionally, or alternatively, the computer can include a modem 68 to transfer information to other computers or the like. Further, the computer can include an interface (not shown) to a network, such as a local area network (LAN), and/or a wide area network (WAN). For example, the computer can include an Ethernet Personal Computer Memory Card International Association (PCM-CIA) card configured to transmit and receive information to and from a LAN, WAN or the like.

According to one aspect of the present invention, the system of the present invention generally operates under control of a computer program product according to another aspect of the present invention. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 1, 2a-2d, 15, 16a-16d and 26 are flowcharts of methods, systems and program products according to exemplary embodiments of the present invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for performing a contingent claim valuation of an early-launch option including a contingent claim exercisable at one of a plurality of decision points that include an expiration exercise point and one or more decision points before the expiration exercise point, the system comprising:
a processor configured to determine a first value representing a payoff attributable to exercise of a contingent claim at a selected decision point before the expiration exercise point,
wherein the processor is configured to determine a second value representing a payoff attributable to the exercise of a contingent claim at the expiration exercise point,
wherein the processor being configured to determine at least one of the first value or the second value includes being configured to determine at least one of the first value or the second value based upon a respective present value distribution of contingent future value and a respective present value of an exercise price, the present value distribution comprising a respective distribution of contingent future value discounted according to a first discount rate, and the present value of the exercise price comprising a respective exercise price discounted according to a second discount rate, and
wherein the processor is configured to determine a value of the contingent claim based upon at least one of the first value or the second value.

2. A system according to claim 1, wherein the processor is configured to determine the first value based upon a present value distribution of contingent future value at the selected decision point, and based upon a present value of an exercise price at the selected decision point.

3. A system according to claim 1, wherein the processor is configured to determine the second value based upon a present value distribution of contingent future value at the expiration exercise point, and based upon a present value of an exercise price at the expiration exercise point.

4. A system according to claim 3, wherein the processor being configured to determine a second value includes being configured to determine an expected value of the difference between the present value distribution of contingent future value at the expiration exercise point and the present value of the exercise price at the expiration exercise point.

5. A system according to claim 4, wherein the processor being configured to determine the expected value of the difference includes being configured to limit the difference to a minimum predefined value.

6. A system according to claim 1, wherein the processor is configured to determine the value further based upon a milestone threshold at the selected decision point, the milestone threshold representing a minimum asset value for exercising the contingent claim at the selected decision point.

7. A system according to claim 6, wherein the processor being configured to determine a value includes being configured to condition the value on a comparison of a distribution of contingent future value at the selected decision point and the milestone threshold.

8. A system according to claim 6, wherein the processor is further configured to determine the milestone threshold at the selected decision point, wherein the processor being configured to determine the milestone threshold includes being configured to:
determine a present value conditional distribution of contingent future value attributable to the exercise of a contingent claim at the expiration exercise point, the present value conditional distribution comprising a distribution of contingent future value conditioned on an estimated milestone threshold, and discounted according to the first discount rate;
determine present values of respective exercise prices required to exercise one or more contingent claims at the expiration exercise point and the selected decision point, the present values of respective exercise prices comprising respective exercise prices discounted according to the second discount rate; and
determine a conditional value based upon the present value conditional distribution of contingent future value and the present values of respective exercise prices,
wherein the processor is configured to repeatedly determine a present value conditional distribution and a conditional value for different estimated milestone thresholds until the conditional value equals approximately zero, the respective milestone threshold being selected as the milestone threshold for the selected decision point.

9. A system according to claim 6, wherein the processor is further configured to determine the milestone threshold at the selected decision point, wherein the processor being configured to determine the milestone threshold includes being configured to:
  determine a first value and a second value;
  determine a value based upon at least one of the first value or the second value, the value being conditioned on a comparison of a distribution of contingent future value at the selected decision point and a candidate milestone threshold, wherein the processor is configured to repeatedly determine a value for a plurality of candidate milestone thresholds; and
  select a candidate milestone threshold that maximizes the value, the respective milestone threshold being selected as the milestone threshold for the selected decision point.

10. A system according to claim 6, wherein the processor is further configured to determine the milestone threshold at the selected decision point, wherein the processor being configured to determine the milestone threshold includes being configured to:
  determine a present value of an underlying asset at a selected decision point before the expiration exercise point, the present value of the underlying asset comprising a candidate milestone threshold discounted according to the first discount rate;
  determine a third value based upon the present value of the underlying asset, and based upon a present value of an exercise price at the selected decision point,
  wherein the processing element processor is configured to determine a present value of an underlying asset and a first value for one or more candidate milestone thresholds for the selected decision point; and
  select a candidate milestone threshold for a third value approximately equal to a second value, the respective milestone threshold being selected as the milestone threshold for the selected decision point.

11. A system according to claim 1, wherein the processor being configured to determine at least one of the first value or the second value based upon a respective present value of an exercise price includes being configured to determine at least one of the first value or the second value based upon a respective exercise price discounted according to a second discount rate that is unequal to the first discount rate.

12. A method according to claim 1, wherein determining at least one of the first value or the second value based upon a respective present value of an exercise price comprises determining at least one of the first value or the second value based upon a respective exercise price discounted according to a second discount rate that is unequal to the first discount rate.

13. A method of performing a contingent claim valuation of an early-launch option including a contingent claim exercisable at one of a plurality of decision points that include an expiration exercise point and one or more decision points before the expiration exercise point, the method comprising:
  determining a first value representing a payoff attributable to exercise of a contingent claim at a selected decision point before the expiration exercise point;
  determining a second value representing a payoff attributable to the exercise of a contingent claim at the expiration exercise point,
  wherein determining at least one of the first value or the second value comprises determining at least one of the first value or the second value based upon a respective present value distribution of contingent future value and a respective present value of an exercise price, the present value distribution comprising a respective distribution of contingent future value discounted according to a first discount rate, and the present value of the exercise price comprising a respective exercise price discounted according to a second discount rate; and
  determining a value of the contingent claim based upon at least one of the first value or the second value,
  wherein at least determining a first value and determining a second value are performed by a processor configured to perform at least determining a first value and determining a second value.

14. A method according to claim 13, wherein determining a first value comprises determining a first value based upon a present value distribution of contingent future value at the selected decision point, and based upon a present value of an exercise price at the selected decision point.

15. A method according to claim 13, wherein determining a second value comprises determining a second value based upon a present value distribution of contingent future value at the expiration exercise point, and based upon a present value of an exercise price at the expiration exercise point.

16. A method according to claim 15, wherein determining a second value comprises determining an expected value of the difference between the present value distribution of contingent future value at the expiration exercise point and the present value of the exercise price at the expiration exercise point.

17. A method according to claim 16, wherein determining an expected value of the difference includes limiting the difference to a minimum predefined value.

18. A method according to claim 13, wherein determining a value comprises determining a value further based upon a milestone threshold at the selected decision point, the milestone threshold representing a minimum asset value for exercising the contingent claim at the selected decision point.

19. A method according to claim 18, wherein determining a value includes conditioning the value on a comparison of a distribution of contingent future value at the selected decision point and the milestone threshold.

20. A method according to claim 18 further comprising determining the milestone threshold at the selected decision point, wherein determining the milestone threshold comprises:
  determining a present value conditional distribution of contingent future value attributable to the exercise of a contingent claim at the expiration exercise point, the present value conditional distribution comprising a distribution of contingent future value conditioned on an estimated milestone threshold, and discounted according to the first discount rate;
  determining present values of respective exercise prices required to exercise one or more contingent claims at the expiration exercise point and the selected decision point, the present values of respective exercise prices comprising respective exercise prices discounted according to the second discount rate; and
  determining a conditional value based upon the present value conditional distribution of contingent future value and the present values of respective exercise prices,
  wherein determining a present value conditional distribution and a conditional value repeatedly occur for different estimated milestone thresholds until the conditional value equals approximately zero, the respective milestone threshold being selected as the milestone threshold for the selected decision point.

21. A method according to claim 18 further comprising determining the milestone threshold at the selected decision point, wherein determining the milestone threshold comprises:

determining a first value and a second value;
determining a value based upon at least one of the first value or the second value, the value being conditioned on a comparison of a distribution of contingent future value at the selected decision point and a candidate milestone threshold, wherein determining a value repeatedly occurs for a plurality of candidate milestone thresholds; and
selecting a candidate milestone threshold that maximizes the value, the respective milestone threshold being selected as the milestone threshold for the selected decision point.

22. A method according to claim 18 further comprising determining the milestone threshold at the selected decision point, wherein determining the milestone threshold comprises:
determining a present value of an underlying asset at a selected decision point before the expiration exercise point, the present value of the underlying asset comprising a candidate milestone threshold discounted according to the first discount rate;
determining a third value based upon the present value of the underlying asset, and based upon a present value of an exercise price at the selected decision point,
wherein determining a present value of an underlying asset and a first value occur for one or more candidate milestone thresholds for the selected decision point; and
selecting a candidate milestone threshold for a third value approximately equal to a second value, the respective milestone threshold being selected as the milestone threshold for the selected decision point.

23. A computer program product for performing a contingent claim valuation of an early-launch option including a contingent claim exercisable at one of a plurality of decision points that include an expiration exercise point and one or more decision points before the expiration exercise point, the computer program product comprising a computer-readable storage medium having computer-readable program code portions stored therein, the computer-readable program code portions comprising:
a first executable portion configured to determine a first value representing a payoff attributable to exercise of a contingent claim at a selected decision point before the expiration exercise point;
a second executable portion configured to determine a second value representing a payoff attributable to the exercise of a contingent claim at the expiration exercise point,
wherein at least one of the first or second executable portions is configured to determine at least one of the first value or the second value based upon a respective present value distribution of contingent future value and a respective present value of an exercise price, the present value distribution comprising a respective distribution of contingent future value discounted according to a first discount rate, and the present value of the exercise price comprising a respective exercise price discounted according to a second discount rate; and
a third executable portion configured to determine a value of the contingent claim based upon at least one of the first value or the second value.

24. A computer program product according to claim 23, wherein the first executable portion is configured to determine the first value based upon a present value distribution of contingent future value at the selected decision point, and based upon a present value of an exercise price at the selected decision point.

25. A computer program product according to claim 23, wherein the second executable portion is configured to determine the second value based upon a present value distribution of contingent future value at the expiration exercise point, and based upon a present value of an exercise price at the expiration exercise point.

26. A computer program product according to claim 25, wherein the second executable portion being configured to determine a second value includes being configured to determine an expected value of the difference between the present value distribution of contingent future value at the expiration exercise point and the present value of the exercise price at the expiration exercise point.

27. A computer program product according to claim 26, wherein the second executable portion being configured to determine the expected value of the difference includes being configured to limit the difference to a minimum predefined value.

28. A computer program product according to claim 23, wherein the third executable portion is configured to determine the value further based upon a milestone threshold at the selected decision point, the milestone threshold representing a minimum asset value for exercising the contingent claim at the selected decision point.

29. A computer program product according to claim 28, wherein the third executable portion being configured to determine a value includes being configured to condition the value on a comparison of a distribution of contingent future value at the selected decision point and the milestone threshold.

30. A computer program product according to claim 28 further comprising:
a fourth executable portion configured to determine the milestone threshold at the selected decision point, wherein the fourth executable portion being configured for determining the milestone threshold includes being configured to:
determine a present value conditional distribution of contingent future value attributable to the exercise of a contingent claim at the expiration exercise point, the present value conditional distribution comprising a distribution of contingent future value conditioned on an estimated milestone threshold, and discounted according to the first discount rate;
determine present values of respective exercise prices required to exercise one or more contingent claims at the expiration exercise point and the selected decision point, the present values of respective exercise prices comprising respective exercise prices discounted according to the second discount rate; and
determine a conditional value based upon the present value conditional distribution of contingent future value and the present values of respective exercise prices,
wherein the fourth executable portion is configured to repeatedly determine a present value conditional distribution and a conditional value for different estimated milestone thresholds until the conditional value equals approximately zero, the respective milestone threshold being selected as the milestone threshold for the selected decision point.

31. A computer program product according to claim 28 further comprising:
a fourth executable portion configured to determine the milestone threshold at the selected decision point, wherein the fourth executable portion being configured to determine the milestone threshold includes being configured to:

determine a first value and a second value;

determine a value based upon at least one of the first value or the second value, the value being conditioned on a comparison of a distribution of contingent future value at the selected decision point and a candidate milestone threshold, wherein the fourth executable portion is configured to repeatedly determine a value for a plurality of candidate milestone thresholds; and select a candidate milestone threshold that maximizes the value, the respective milestone threshold being selected as the milestone threshold for the selected decision point.

32. A computer program product according to claim 28 further comprising:

a fourth executable portion configured to determine the milestone threshold at the selected decision point, wherein the fourth executable portion being configured to determine the milestone threshold includes being configured to:

determine a present value of an underlying asset at a selected decision point before the expiration exercise point, the present value of the underlying asset comprising a candidate milestone threshold discounted according to the first discount rate;

determine a third value based upon the present value of the underlying asset, and based upon a present value of an exercise price at the selected decision point, wherein the fourth executable portion is configured to determine a present value of an underlying asset and a first value for one or more candidate milestone thresholds for the selected decision point; and select a candidate milestone threshold for a third value approximately equal to a second value, the respective milestone threshold being selected as the milestone threshold for the selected decision point.

33. A computer program product according to claim 23, wherein at least one of the first or second executable portions being configured to determine at least one of the first value or the second value based upon a respective present value of an exercise price includes being configured to determine at least one of the first value or the second value based upon a respective exercise price discounted according to a second discount rate that is unequal to the first discount rate.

* * * * *